US009485497B2

United States Patent
Karafin et al.

(10) Patent No.: US 9,485,497 B2
(45) Date of Patent: Nov. 1, 2016

(54) SYSTEMS AND METHODS FOR CONVERTING TWO-DIMENSIONAL IMAGES INTO THREE-DIMENSIONAL IMAGES

(75) Inventors: Jonathan Karafin, Village, CA (US); Matthew Dejohn, Chartsworth, CA (US); Benoit Doidic, Westlake Village, CA (US)

(73) Assignee: RealD Inc., Beverly Hills, CA (US)

( * ) Notice: Subject to any disclaimer, the term of this patent is extended or adjusted under 35 U.S.C. 154(b) by 788 days.

(21) Appl. No.: 13/230,733

(22) Filed: Sep. 12, 2011

(65) Prior Publication Data

US 2012/0235988 A1 Sep. 20, 2012

Related U.S. Application Data

(60) Provisional application No. 61/381,908, filed on Sep. 10, 2010.

(51) Int. Cl.
*G06T 15/00* (2011.01)
*H04N 13/02* (2006.01)
*H04N 13/00* (2006.01)

(52) U.S. Cl.
CPC ........ *H04N 13/026* (2013.01); *H04N 13/0007* (2013.01)

(58) Field of Classification Search
CPC .................. H04N 13/0007; H04N 13/026
USPC ......... 345/419, 626; 348/169; 382/154, 173, 382/224, 283
See application file for complete search history.

(56) References Cited

U.S. PATENT DOCUMENTS

| 6,208,348 | B1 | 3/2001 | Kaye et al. |
| 6,215,516 | B1 | 4/2001 | Ma et al. |
| 6,456,340 | B1 | 9/2002 | Margulis |
| 6,492,986 | B1 | 12/2002 | Metaxas et al. |
| 6,496,598 | B1 | 12/2002 | Harman |
| 6,515,659 | B1 | 2/2003 | Kaye et al. |
| 6,515,662 | B1 | 2/2003 | Garland |
| 6,535,233 | B1 | 3/2003 | Smith |
| 6,590,573 | B1 | 7/2003 | Geshwind |
| 6,650,339 | B1 | 11/2003 | Silva et al. |
| 6,677,944 | B1 | 1/2004 | Yamamoto |

(Continued)

FOREIGN PATENT DOCUMENTS

| EP | 1187494 A2 | 3/2002 |
| EP | 2393298 | * 12/2011 |

(Continued)

OTHER PUBLICATIONS

Saxena et al, Make3D: Learning 3D Scene Structure from a Single Still Image, IEEE Transaction on TAPMI, pp. 1-16, 2008.*

(Continued)

*Primary Examiner* — Phu K Nguyen
(74) *Attorney, Agent, or Firm* — Neil G. J. Mothew; Penny L. Lowry

(57) ABSTRACT

Systems and methods for converting a two-dimensional image or sequence of images into a three-dimensional image or sequence of images are presented. In embodiments, the disclosed techniques employ a suite of interactive image processing tools that allow a user to apply image pixel repositioning depth contouring effects and algorithms to efficiently create high-quality three-dimensional images.

38 Claims, 124 Drawing Sheets

(56) References Cited

U.S. PATENT DOCUMENTS

| | | | |
|---|---|---|---|
| 6,686,926 | B1 | 2/2004 | Kaye |
| 6,765,568 | B2 | 7/2004 | Swift et al. |
| 6,791,542 | B2 | 9/2004 | Matusik et al. |
| 6,798,406 | B1 | 9/2004 | Jones et al. |
| 7,102,633 | B2 | 9/2006 | Kaye et al. |
| 7,116,323 | B2 | 10/2006 | Kaye et al. |
| 7,116,324 | B2 | 10/2006 | Kaye et al. |
| 8,411,931 | B2 * | 4/2013 | Zhou et al. .................. 382/154 |
| 8,644,596 | B1 * | 2/2014 | Wu et al. ..................... 382/154 |
| 8,928,729 | B2 * | 1/2015 | Schnyder ........... H04N 13/0264 348/36 |
| 9,042,636 | B2 * | 5/2015 | Turner ................ H04N 13/026 382/103 |
| 2002/0048395 | A1 | 4/2002 | Harman et al. |
| 2002/0063780 | A1 | 5/2002 | Harman et al. |
| 2002/0075384 | A1 | 6/2002 | Harman |
| 2004/0004616 | A1 | 1/2004 | Konya et al. |
| 2013/0187910 | A1 * | 7/2013 | Raymond et al. ............ 345/419 |
| 2014/0225887 | A1 * | 8/2014 | Aguirre-Valencia ......... 345/419 |

FOREIGN PATENT DOCUMENTS

| | | |
|---|---|---|
| WO | WO 97/24000 A1 | 7/1997 |
| WO | WO 99/12127 A1 | 3/1999 |
| WO | WO 99/30280 A1 | 6/1999 |
| WO | WO 00/79781 A1 | 12/2000 |
| WO | WO 01/01348 A1 | 1/2001 |
| WO | WO 02/13143 A1 | 2/2002 |

OTHER PUBLICATIONS

Allchin, James Edward, "An Architecture for Reliable Decentralized Systems," Ph.D. Thesis, Georgia Institute of Technology, 185 pages, Sep. 1983.

Augun, Audrey, "Integrating Lotus Notes With Enterprise Data," Lotus Notes Advisory, pp. 22-25, Jul.-Aug. 1996.

Brinkmann, Ron, "The Art and Science of Digital Compositing," Second Edition, Elsevier Inc., Burlington, MA, 2008, pp. 1-14, 39-51, 93-231, 428-435, 605-625.

Finance, Charles et al., "The Visual Effects Producer Understanding the Art and Business of VFX," Elsevier Inc., Amsterdam: Boston, 2010, pp. 21-23, 37-52, 215-225, 241-248.

Gao, Qigang et al., Perceptual Motion Tracking from Image Sequences, IEEE, Jan. 2001, pp. 389-392.

Gleicher, Michael, "Image Snapping," SIGGRAPH: pp. 183-190, Jun. 1995.

Grossman, John, "Look Ma, No Glasses", Games, Apr. 1992, pp. 12-14.

Hanrahan, Pat et al., "Direct WYSIWYG painting and texturing on 3D shapes", Computer Graphics, vol. 24, Issue 4, pp. 215-223, Aug. 1990.

Izquierdo, Ebroul et al., Virtual 3D-View Generation from Stereoscopic Video Data, IEEE, Jan. 1996, pp. 1219-1224.

Kaufman, Debra, 3D Movie Magic Web Page Information, Jan. 21, 1998 The Big Picture, Web Page for Xenotech, Apr. 1998.

Kaufman, Debra, The Big Picture, Web Page for Xenotech, Apr. 1996, pp. 1-4 (downloaded Sep. 8, 1996).

Lipton, Lenny, "Foundations of the Sterescopic Cinema A Study in Depth," Van Nostrand Reinhold Company Inc., New York NY, 1962, pp. 53-90, 177-220.

Mae, Yasushi, et al., "Object Tracking in Cluttered Background Based on Optical Flow and Edges," Proc. 13th Int. Conf. on Pattern Recognition, vol. 1, pp. 196-200, Apr. 1996.

Mendiburu, Bernard, "3D Movie Making: Stereoscopic Digital Cinema From Script to Screen," Elsevier Inc., Burlington, MA, 2009, pp. 1-33, 47-71, 123-149, 171-196.

Mortensen, E.N. et al., "Intelligent Scissors for Image Composition," Computer Graphics (SIGGRAPH '95), pp. 191-198, Los Angeles, CA, Aug. 1995.

Mortensen, E.N. et al., "Interactive segmentation with Intelligent Scissors," Graphical Models and Image Processing, vol. 60 No. 5, pp. 349-384, Sep. 2002.

Murray et al., Active Tracking, IEEE International Conference on Intelligent Robots and Systems, Sep. 1993, pp. 1021-1028.

Nguyen, Hieu Tat et al., Tracking Nonparameterized Object Contours in Video, IEEE Transactions on Image Processing, vol. 11, No. 9, Sep. 2002, pp. 1081-1091.

Noll, Michael A., Computer-Generated Three-Dimensional Movies, Computers and Automation, vol. 14, No. 11 (Nov. 1965), pp. 20-23.

Noll, Michael A., Stereographic Projections by Digital Computer, Computers and Automation, vol. 14, No. 5 (May 1965), pp. 32-34.

Ohm et al., An Object-Based System for Stereopscopic Viewpoint Synthesis. IEEE transaction on Circuits and Systems for Video Technology, vol. 7, No. 5, Oct. 1997, pp. 801-811.

Okun, Jeffrey A., Susan Zwerman, eds., "The VES Handbook of Visual Effects, Industry Standard VFX Practices and Procedures," Elsevier Inc., Burlington, MA, 2010, pp. 1-14, 74-75, 222-232, 414-434, 550-574, 694-697.

Selsis et al., Automatic Tracking and 3D Localization of Moving Objects by Active Contour Models, Intelligent Vehicles 95 Symposium, Sep. 1995, pp. 96-100.

Slinker et al., "The Generation and Animation of Random Dot and Random Line Autostereograms", Journal of Imaging Science and Technology, vol. 36, No. 3, pp. 260-267, May 1992.

Weber, Joseph et al., "Rigid Body Segmentation and Shape Description from Dense Optical Flow Under Weak Perspective," IEEE Transactions on Pattern Analysis and Machine Intelligence, vol. 19, No. 2, Feb. 1997, pp. 139-143.

Wright, Steve, "Digital Compositing for Film and Video," Third Edition, Elsevier Inc., Burlington, MA, 2010, pp. 1-3, 103-110, 125-131, 153-155, 168-171.

Zhong, Di et al., "AMOS: An Active System for MPEG-4 Video Object Segmentation," ICIP (2) 8: pp. 647-651, Apr. 1998.

Co-pending U.S. Appl. No. 13/230,750, filed Sep. 12, 2011.

* cited by examiner

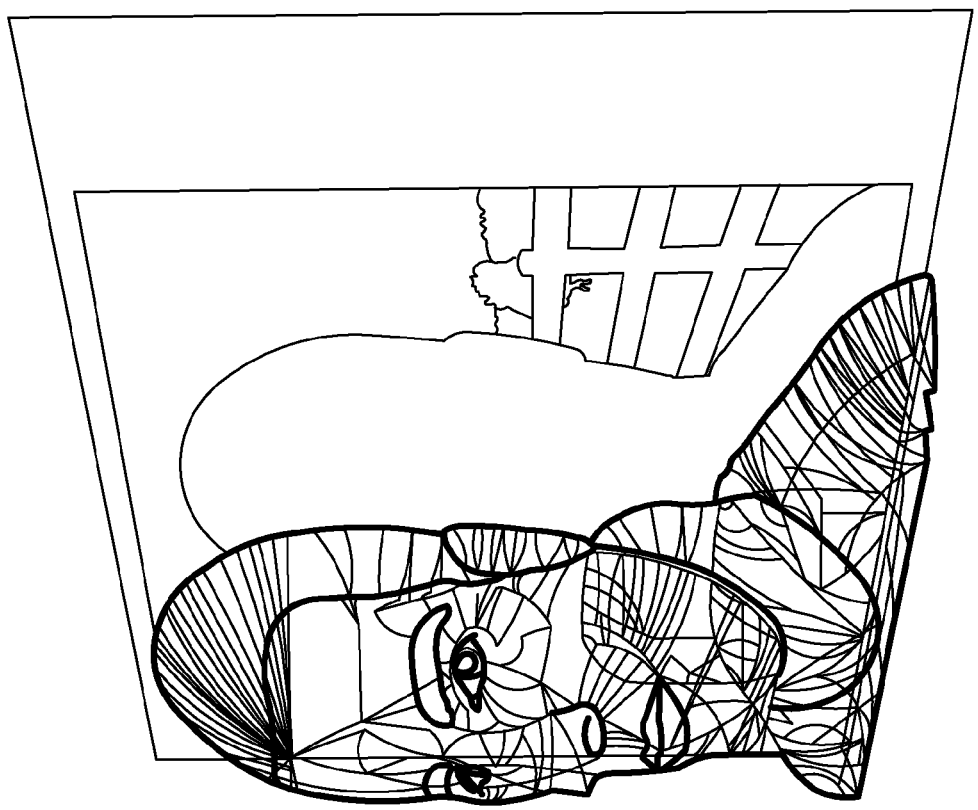

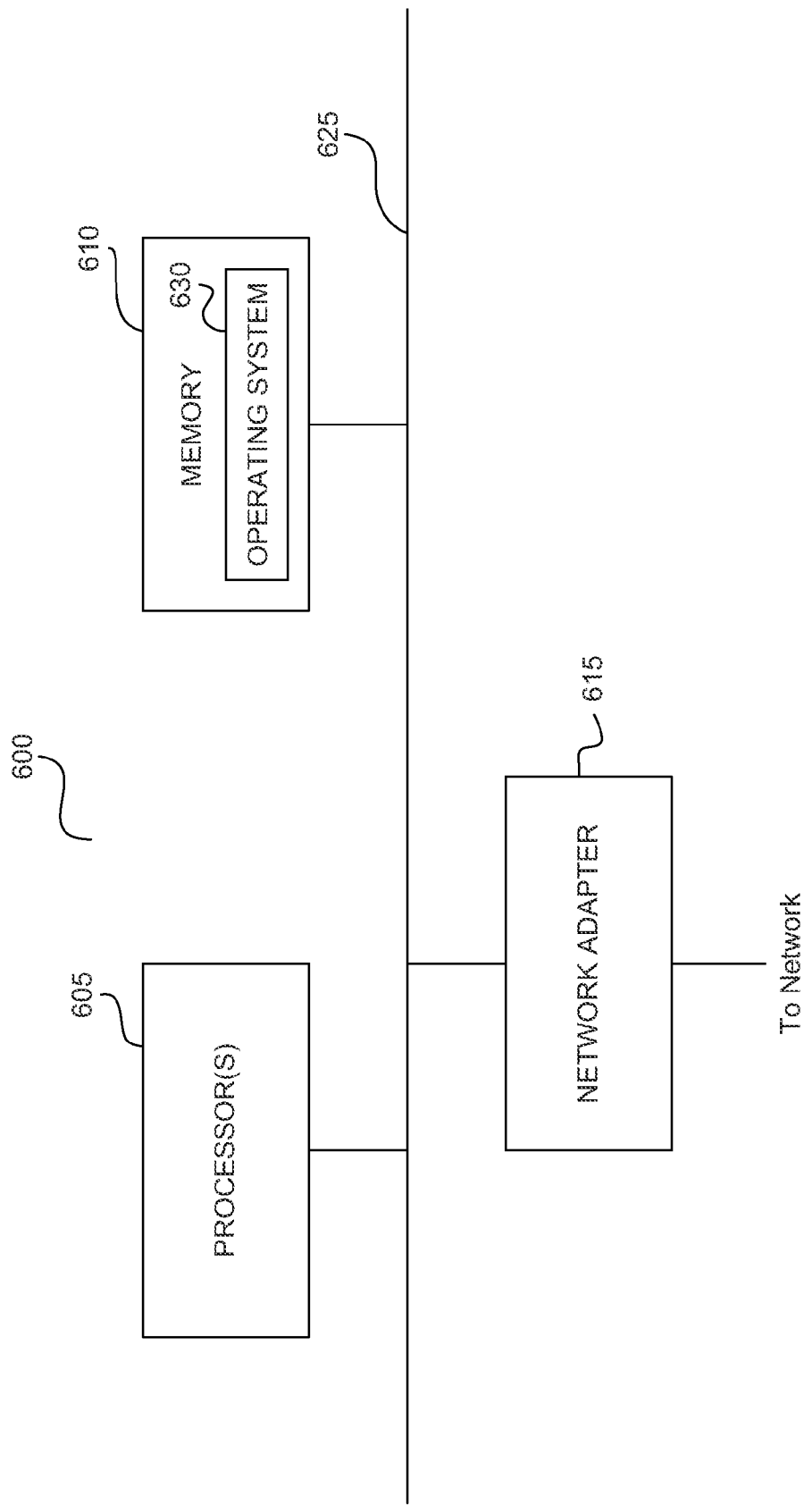

SYSTEMS AND METHODS FOR CONVERTING TWO-DIMENSIONAL IMAGES INTO THREE-DIMENSIONAL IMAGES

PRIORITY CLAIM

Priority is claimed to U.S. Provisional Application Ser. No. 61/381,908 filed on Sep. 10, 2010, titled "User Guided Image Processing System and Method for Converting Two-Dimensional Images into Three-Dimensional Images", by inventors Jonathan Karafin, Matt DeJohn and Benoit Doidic, the contents of which are expressly incorporated herein by this reference.

CROSS-REFERENCES TO RELATED REFERENCES

The present application is related to the following issued patents, each of which is incorporated herein in its entirety by this reference:
U.S. Pat. No. 7,116,324, titled "Method For Minimizing Visual Artifacts Converting Two-Dimensional Motion Pictures Into Three-Dimensional Motion Pictures" and issued on Oct. 3, 2006.
U.S. Pat. No. 7,116,323, titled "Method of Hidden Surface Reconstruction For Creating Accurate Three-Dimensional Images Converted From Two-Dimensional Images" and issued on Oct. 3, 2006.
U.S. Pat. No. 7,102,633, titled "Method For Conforming Objects to Common Depth Perspective for Converting Two-Dimensional Images Into Three-Dimensional Images" and issued on Sep. 5, 2006.
U.S. Pat. No. 6,686,926, titled "Image Processing System and Method for Converting Two-Dimensional Images Into Three-Dimensional Images" and issued on Feb. 3, 2004.
U.S. Pat. No. 6,515,659, titled "Method and System For Creating Realistic Smooth Three-Dimensional Depth Contours From Two-Dimensional Images" and issued on Feb. 4, 2003.
U.S. Pat. No. 6,208,348, titled "System And Method For Dimensionalization Processing of Images In Consideration Of A Predetermined Image Projection Format" and issued on Mar. 27, 2001.
Additionally, the present application is related to co-pending and commonly assigned U.S. patent application Ser. No. 13/230,750, entitled "METHODS AND SYSTEMS FOR PRE-PROCESSING TWO-DIMENSIONAL IMAGE FILES TO BE CONVERTED TO THREE-DIMENSIONAL IMAGE FILES," concurrently filed herewith, which is also incorporated herein in its entirety by this reference.

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The techniques discussed herein generally relate to systems and methods for processing two-dimensional ("2D") images. More particularly, the techniques relate to methods and systems for converting 2D images into three-dimensional ("3D") images within a user guided image-processing system.

BACKGROUND

The capture and presentation of three-dimensional images to an audience is a natural progression of the art of film-making, as it makes use of one of the aspects of the stereoscopic human vision system that has been previously ignored: depth perception. 3D content presents the viewer with a more immersive view of movies, television, and other visual media.

For a viewer to perceive a scene as 3D, at least two unique perspectives of the scene must be presented, with each perspective related to the others in a specific way. The simplest 3D image, known as a stereoscopic 3D image, can be generated with just two perspectives. The two perspectives mimic the stereoscopic view of human eyes. They exist as 2D images on their own, but because of the parallax discrepancies between the two, when viewed together using special equipment, the perception of depth is possible.

While this is an improvement over flat 2D images, the limitation of only two perspectives means the depth of the scene is seen from a locked position. This is considered acceptable for certain viewing situations, such as sitting in a movie theater to watch a movie. Normally, however, humans overcome this limitation via their ability to move their heads and look around a scene. To accomplish this with recorded media, even more perspectives of the scene must be recorded and presented to the viewer, in a process known as autostereoscopic viewing. The number of perspectives can range from a few, as with lenticular technologies, to many, as with holographic technologies.

Although recording multiple perspectives is feasible during the initial capture or filming of the images, for images that have already been captured using just a single perspective, such as the vast majority of recorded films and television shows in existence today, it is difficult to extrapolate and create the additional perspective views required for a 3D experience.

Conversion techniques presently offered in the art have allowed computers to help with repetitious parts of the 2D to 3D conversion process. However, due to the variety of tasks and complexity inherent in even the simplest of scenes, a human user, who has the innate advantages of stereoscopic vision, object recognition, and edge detection, is required to accomplish accurate and high quality 2D to 3D image conversion. Furthermore, known tools within graphic software packages or software filter plug-ins are not specifically designed for 2D to 3D image conversion and consequently do not offer the fast or accurate user feedback necessary to facilitate a true-to-life and believable re-creation of a 3D image within a realistic timeframe. Accordingly, it is desirable to have systems and methods for conversion of 2D images to 3D images with which a human user or operator can easily interact and make the communication between the user's desires and the systems as seamless as possible.

SUMMARY

To minimize the limitations in the prior art, and to minimize other limitations that will become apparent upon reading and understanding the present specification, the present application describes methods and systems for facilitating conversion of two-dimensional images into three-dimensional images.

In at least one embodiment, the conversion systems and methods of the present application accomplish conversion of two dimensional (or "2D") images, into stereoscopic three dimensional (or "3D") images utilizing one or more of the following operations: accessing and loading (i.e., ingesting) two dimensional image data containing multiple objects; splitting the image data into multiple objects or segments; interpolating one or more of shape, angle, depth, or motion of an object in one or more of the objects or segments; compositing those (and potentially other) elements together; reviewing composited image data; further mastering depth to match other shots or the artistic vision; reviewing the shot or shots further; and exporting one or more images from that data.

In embodiments, the ingested digital image data is comprised of data selected from the group comprising of, but not limited to: additional two-dimensional image data; additional three-dimensional image data; computer-generated renders; alpha mattes; alpha channels; depth maps; clean plates; grain plates; spline data; or mesh data.

In embodiments, image objects are generally separated or segmented either based on their relative distance from other objects or based on the image size and resolution, but multiple techniques may be used. The separation or segmentation is generally determined and performed using techniques including, but not limited to: external input of the stereoscopic z-depth information and data, a user's depth extrapolation, or a combination of both. External sources for depth information can come from multiple sources, including, but not limited to: alpha mattes, computer generated render mattes, depth maps generated by analyzing the optical flow of the material, light detection and ranging scans of the physical area used to capture or otherwise film the one or more images, or depth maps generated from three dimensional infrared cameras before, during, or after the capture of the one or more images.

In embodiments, when the user initiates and/or otherwise designs the stereoscopic 3D, methods for defining and extrapolating the stereoscopic depth include, but are not limited to: drawing tools for object isolation, holes used to exclude pixels, spline creation tools for object isolation, pixel transparency created using edge feather or other tools altering the opacity, changing the location of a pixel or pixels by modifying parameters, tools for altering perspective, tools for skewing or otherwise stretching and bending pixels, or shape and contour tools and parameters for warping pixels.

In embodiments, objects may be selected using several techniques, including, but not limited to: tag selection, visibility map selection, and object selection. Additionally, in embodiments, the one or more segmented objects may be interpolated using a variety of techniques, including, but not limited to: key frame animation, parenting, or modifying the global parameters.

In embodiments, images are composited together using several techniques including, but not limited to: automated fills for occluded areas on a per object basis, layering of the modified image data, pre-compositing image data to avoid collisions in depth, reintroducing transparencies, or edge anti-aliasing via super-sampling.

Further, in embodiments, images may be depth mastered using one or more of several techniques, including but not limited to: procedural depth scaling; screen registration; color correction; image sequence retiming; anamorphic stretch; edge mattes; or virtual windows.

In embodiments, final exported results are rendered using computations that incorporate the various techniques described in this document, which include but are not limited to: paths drawn by users, values entered by the user, any composited material loaded by the user, or depth mastering values set by the user. The final output includes a multitude of various data from a group comprising of, but not limited to: images representing multiple perspective views, mattes, depth maps, mesh data, or splines. In embodiments, changes made to the image are, for example, contemporaneously visible to the user to enable the user to appreciate and make modifications as appropriate. Overall, these techniques result in the creation of alternative perspective images. The alternative perspective images, when combined with the original images, create corresponding three dimensional images. In embodiments, alternately, alternate perspective images may be combined with other alternate perspective images to similarly create corresponding three-dimensional images. The change or changes made to the image or images are visible to the user in real-time using a three-dimensional display. In embodiments, when one or more images are viewed as a sequence, the sequence of images typically makes up a discrete scene of visual media work.

In embodiments, the techniques presented herein provide a user guided, yet computer-based image processing method for converting two-dimensional images into three-dimensional images. Such techniques include several operations including, but not limited to: loading two-dimensional images on a computer, creating multiple stereoscopic three dimensional images, presenting the stereoscopic images on a three-dimensional display, identifying a first discrete portion and one or more pixels of a second discrete portion, interpolating a group of missing pixels within the one or more stereoscopic 3D images, compositing one or more multidimensional images by combining the group of missing pixels and the one or more multi-dimensional images, mastering the stereoscopic images in depth, or exporting the multi-dimensional images.

In embodiments, presented is as a system for converting two-dimensional images into stereoscopic three-dimensional images. The system includes, among other components and logical entities, digital data, a first computer algorithm, and a three-dimensional display. The digital data is made up of one or more images. The first computer algorithm processes the digital data and creates one or more accurate stereoscopic three dimensional images, free of artifacts. These new stereoscopic 3D image pairs, created without any discrepancies between the visual data in the left and right eye, are created by segmenting the images, compositing the images, and depth mastering the images. In some instances, the stereoscopic three-dimensional display shows the change or changes being made to the three-dimensional image or images. In embodiments, the artifact-free alternate perspective images are combined with one or more images to create one or more three-dimensional images. Alternatively, these images may be combined with each other. The two combined groups of one or more artifact-free alternate perspective images create one or more three-dimensional images.

In embodiments, the one or more changes are visible to a user in real-time and may be displayed as a numerical feedback.

The methods disclosed herein with respect to the above system may also utilize: a second computer algorithm in which the computer identifies and isolates one or more individual portions of the one or more artifact-free alternate perspective images. In most instances, the second algorithm uses both object and pixel based segmentation to identify and isolate the one or more portions of the image. The second algorithm generally produces external data that may be altered by the user. These alterations are reflected on the display. One or more portions are grouped together by a user based on the perceived three-dimensional relationship to one another and to a background. The system implementing above methods may also contain a third computer algorithm that interpolates missing pixel data in the artifact-free alternate perspective image or images. The missing pixel data is interpolated using a method selected from, but not limited to, the following group: pixel repositioning, pixel warping, or pixel feathering. The system, in some instances, utilizes a fourth algorithm in which a majority of the interpolated missing pixel data is used to create one or more three dimensional images. In addition, the system also may also include a fifth computer algorithm in which depth is created in the one or more three-dimensional images. The three-dimensional images are created using a process comprising one or more of: generating a three-dimensional mesh form, repositioning a pixel or group of pixels through depth parameter adjustment, skewing the pixels through vector representation, or utilizing a group of known depth calculations with the majority of the three-dimensional mesh forms. In embodiments, the one or more three-dimensional images are exported to the three-dimensional display for review and viewing by the user.

In at least these introductory aspects disclosed in this summary, the techniques disclosed herein provide user-friendly computer aided systems and methods for converting two-dimensional images into three-dimensional images, thus overcoming limitations of known art. These and other features, aspects and advantages of the present teachings will become better understood with reference to the following description, examples, and appended claims.

BRIEF DESCRIPTION OF DRAWINGS

The techniques discussed herein can be better understood with reference to the following drawings. Those of skill in the art will understand that the drawings, described below, are for illustrative purposes only. The drawings are not intended to limit the scope of the present teachings in any way.

FIGS. 48A-48B illustrate depth mastering operations.

FIG. 53 is a high-level block diagram showing an example of the architecture for a computer system that can be utilized to implement the techniques discussed herein.

DETAILED DESCRIPTION

Figure 1:
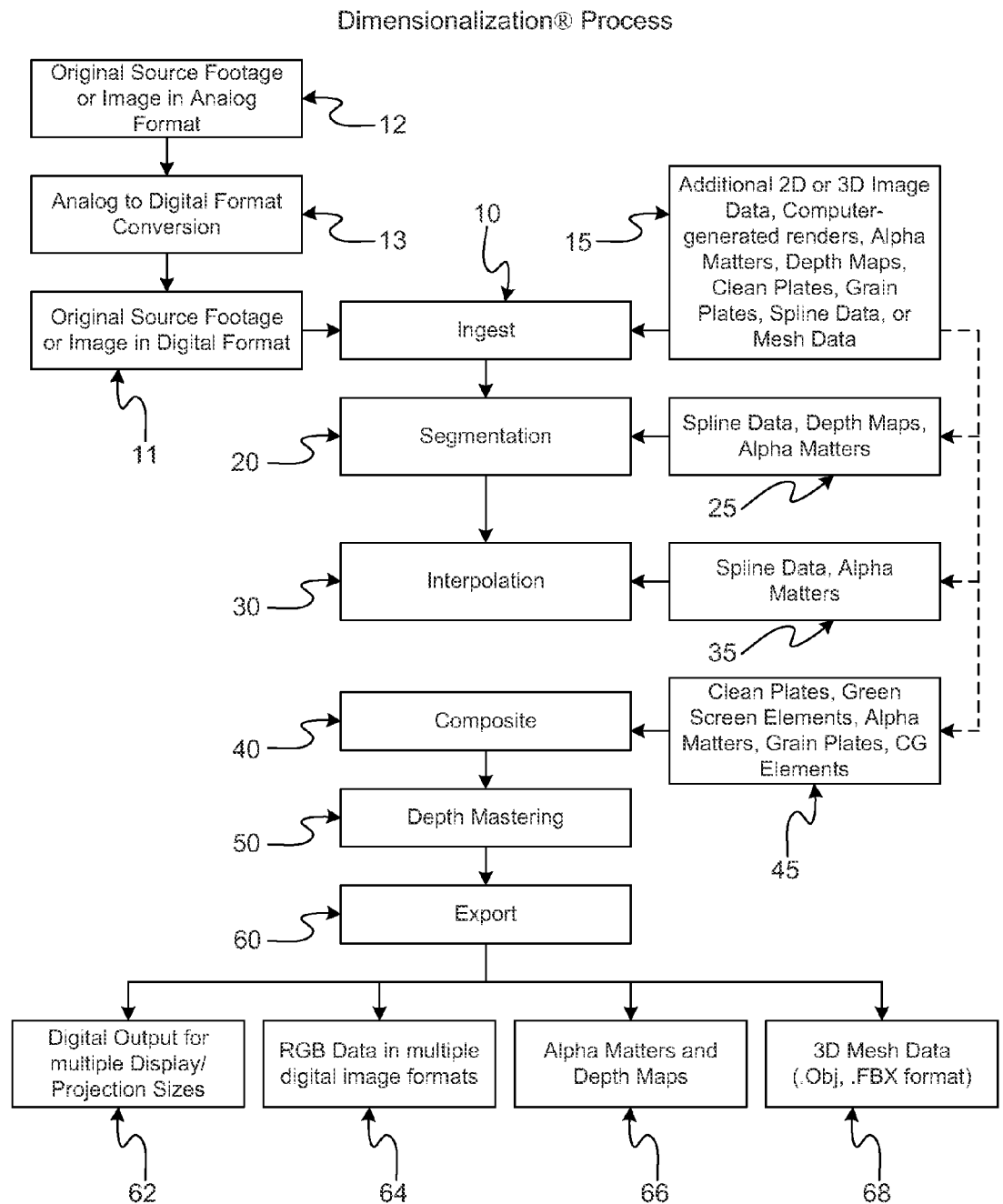
FIG. 1 is a flow diagram illustrating an exemplary embodiment of a method of 2D to 3D conversion.

In the following detailed description of various embodiments of the invention, numerous specific details are set forth in order to provide a thorough understanding of various aspects of one or more embodiments of the invention. However, one or more embodiments of the invention may be practiced without some or all of these specific details. In other instances, well-known methods, procedures, and/or components have not been described in detail so as not to unnecessarily obscure aspects of embodiments of the invention.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the screen shot figures, and the detailed descriptions thereof, are to be regarded as illustrative in nature and not restrictive. Also, the reference or non-reference to a particular embodiment of the invention shall not be interpreted to limit the scope of the invention.

In the following description, certain terminology is used to describe certain features of one or more embodiments of the invention. As used herein, the term "three-dimensional" refers to an aspect of an image or image sequence that allows for a perception of depth, imparted through the use of stereoscopic or auto-stereoscopic viewing techniques. The term "3D" may be used in place of "three-dimensional", and refers to the same perceived depth effect, and should not be confused with its other common use as it relates to computer generated imagery ("CGI"), unless that connection is made explicit.

As used herein, the term "object" is broadly defined to include any designated group of pixels within a digitized image or image sequence. The grouping of an object is defined by an outline, path line, or spline. Objects are a type of visual effect asset, referred to as an element. An element is any file or resource used in the creation of a shot.

As used herein, the term "segmentation" is broadly defined to include the act of separation of pixels or a continuous plurality of pixels, known as an object. The separation occurs in 2D-space, as well as 3D-space.

As used herein, the term "complimentary stereoscopic 3D image" is broadly defined to include any two images that can be combined to view a single, effective stereoscopic three-dimensional image.

As used herein, the term "computer-generated render" is broadly defined to include an image created entirely within or by the computer with no 'real world' footage or images included.

As used herein, the term "alpha channel" is broadly defined to include a portion of the data contained in each pixel that represents transparency information. Generally, digital images contains\ four channels: one each for red, green, and blue and an additional alpha channel. This serves as a mask, and specifies how a pixel's color should be merged with other pixels when the two are overlaid one on top of the other.

As used herein, the term "depth map" is broadly defined to include any grayscale image used to dictate z-depth values.

As used herein, the term "clean plate" is broadly defined to include an image in which a particular element has been removed and replaced with visual data consistent with the remaining imagery. A clean plate may also be captured to exclude the same element.

As used herein, the term "grain plate" is broadly defined to include an image that contains only the film grain or digital noise in the shot. A grain plate may be generated from source material or simulated.

As used herein, the term "spline data" is broadly defined to include data generated from rotoscoping. Splines and the associated data determine factors including, but not limited to: the size and shape of an object, its location, and its animation when altered across multiple frames.

As used herein, the term "mesh data" is broadly defined to include computer models of contiguous geometric planes, or polygons, generated by the triangulation of spline data.

As used herein, the term "RGB data" is broadly defined to include an image file containing separate channels of red, green, and blue color information.

As used herein, the term "Light detection and Ranging (LIDAR)" is broadly defined to include an optical system that uses the measured properties of scattered light to determine the distance of an object.

As used herein, the term "path line" is broadly defined to include a closed loop of interconnect points generated from spline data. The number of points can vary infinitely based on the number of points needed to completely encapsulate the object.

As used herein, the term "scan converted" is broadly defined to include footage that has had its vertical or horizontal scan frequency altered, which generally happens when footage is digitized.

As used herein, the term "hole" is broadly defined to include an area of transparency within an object.

As used herein, the term "Bezier-function spline" is broadly defined to include a mathematical curve with control handles. Adjusting the control handles alters the curvature of the spline. The spline dictates the size and shape of objects.

As used herein, the term "Bezier curve" is broadly defined to include the curvature of the Bezier-function spline. This spline is created by bending points using multiple handles along the edge of the Bezier shape, which in turn creates the curve.

As used herein, the term "pixel warp" is broadly defined to include the expansion or compression of pixels that occurs when depth is applied to an object, altering the original source material.

As used herein, the term "parenting" is broadly defined to include the act of linking object values to other objects. Linking one object to another creates a parent object and a child. Changes in depth or angle applied to the parent object also affect the child objects. Child objects can have objects parented to them as well, making them grand children of the parent.

As used herein, the term "artifact-free" is broadly defined to include an image free of artifacts. Artifacts are defined as objects that create asynchronous data within Intrigue. They may appear as glowing, twinkling, repeated pixels, amorphous or unnatural stereoscopic 3D depth, or any other article that doesn't appear in the manner the user intended.

As used herein, the term "alternate perspective images" is broadly defined to include two images taken from different angles that, when combined, create a stereoscopic 3D image.

As used herein, the term "three-dimensional display" is broadly defined to include an optical image device that is capable of displaying stereoscopic 3D content including but not limited to: stereoscopic 3D images, stereoscopic 3D footage, stereoscopic 3D models, or other stereoscopic 3D data.

FIG. 1 is a flow diagram illustrating an exemplary embodiment of a method of 2D to 3D conversion. In at least one embodiment, the method includes an ingestion procedure, as indicated in block 10. In embodiments, ingestion refers to accepting an original source footage or image in digital format for further processing. In examples, the original source footage may be in analog format, and then converted to digital format, as illustrated in blocks 11-13. In addition to ingesting source footage, in embodiments, the illustrated method may also ingest additional 2D or 3D image data, computer-generated (CG) renders, alpha mattes, depth maps, clean plates, grain plates, spline data, and/or mesh data 15. In embodiments, and as will be further disclosed further below, the various operations illustrated with reference to FIG. 1 are performed by a computer system. Although not required, aspects of the described techniques may be described in the general context of computer-executable instructions, such as routines executed by a general-purpose data processing device (e.g., a server computer or a personal computer). Those skilled in the relevant art will appreciate that the techniques can be practiced with other communications, data processing, or computer system configurations, including: wireless devices, Internet appliances, hand-held devices (including personal digital assistants (PDAs)), all manner of cellular or mobile phones, multi-processor systems, microprocessor-based or programmable consumer electronics, set-top boxes, network PCs, mini-computers, mainframe computers, and the like. Indeed, the terms "computer," "server," and the like are used interchangeably herein, and may refer to any of the above devices and systems. While aspects of the described embodiments, such as certain functions, are described as being performed on a single device, the invention can also be practiced in distributed environments where functions or modules are shared among disparate processing devices. The disparate processing devices are linked through a communications network, such as a Local Area Network (LAN), Wide Area Network (WAN), or the Internet. In a distributed computing environment, program modules may be located in both local and remote memory storage devices. Aspects of the described embodiments may be stored or distributed on tangible computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data related to the invention may be distributed over the Internet or over other networks (including wireless networks), on a propagated signal on a propagation medium (e.g., an electromagnetic wave(s), a sound wave, etc.) over a period of time. In some implementations, the data may be provided on any analog or digital network (packet switched, circuit switched, or other scheme).

Returning to the 2D to 3D conversion techniques of FIG. 1, the images or sequence of images ingested into a computer system (e.g., a computer system used by a user for performing various user guided steps described herein) are then segmented, as indicated in block 20. In embodiments, additional data may be entered and utilized during the segmentation operation, including, for example, spline data, depth maps, and alpha mattes (as disclosed, for example in block 25). The images are then interpolated, as indicated in block 30. In embodiments, the interpolation operation may take into consideration additional data including spline data and alpha mattes. The interpolated images may then be composited, as indicated in block 40. The compositing operation may include, for example, clean plates, green screen elements, alpha mattes, grain plates, and CG elements as indicated in block 45. In embodiments, the images may then depth mastered, as indicated in block 50 and subsequently be exported, as indicated in block 60. An export operation, as indicated in block 60, may be in the form of, for example, digital output for multiple display/projection sizes 62, RGB data in multiple digital image formats 64, alpha mattes or depth maps 66, and/or 3D mesh data 68.

In embodiments, the techniques presented here include a system for converting two-dimensional (2D) images or image sequences into three-dimensional (3D) images or image sequences. The system requires as a minimum one input of a 2D image or image sequence, which may come from digital sources or analog sources, as long as the analog sources are first run through a digitizing process. Additional 2D and 3D data sources may also be used to further refine or speed up the conversion process, and include, but are not limited to: additional 2D images or complimentary stereoscopic 3D images, computer-generated renders, alpha channels, alpha mattes; depth maps, clean plates, grain plates, spline data, or mesh data. All input sources are received as digital data read from a variety of sources, including, but not limited to: system memory, internal and external hard drives, optical drives, networked servers, or any combination thereof.

In embodiments, the ingested input may also include multi-view assets received from various sources. A multi-view asset may already have "3D" information in them (e.g., through capture of information using 3D cameras), but such multi-view assets may still be incomplete or not have complete 3D occluded region information to be able to effectively placed in conjunction with other images in the sequence. Accordingly, if a multi-view asset is received, such an asset is converted to formats acceptable by the system described herein and further processing continues as with other non-multi-view assets. In embodiments, when such assets are received, for example from an external studio, preliminary processes may need to be performed to ensure compliance or coordination with present processes. For example, when a 3D asset plate is received, 3D elements may be teased out from the 2D elements. The 3D objects may have the following done to ensure that they match other 2D/3D properties: the objects may be reshaped, depth grading (or existing depth grade altered) may be performed to match depth grading trends of existing/processed assets, matching steps may be performed to match render aspect of the received assets with existing assets, etc. In this aspect, the conversion techniques illustrated herein cover not just 2D to 3D conversion, but also 3D to 3D conversion to ensure quality of final 3D product. Additionally, it is understood that the input image format may be inclusive of all types of formats as understood by a person of ordinary skill in the art, including formats such as the DEEP format. In embodiments, the input for processing and ingesting into the system may not just be 2D or 3D assets as illustrated above, but may also include, for example, CG models received from other sources. Such CG models may be indicative of t2D or 3D images. In such instances, the method herein contemplates generating depth grades and other inherent geometries for use with any of the techniques illustrated herein. It is also understood that in any part of the description below, the use of depth grading inherently involves use of any image format with appropriate depth data (e.g., DEEP image data or any other data format that one of ordinary skill in the art may contemplate now or in the future). Further, in at least some embodiments, it is understood that the generated 3D data may include the ability to develop multiple perspectives for specific displays such as an auto stereo screen.

Data sources are processed by the system to generate new data, and may include some or all of the following steps: segmentation, compositing, and 3D mastering. This is done through the use of computer algorithms and extensive human user input. User input can come in a variety of forms, and include, but are not limited to: drawing by means of a digital tablet, configuring and associating various input sources, or modifying various depth parameters. User input is preferably confirmed in real-time back to the user through a 3D capable display, which might provide numerical feedback via a variety of measurement tools.

By maximizing user control and feedback during the conversion process, the techniques described herein allow for the creation of artifact-free alternate perspective images of the original 2D image.

The creation of the alternate perspective images takes into consideration the fact that a selected alternate perspective will need to be combined with, and ultimately viewed together with, either the original 2D image or another one of the alternate perspective images. Only with a minimum of two perspectives can a 3D effect be presented to the viewer. The 3D effect is typically accomplished through one of several ways, including, but not limited to: (1) generating an image or sequence of images that is a complementary perspective to the original 2D image or sequence of images, wherein the original 2D image is the right eye view and the generated image is the left eye view (or vice versa); (2) generating two images or image sequences that represent two complimentary perspectives, wherein one image or sequence of images is the right eye view and the other image or sequence of images is the left eye view (or vice versa); (3) generating images or a sequence of images that have a plurality of related perspectives, wherein each image or sequence of images has a unique viewpoint or perspective; and/or (4) generating per-pixel depth data that is stored separately from the original image or sequence of images and recombined later using any number of methods.

Image element segmentation includes identifying and isolating the discrete elements within a 2D image or sequence of images based on their perceived 3D relationship. Image element segmentation falls into two general categories: object level segmentation and pixel level segmentation. Object level segmentation isolates and acts upon a plurality of pixels within an image region. This allows for the faster and uniform processing of image elements. Pixel level segmentation acts upon individual pixels within the image, allowing for the precise segmentation of image elements. Both image element segmentation types are preferably accomplished using, for example, one of these following operations: (1) an external input of depth data; or (2) a user initiated depth extrapolation.

External Input of Depth Data Segmentation

Segmentation may be performed using external sources of depth data. The external sources of depth data, include, but are not limited to: transparency (alpha) mattes; CG rendered depth maps; depth maps generated through optical flow analysis; (light detection and ranging ("LIDAR") scans of the physical set during the initial capture of the image; and/or depth maps generated from 3D infrared cameras during initial capture. Because the quality of the external depth data may vary, user intervention may still be required to have usable results. The user may also alter the external depth data for purely creative purposes. Depth data preferably is available at the pixel segmentation level, because the depth data is typically encoded at either the pixel or sub-pixel level.

User Initiated Depth Extrapolation Segmentation

In embodiments, user initiated depth extrapolation segmentation includes, but is not limited to: pixel repositioning; pixel skewing; pixel warping; or pixel feathering. Ease of use is fundamental to the effectiveness of the tools, methods, and/or systems used for user initiated depth extrapolation segmentation. As such, the tools, methods, and or systems are preferably machine-aided to simplify the interaction between the user and the image elements. The user focuses on the main task of object level segmentation and depth extrapolation, and the machine focuses on the pixel level segmentation.

Examples of easy-to-use machine aided tools, methods, and systems for user initiated depth extrapolation image element segmentation include, but are not limited to: drawing tools for object isolation; holes used for pixel exclusion; spline creation tools for object isolation; pixel transparency as a result of edge feather parameter modification; pixel repositioning as a result of depth parameter modification; perspective drawing tools and parameters for pixel skewing; or shape contour drawing tools and parameters for pixel warping.

Drawing Tools for Object Isolation

In embodiments, drawing tools for object isolation take analog user input, such as the movement of a pen on a digitizing tablet, and translate that to a cursor position on the image. The movement on a pen, for example, might be the user outlining a discrete element. By sampling the cursor position at regular intervals, a path is created by interconnecting the sampled points. The sampling frequency defines the accuracy of the path line and the computational load the path line represents, and can, thus, be increased or decreased by the user to set a suitable balance. After a complete outline of the desired discrete image element is drawn, the user may commit the defined path line to the memory of the system, thereby creating an isolated object.

Figure 2A:
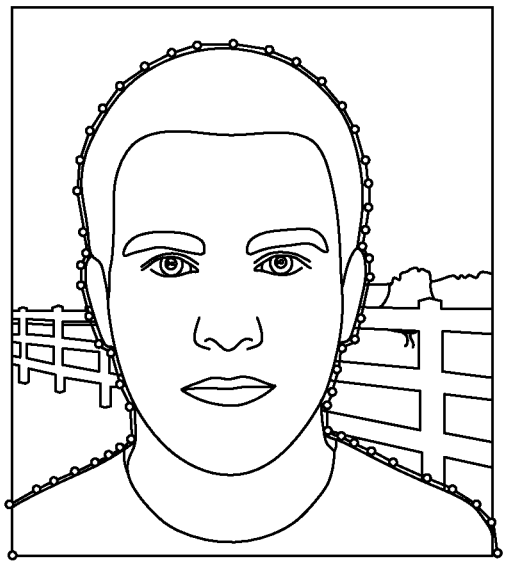
FIGS. 2A-2B is illustrate examples where an object is isolated utilizing a path line.
Figure 2B:
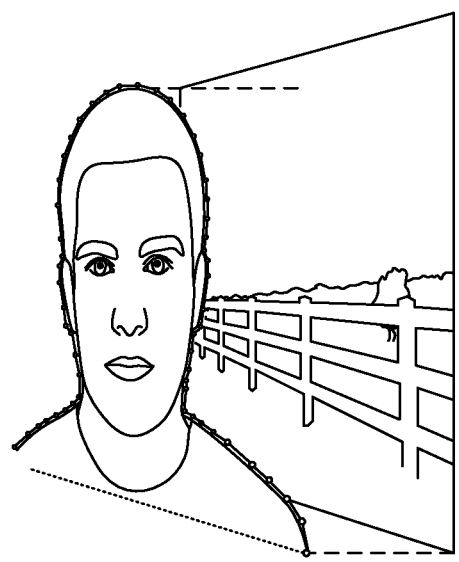

FIG. 2A illustrates an example of an image where object isolation is initiated using a path line. FIG. 2B illustrates a perspective view of an image showing one embodiment of the object isolation using a path line. FIG. 2A and FIG. 2B illustrate a display of a result of using the drawing tools for object isolation. FIG. 2A and FIG. 2B depict a person after the complete outline has been drawn. In embodiments, the user may now commit the defined path line to the memory of the system, thereby creating an isolated object.

Figure 3A:
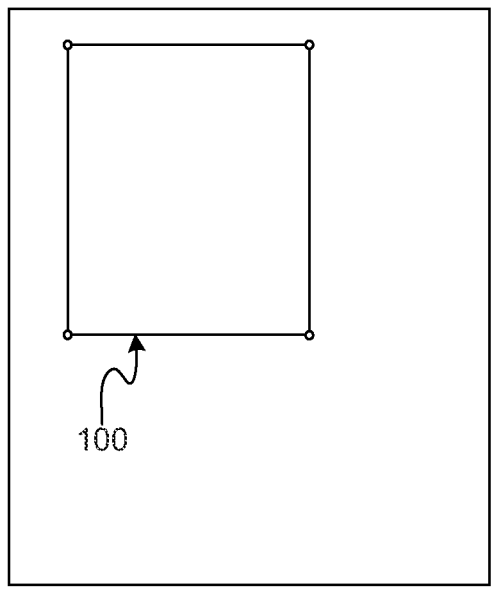
FIGS. 3A-3C illustrate examples of a path replace operation.
Figure 3B:
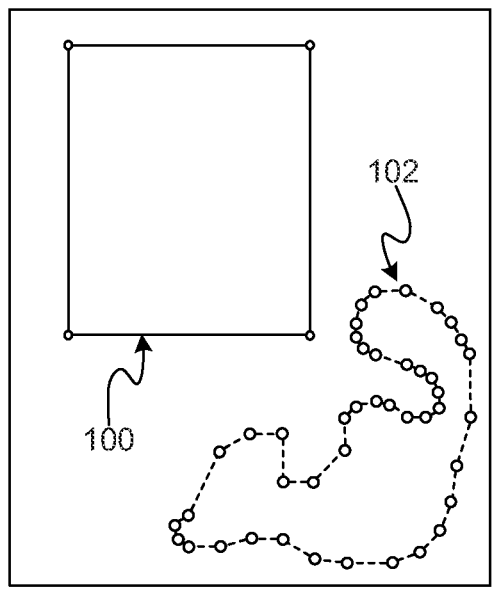
Figure 3C:
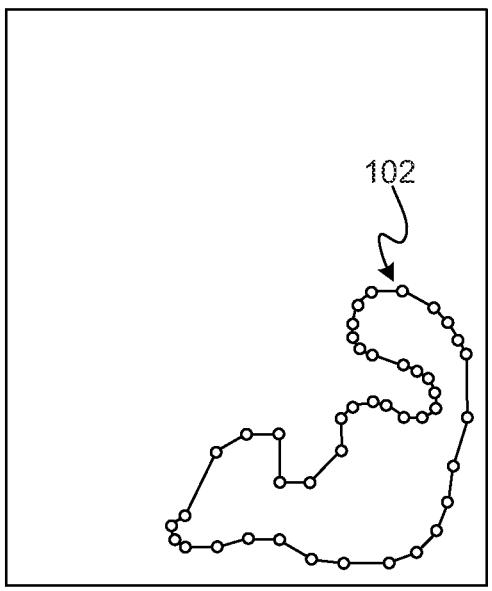

Alternatively, in embodiments of a replace operation, the user may also replace the path line of a selected, preexisting object with a newly drawn outline. FIG. 3A is an illustration of an image illustrating an outline 100 before a path replace operation. FIG. 3B is an illustration of an image illustrating a new outline 102 during a path replace operation. FIG. 3C is an illustration of an image illustrating the new outline 102 after the path replace operation. FIGS. 3A to 3B show how the original outline 100 has been replaced with outline 102.

Figure 4A:
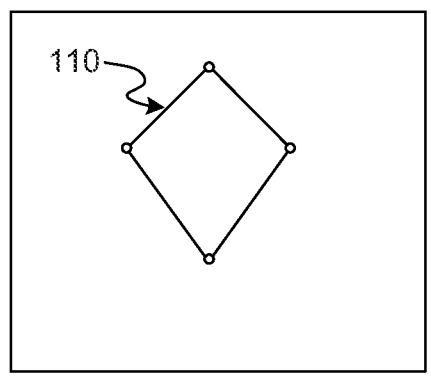
FIGS. 4A-4C illustrate examples of an additive trim operation.

In addition, in embodiments, the user can perform a trim operation that allows the user to draw a line that intersects the path line of a pre-selected and existing object in at least two places, and, via a simple interface, commit the drawn line as a replacement of the preexisting path line between the two outermost intersections. This trim operation can be additive, subtractive, or both. FIG. 4A is an illustration of an image of an object before an additive trim operation.

Figure 4B:
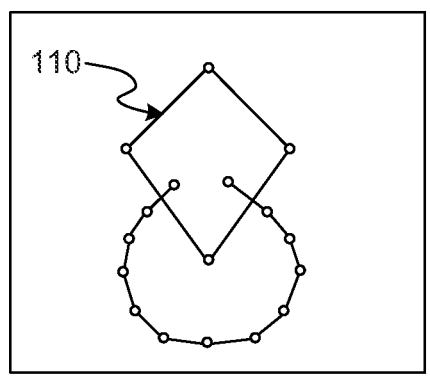
Figure 4C:
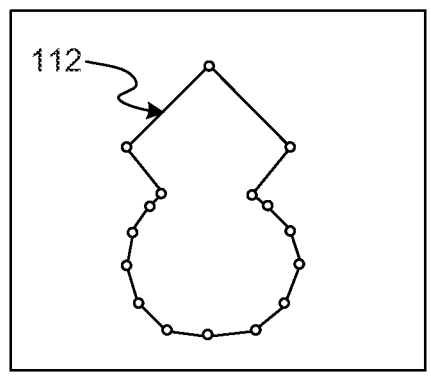

FIG. 4B is an illustration of an image of an object during an additive trim operation. FIG. 4C is an illustration of an image of an object after an additive trim operation. FIGS. 4A-4C show how original outline 110 has been expanded to outline 112 through an additive trim operation.

Figure 5A:
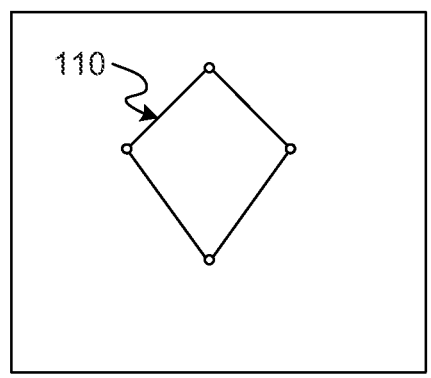
FIGS. 5A-5C illustrate examples of a subtractive trim operation.
Figure 5B:
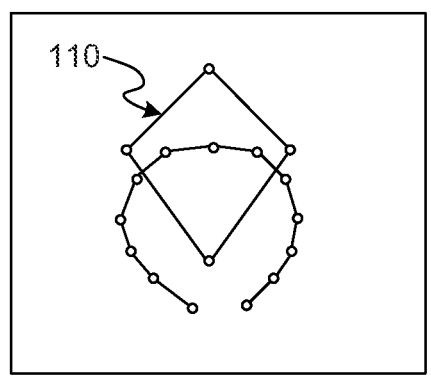
Figure 5C:
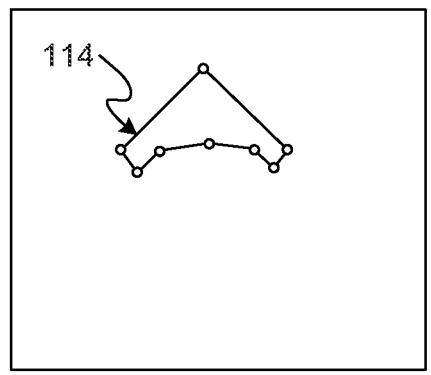

FIG. 5A is an illustration of an image of an object before a subtractive trim operation. FIG. 5B is an illustration of an image of an object during a subtractive trim operation. FIG. 5C is an illustration of an image of an object after a subtractive trim operation. FIGS. 5A to 5C show how original outline 110 has been cropped to outline 114 through a subtractive trim operation.

Figure 6A:
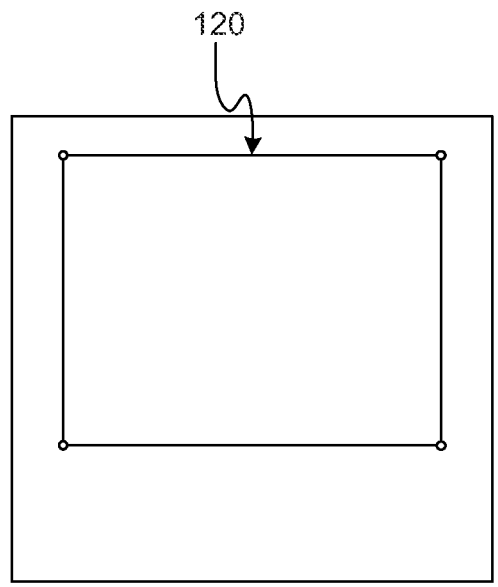
FIGS. 6A-6C illustrate examples of a combined trim operation.
Figure 6B:
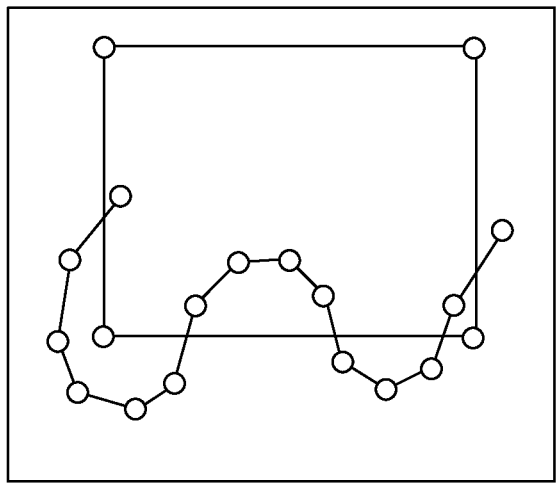
Figure 6C:
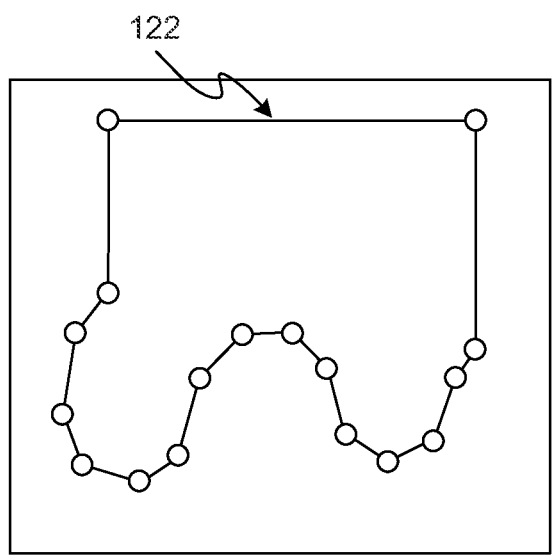

FIG. 6A is an illustration of an image of an object before a combined trim operation. FIG. 6B is an illustration of an image of an object during a combined trim operation. FIG. 6C is an illustration of an image of an object after a combined trim operation. FIGS. 6A to 6C show how original outline 120 has been changed to outline 122 through a combined trim operation.

Figure 7:
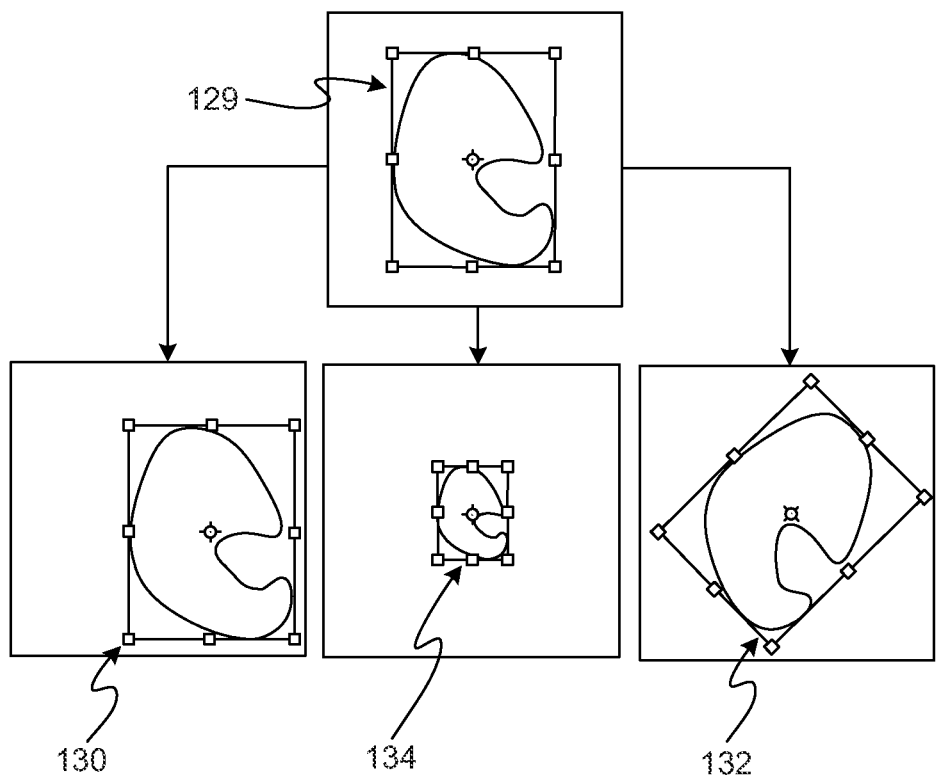
FIG. 7 illustrates an example of a transform operation.

If the user does not want to change the number of points that defines an object path line, but still wants to modify the position of various points along the path line, the techniques discussed herein includes methods for isolating and translating existing points to new positions. One such method is the transform method. FIG. 7 is an illustration of images showing an embodiment of a transform operation. To use transform mode, the user typically has access to and selects a preexisting object. In transform mode, all points along the path line 129 are typically modified at once, using such methods as a translation in horizontal or vertical position 130, a rotation around a defined point 132, or a change in scale emanating from a defined point 134, as shown in FIG. 7.

Figure 8A:
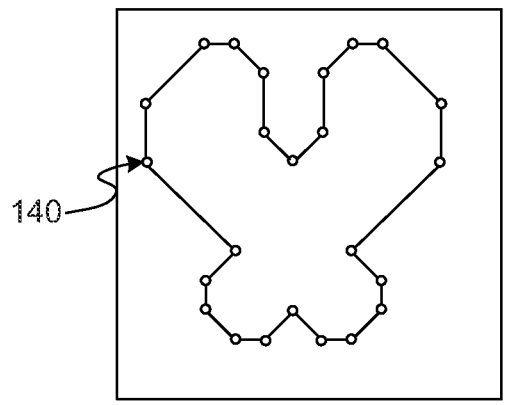
FIGS. 8A-8C illustrate examples of a warp operation.
Figure 8B:
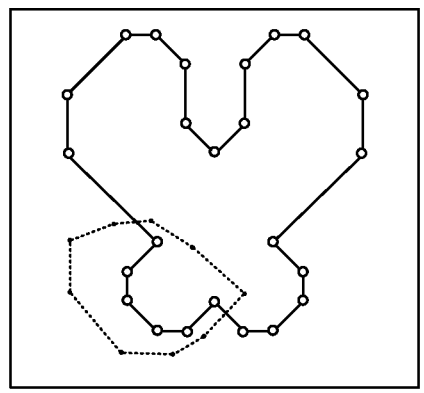
Figure 8C:
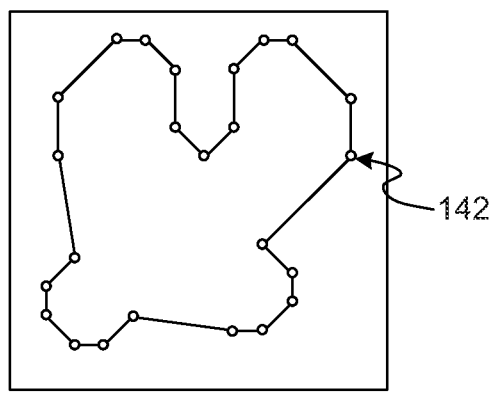

In scenarios where a portion of the points along the path line are to be modified, a warp method may be used. The warp method allows for the same transformation of points as transform mode, but it only affects a defined group of points, which are typically selected by the user. The point selection is usually defined as all the points that fall within an outline that was drawn by the user using the drawing tool. FIG. 8A is an illustration of an image showing an object before a warp operation. FIG. 8B is an illustration of an image showing an object during a warp operation. FIG. 8C is an illustration of an image showing an object after a warp operation. As shown in FIGS. 8A to 8C, outline of object 140 has been warped into outline of object 142 through a warp operation.

Figure 9A:
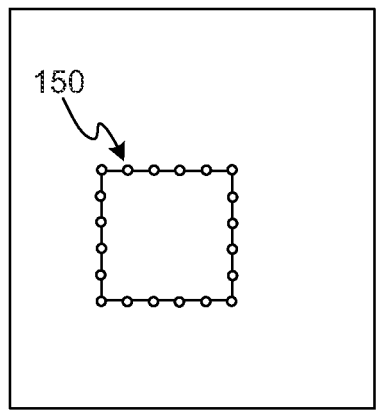
FIGS. 9A-9C illustrate examples of a nudge operation.
Figure 9B:
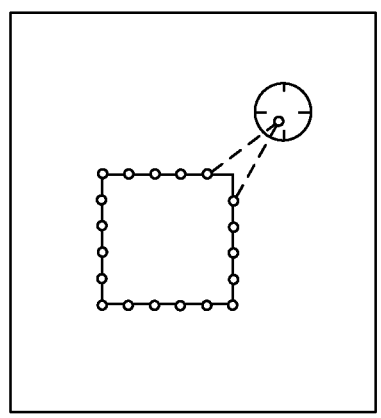
Figure 9C:
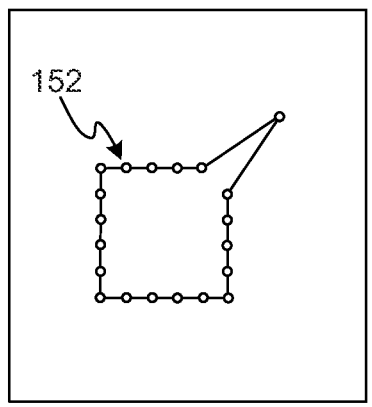

In scenarios where the user wishes to modify points at an individual level, the nudge method should be used. In embodiments, the nudge method uses a circular cursor 149, which, when place over the top of a point or points, selects one or more points and allows the user to move those selected points. FIG. 9A is an illustration of an image showing an object before a nudge operation. FIG. 9B is an illustration of an image showing an object during a nudge operation. FIG. 9C is an illustration of an image showing an object after a nudge operation. FIGS. 9A to 9C show outline 150 with a corner nudged to create outline 152.

In embodiments, the defined path line is scan converted to aid the computer in defining whether a pixel is to be included in the segmented object or not, allowing for pixel level segmentation. The drawing tool represents an input method that comes naturally to humans, and therefore offers a fast and easy to learn method for defining object segmentation. The versatility of the drawing tool for object modification extends to every line and point that can be drawn with the drawing tool, which means that the user does not need to switch tools to access features, further increasing the efficiency by which the user can define and segment objects.

Spline Creation Tools

Figure 10A:
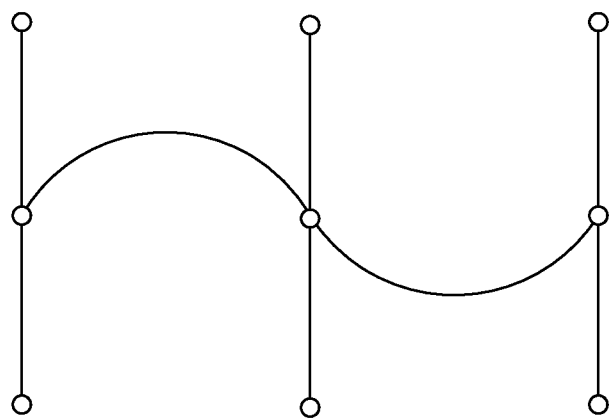
FIGS. 10A-10C illustrate examples of a piecewise interpolation of a Bezier spline.
Figure 10B:
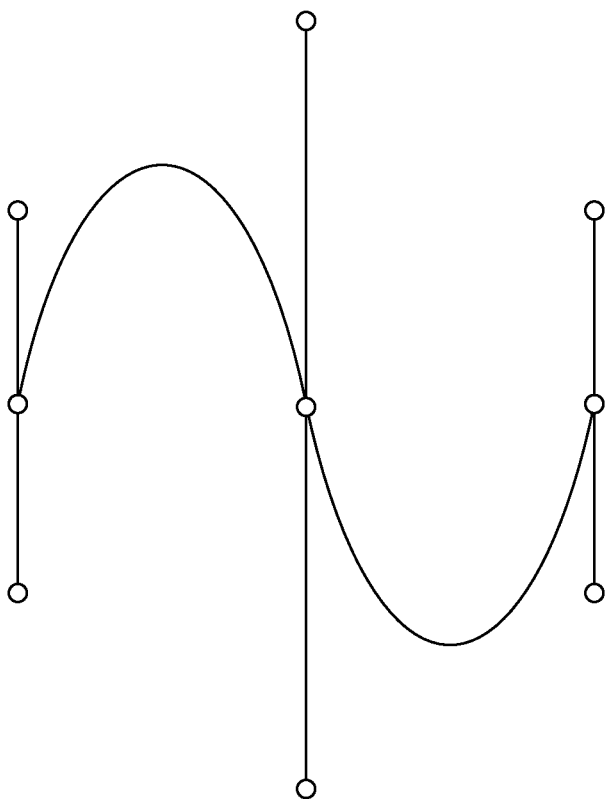
Figure 10C:
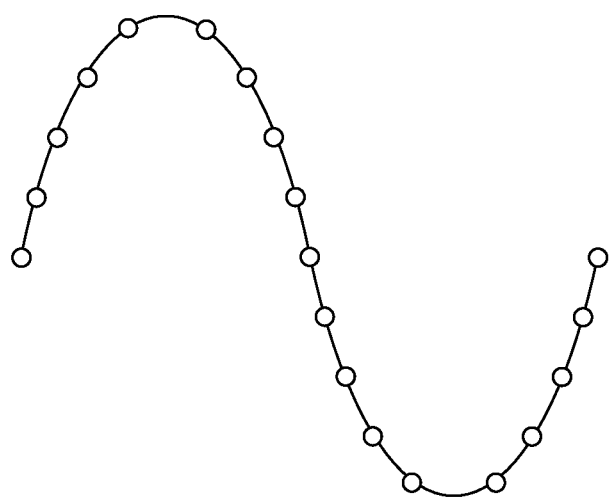

The spline creation tools typically require analog user input, such as the movement of a pen on a digitizing tablet, which are then translated to a cursor position on the image. In some scenarios, the user also engages the system and samples the cursor position and sets one or more anchor points. Once a set of anchor points are defined, a Bezier-function spline may be created between the set points. This allows users to create dynamic shapes in an infinite number of configurations, thus allowing the user to quickly and effectively isolate objects. These shapes can be redrawn on other frames of a clip, and the spline will interpolate based on the frames created. The positions of spline anchor points may be modified by the user after the interpolation has been run. FIG. 10A is an illustration of an image showing one embodiment of a piecewise interpolation of a Bezier spline. FIG. 10B is an illustration of an image showing another embodiment of a piecewise interpolation of a Bezier spline. FIG. 10C is an illustration of an image showing another embodiment of a piecewise interpolation of a Bezier spline.

In some scenarios, the user can also modify the Bezier anchor point weight to affect the curvature of the spline as it approaches the anchor point.

Figure 11A:
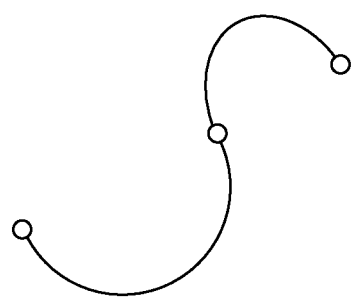
FIGS. 11A-11D illustrate exemplary images showing a detail level of a piecewise interpolation of a Bezier spline.
Figure 11B:
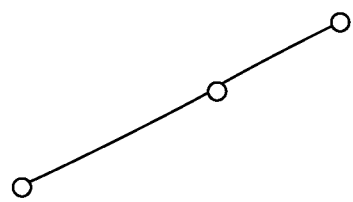
Figure 11C:
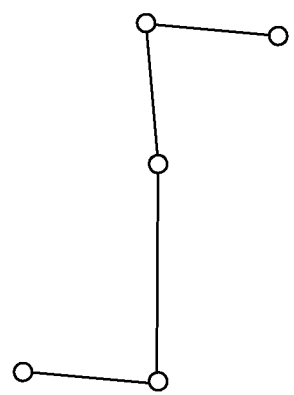
Figure 11D:
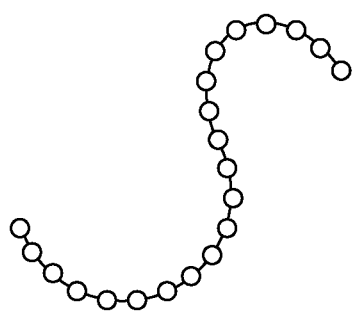

In embodiments, the techniques disclosed herein includes piecewise conversion of a Bezier spline to a linear path line, allowing the spline to be affected by trimming and warping operations, and at the same time creating points that can be used for 3D mesh generation. The number of additional points between the Bezier anchor points defines the accuracy of the path line, but also the computational load the path line represents, and can thus be increased or decreased by the user to set a suitable balance. FIG. 11A is an illustration of an image showing a detail level of a piecewise interpolation of a Bezier spline. FIG. 11B is an illustration of an image showing a detail level of a piecewise interpolation of a Bezier spline. FIG. 11C is an illustration of an image showing a detail level of a piecewise interpolation of a Bezier spline. FIG. 11D is an illustration of an image showing a detail level of a piecewise interpolation of a Bezier spline. FIGS. 11A to 11D show how the number of points set by the user define the accuracy of the path line. The defined spline is scan converted to aid the computer in defining if a pixel is to be included in the segmented object or not, allowing for pixel level segmentation.

In embodiments, splines may also be imported from external sources, such as third-party software packages that allow for the export of spline data in a value-separated list. Options for the import of a spline include: the option to scale the size of the spline relative to the image resolution, the option to import the spline only on specified frames of an image sequence, and the option to increase the point count of the piecewise linear interpretation of the spline. Imported splines may be used to create or overwrite, for example, the following types of splines: object path lines, object holes, shape contour lines, and shape outlines.

Holes Used for Pixel Exclusion

Figure 12A:
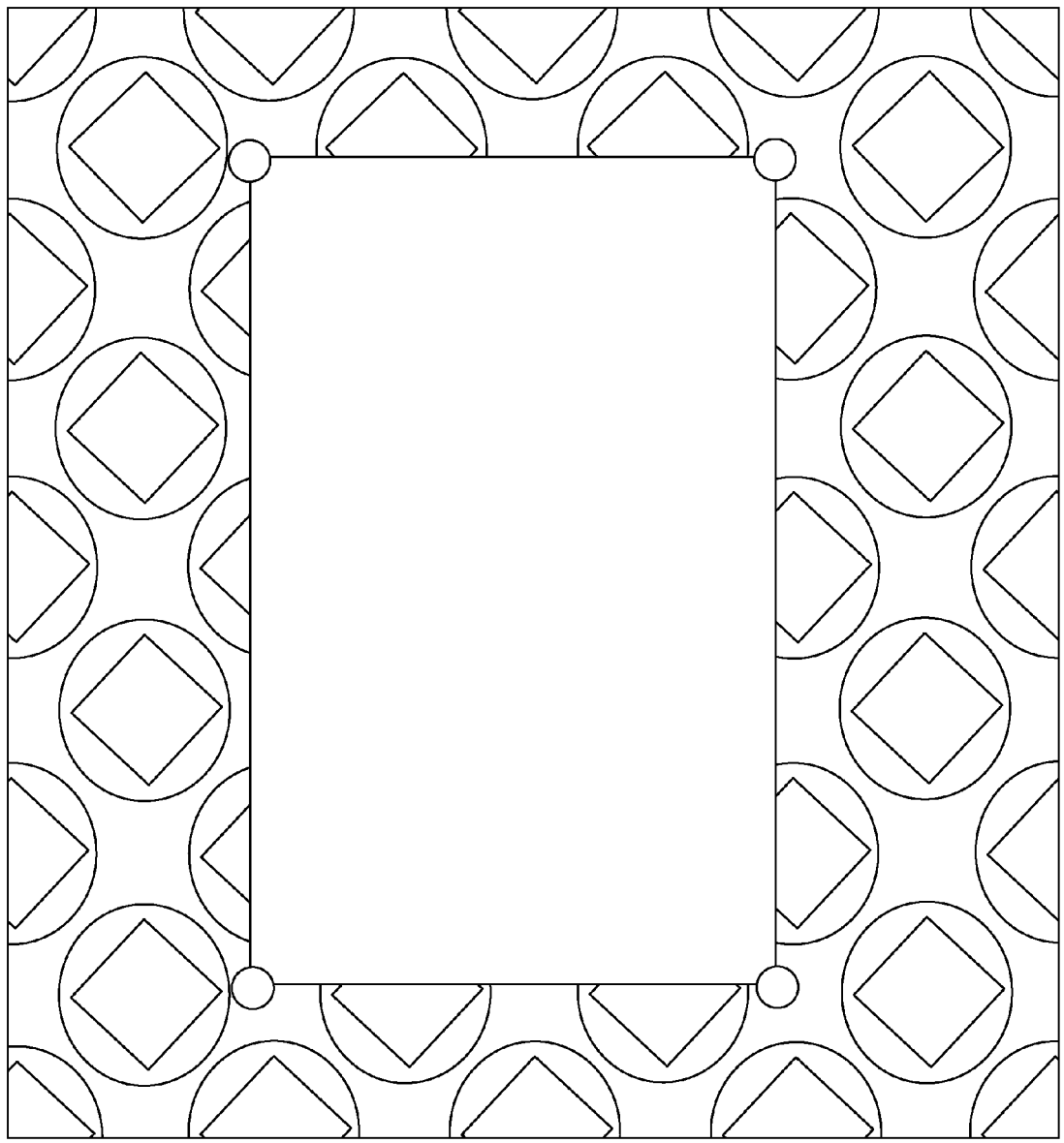
FIGS. 12A-13B illustrate examples of holes in images.
Figure 12B:
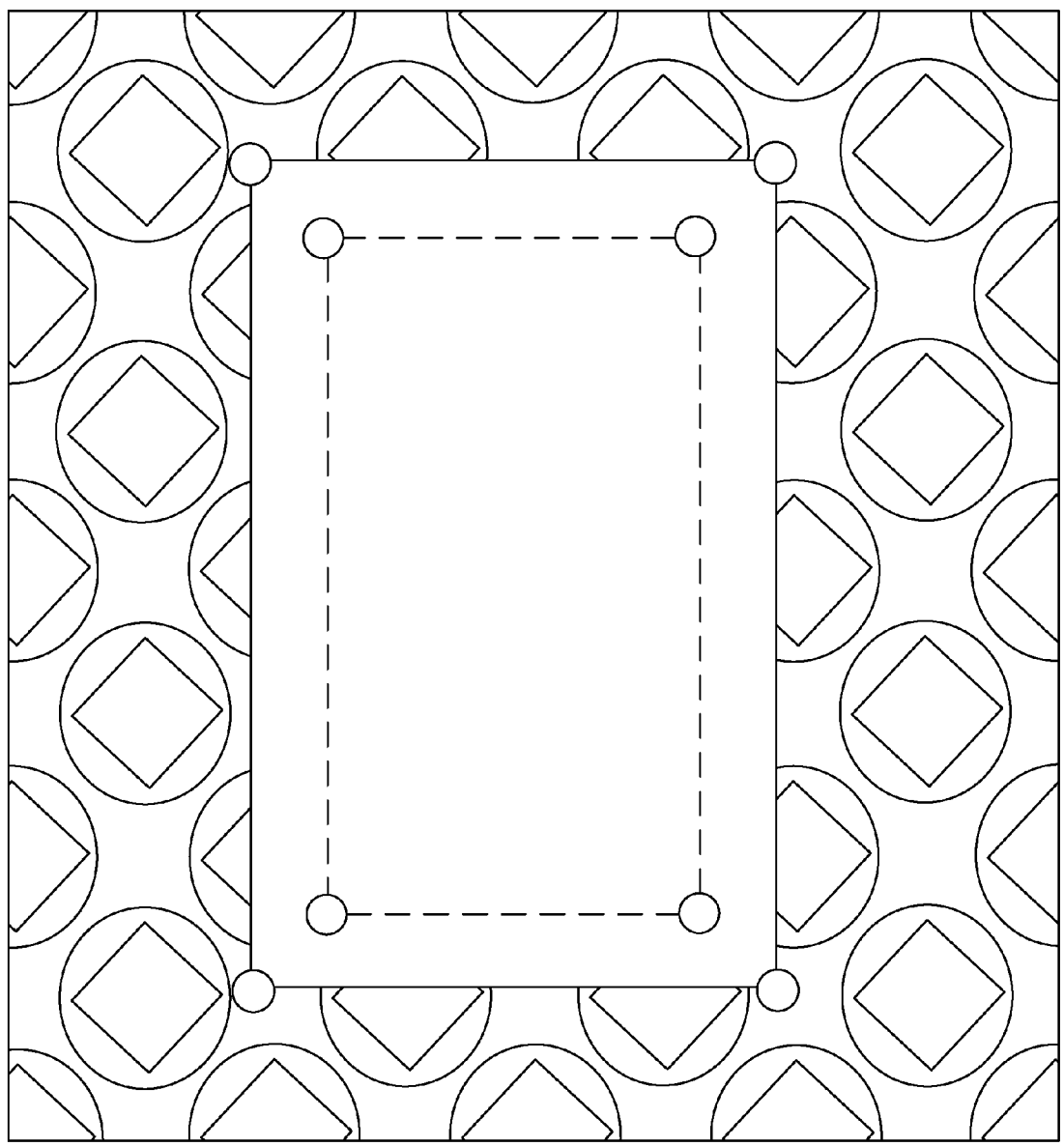
Figure 12C:
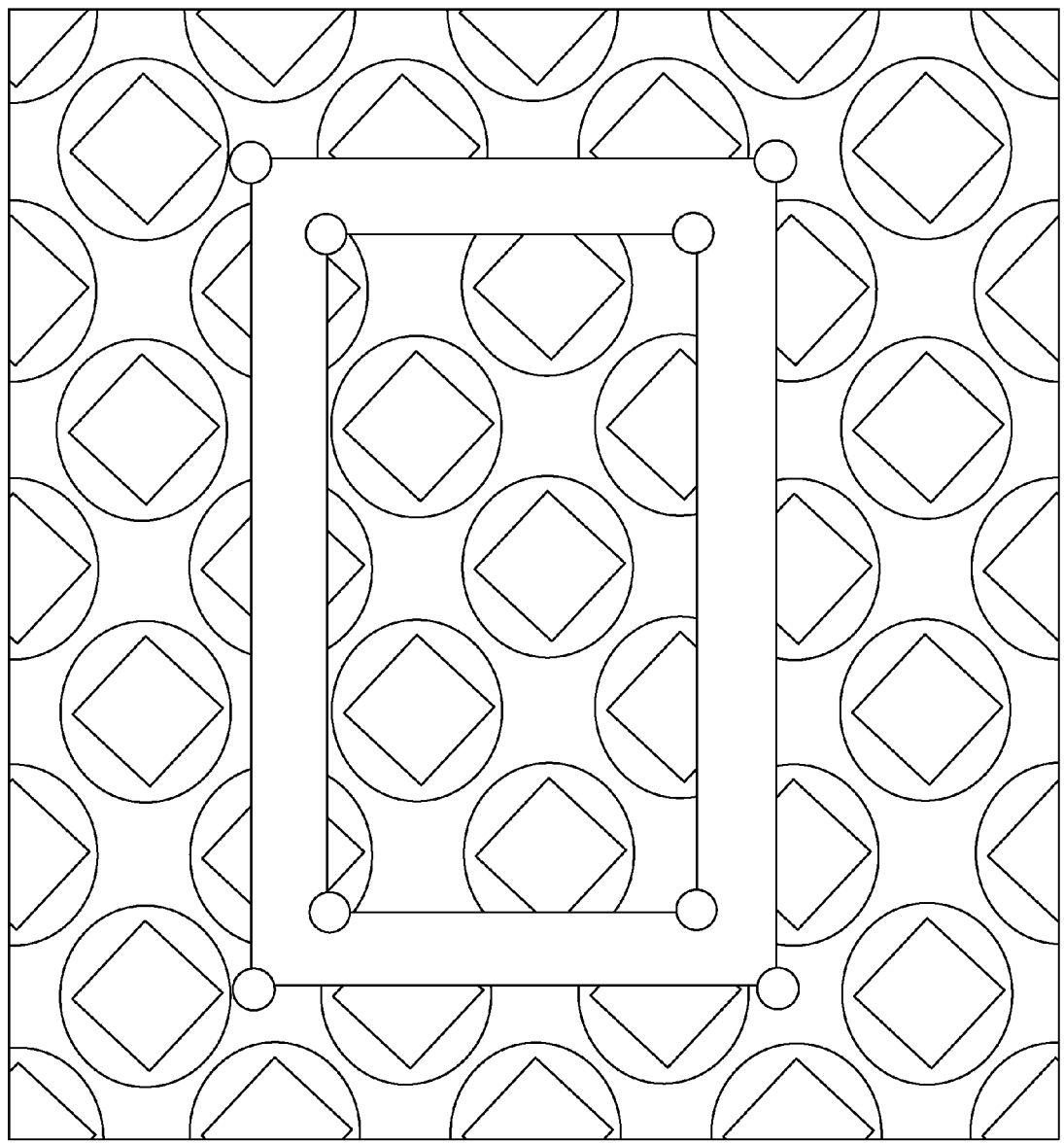

Similar to how drawn object path lines and splines work to specify a region of pixels to be grouped together within an object, a hole works to exclude pixels from that same object. In embodiments, holes are created in the same manner as object path lines. One difference, however, is that the hole must be associated with a preexisting object path line. In some scenarios, this is done by selecting the object that is the intended recipient of the hole, drawing the hole's path line, and executing. The hole's path line is associated with the selected object, and any pixels contained within the confines of the hole's path line are no longer affected by calculations applied to the rest of the pixels in the object. Any number of holes may be associated with an object. Preferably, a hole's path line that goes outside the confines of the object path line has an effect only on the pixels shared between it and the associated object. FIG. 12A is an illustration of an image showing a hole. FIG. 12B is an illustration of an image showing a hole during creation. FIG. 12C is an illustration of an image showing a hole after creation.

Figure 13A:
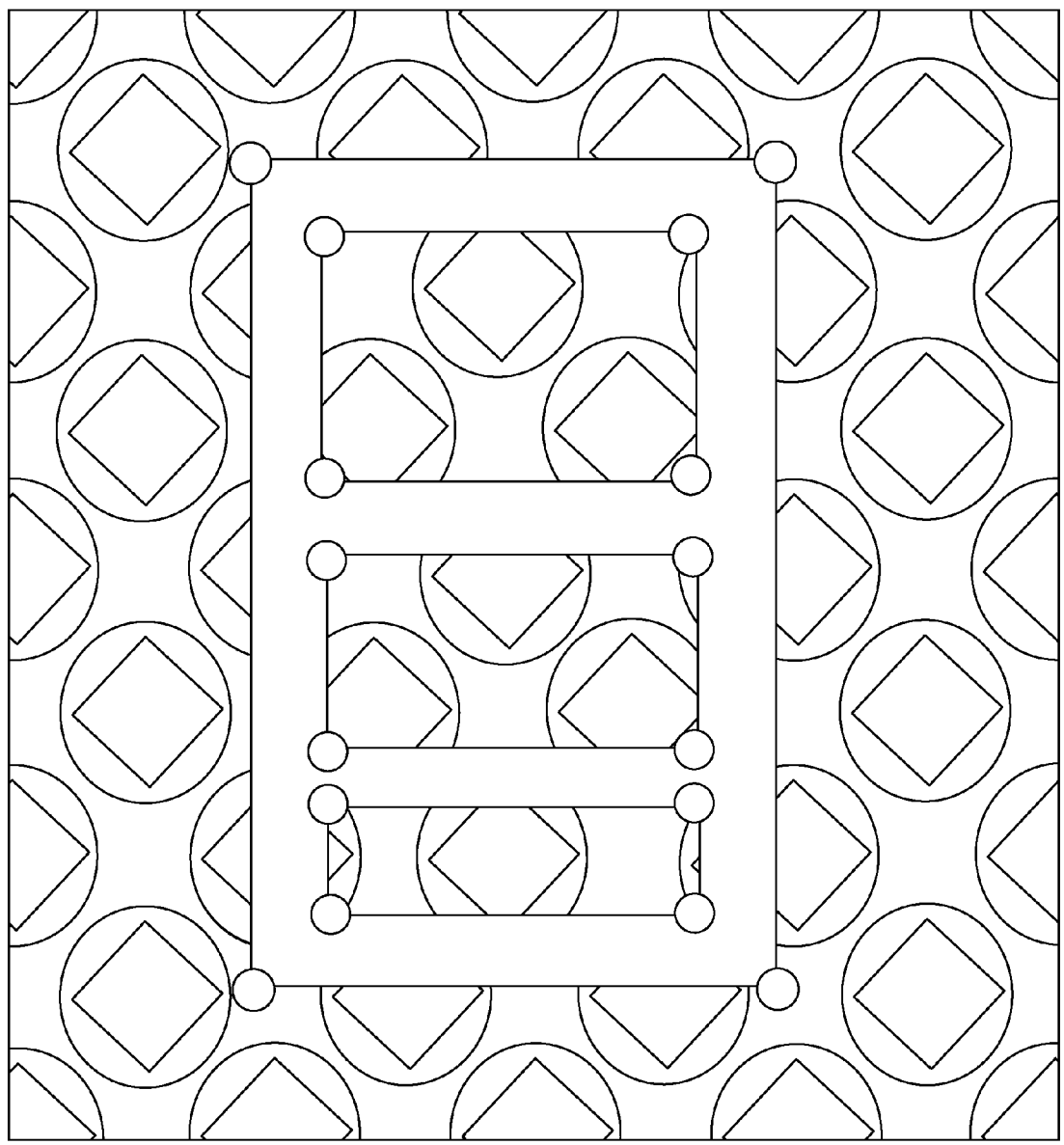
Figure 13B:
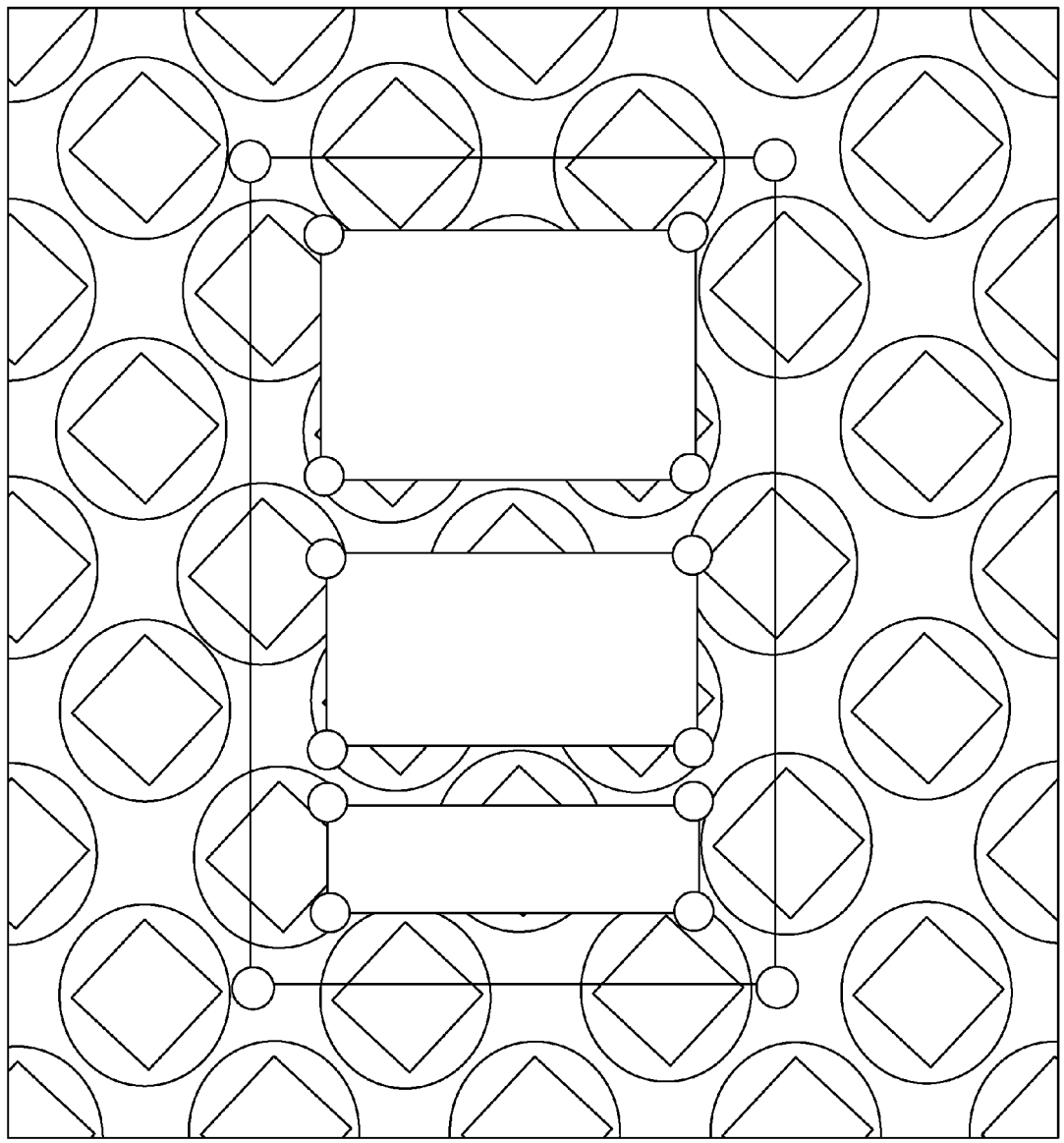

A secondary use of the hole feature is to invert the effect, so that pixels outside the hole path line are unaffected by object depth calculations, and only the pixels inside the hole path line are affected. FIG. 13A is an illustration of an image showing a hole. FIG. 13B is an illustration of an image showing an inverted hole.

Pixel Transparency as a Result of Edge Feather Parameter Modification

Figure 14A:
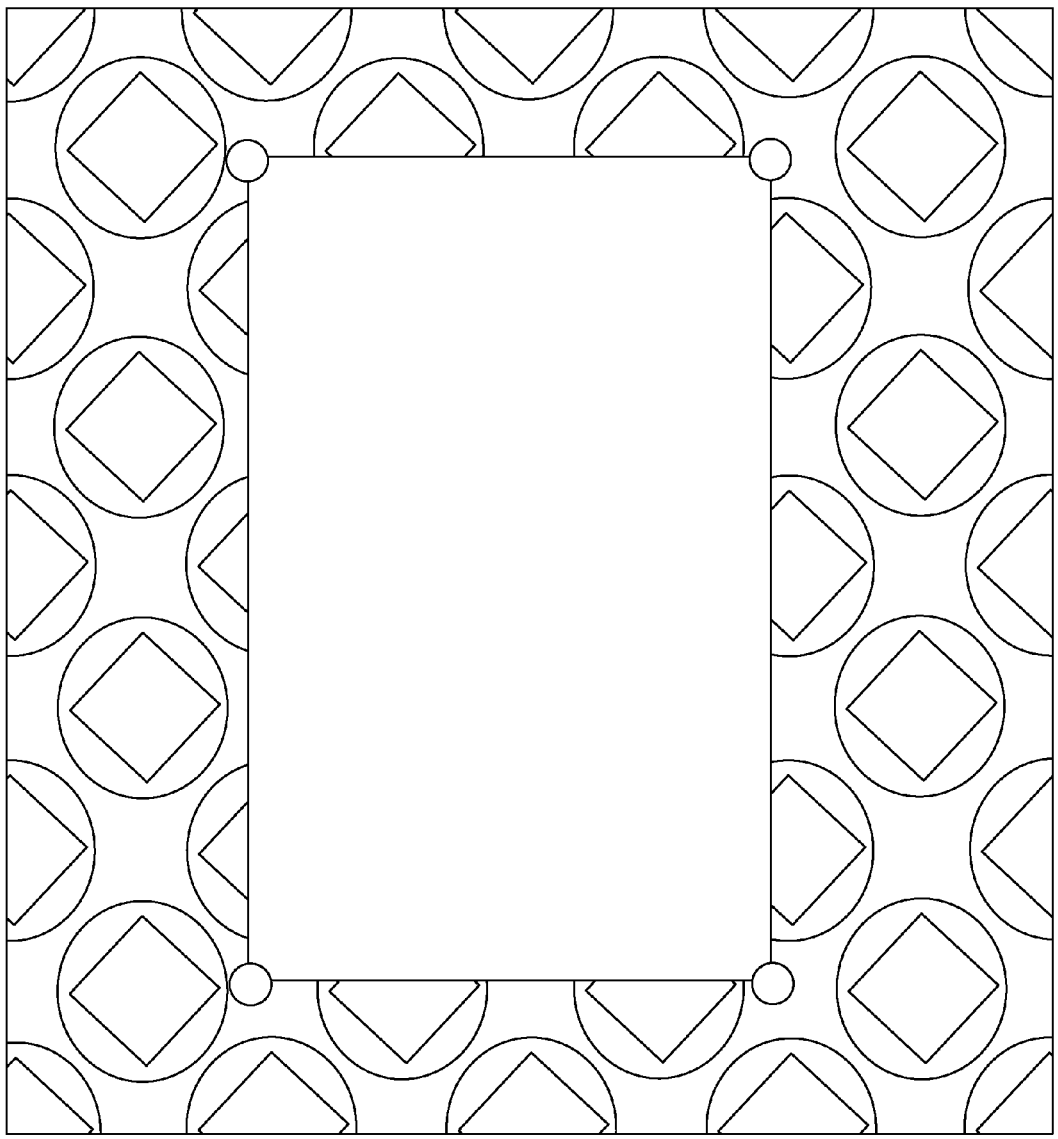
FIGS. 14A-14B illustrates examples of transparency in images.
Figure 14B:
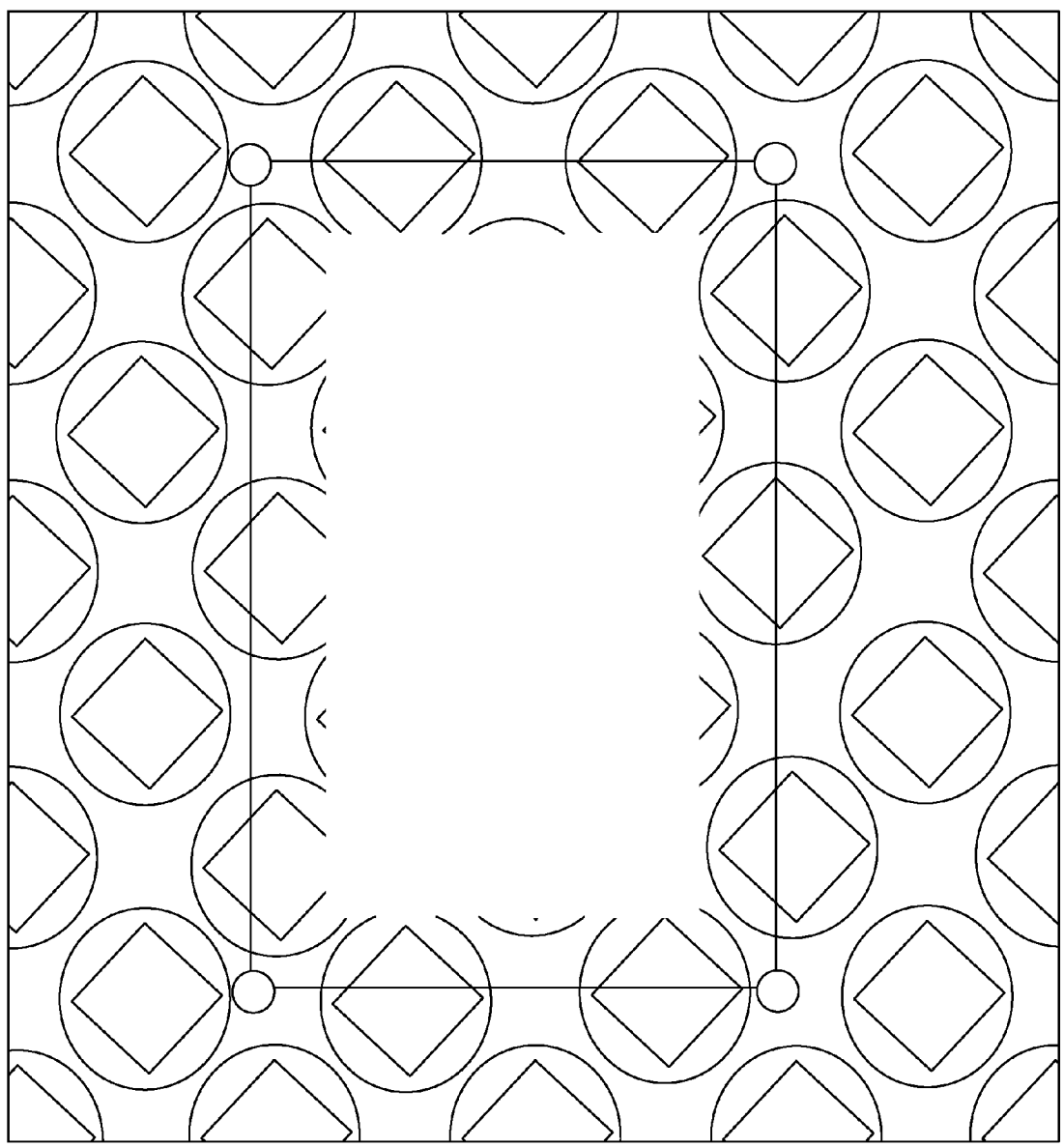

By default, an object path line is a hard edge, which means that the pixels inside the line are affected by modifications to the object, and pixels outside the line are not. However, if a gradual increase of the effects of modification to the object is desired, the user can do so by changing the edge feather value. By increasing the edge feather value, the pixels inside the object path line will become semi-transparent near the edge, gradually becoming fully opaque towards the center of the object. The gradual change from transparent to opaque is preferably on a linear gradient. The distance between the transparent edge and the fully opaque pixels is directly related to the edge feather value. The transparency lessens the perceived effect the various pixel repositioning operations that may have been performed on the object. FIG. 14A is an illustration of an image showing an object before a transparency is created. FIG. 14B is an illustration of an image showing an object with a transparency created by edge feathering.

Figure 15A:
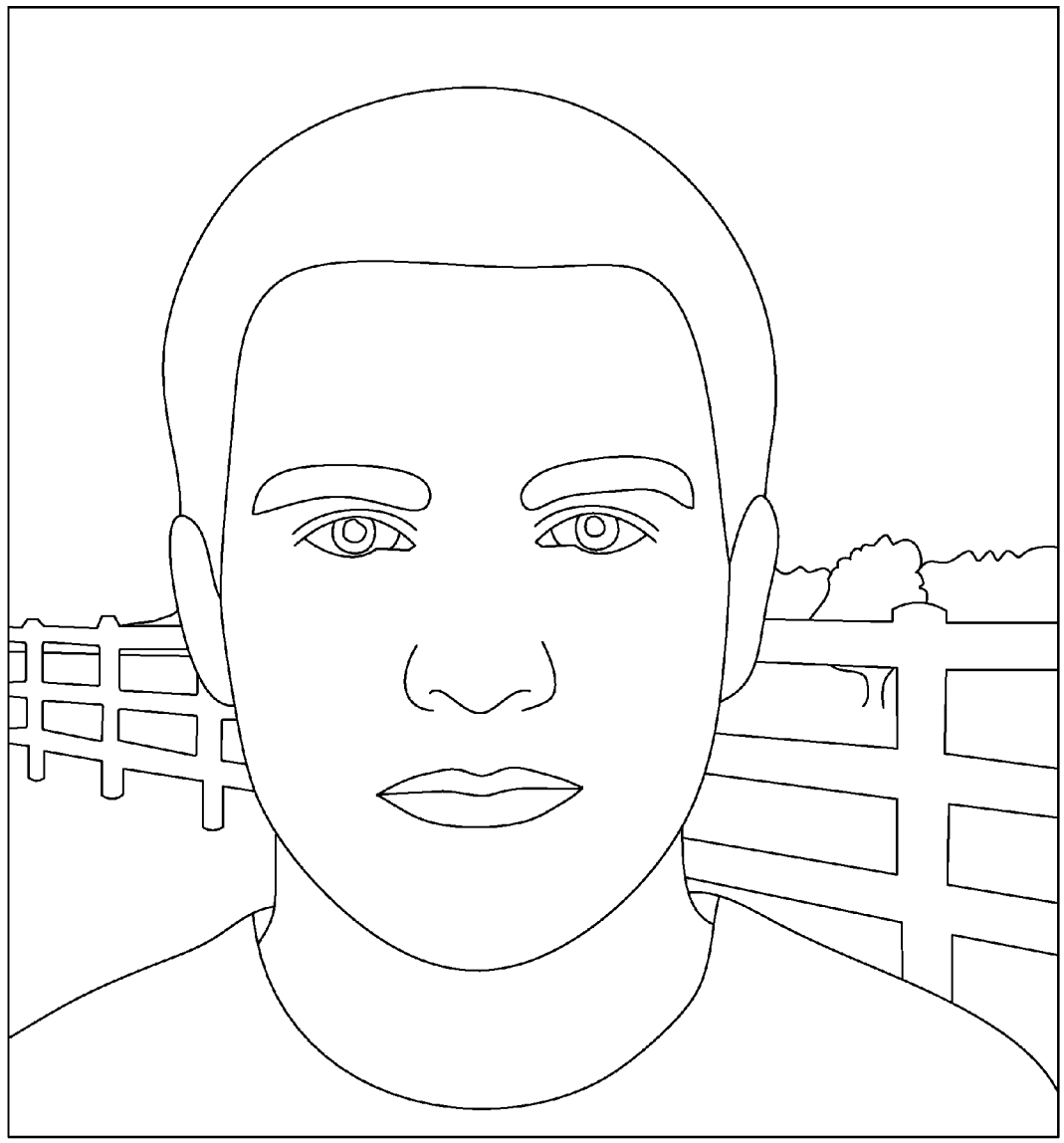
FIGS. 15A-15C illustrate examples of object isolation in an image using an imported alpha channel.
Figure 15B:
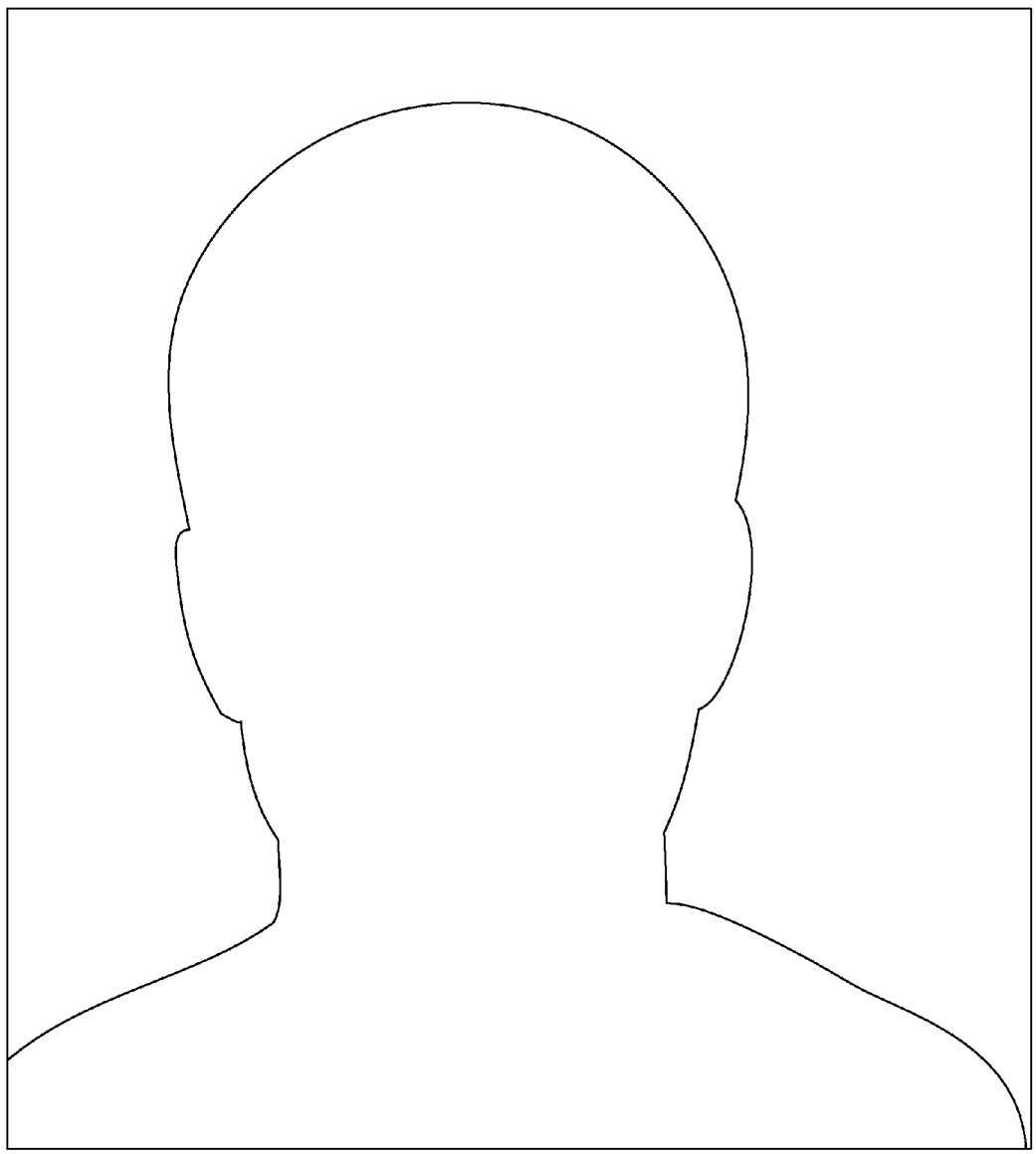
Figure 15C:
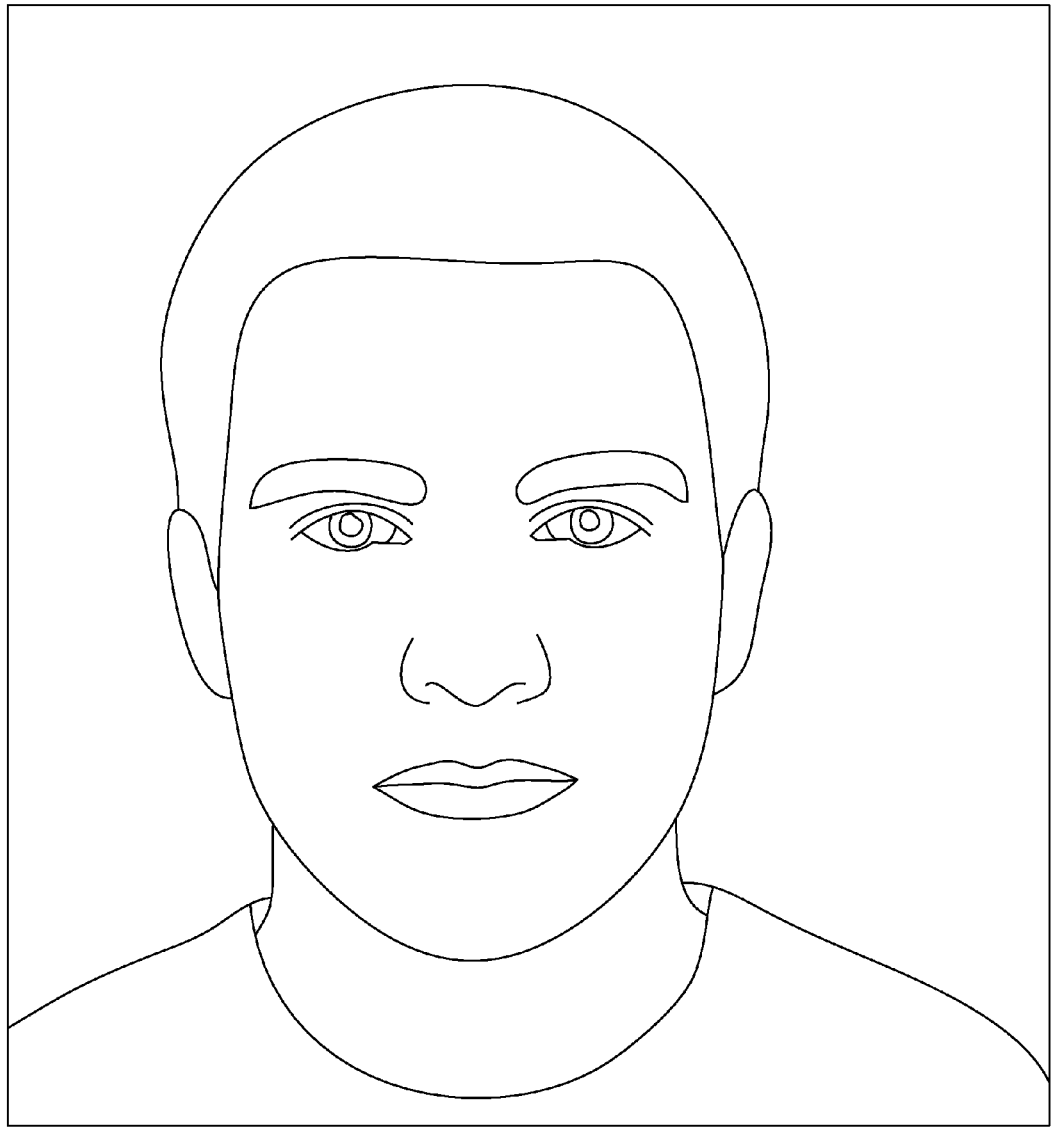

FIG. 15A is an illustration of an image before object isolation using an imported alpha channel. This represents only the original source footage. FIG. 15B is an illustration of an image during object isolation using an imported alpha channel. The black and white areas define the transparency information that will be applied to the shot in FIG. 15A. FIG. 15C is an illustration of an image after object isolation using an imported alpha channel. The image shows only the non-transparent areas as defined by the alpha channel in FIG. 15B.

Pixel Repositioning as a Result of Depth Parameter Modification.

Figure 16A:
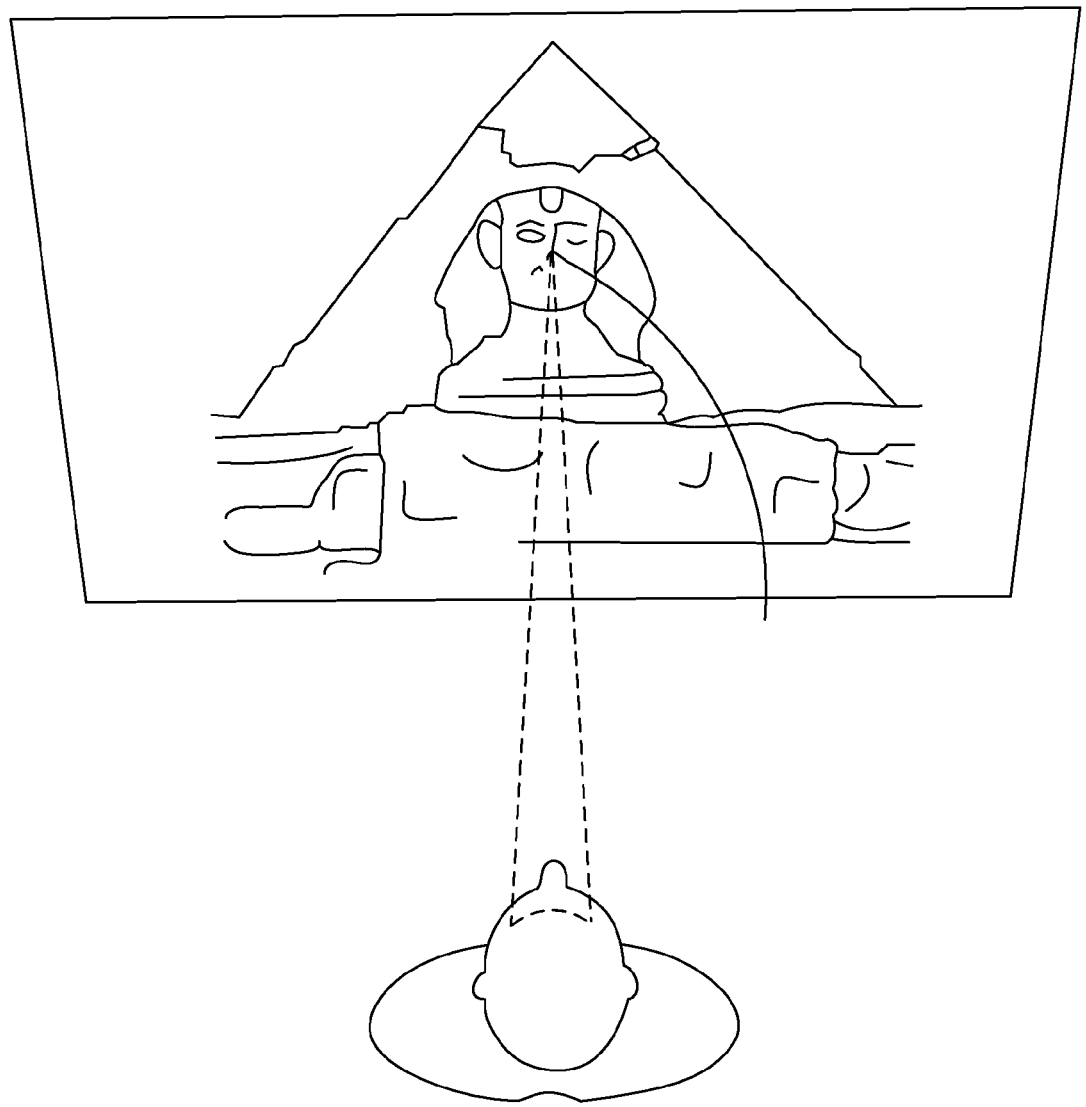
FIGS. 16A-16C illustrate examples of an object depth shift.
Figure 16B:
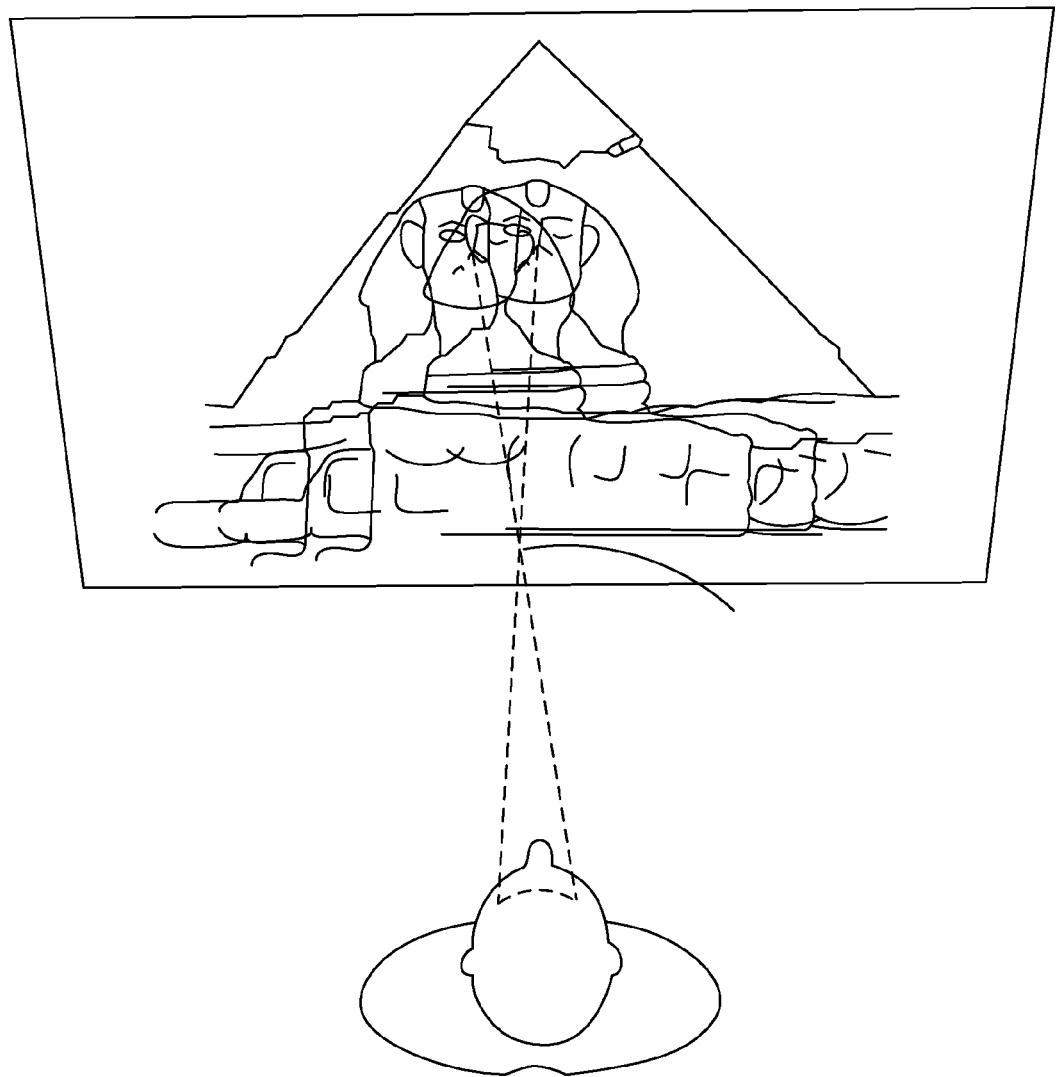
Figure 16C:
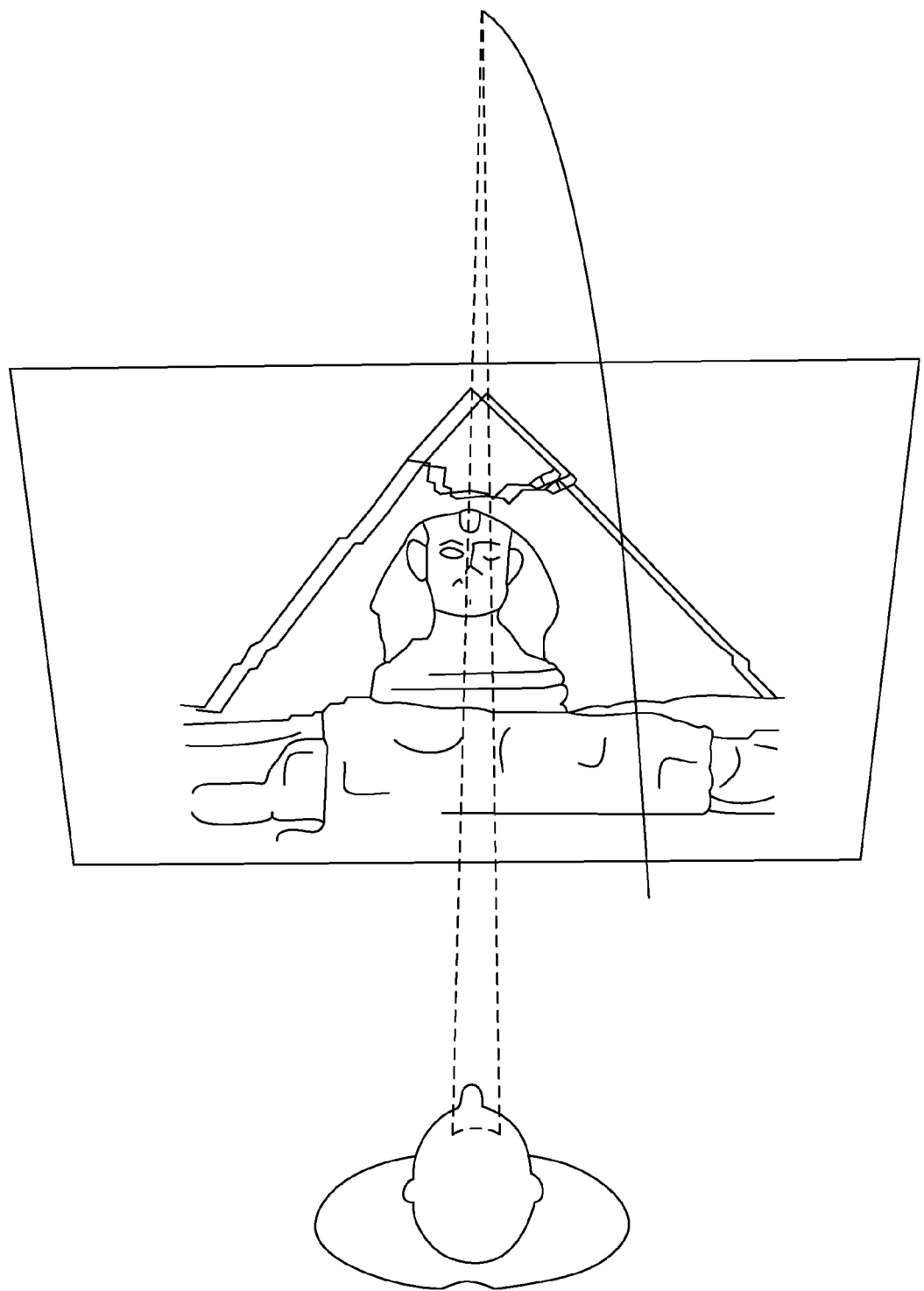
Figure 17A:
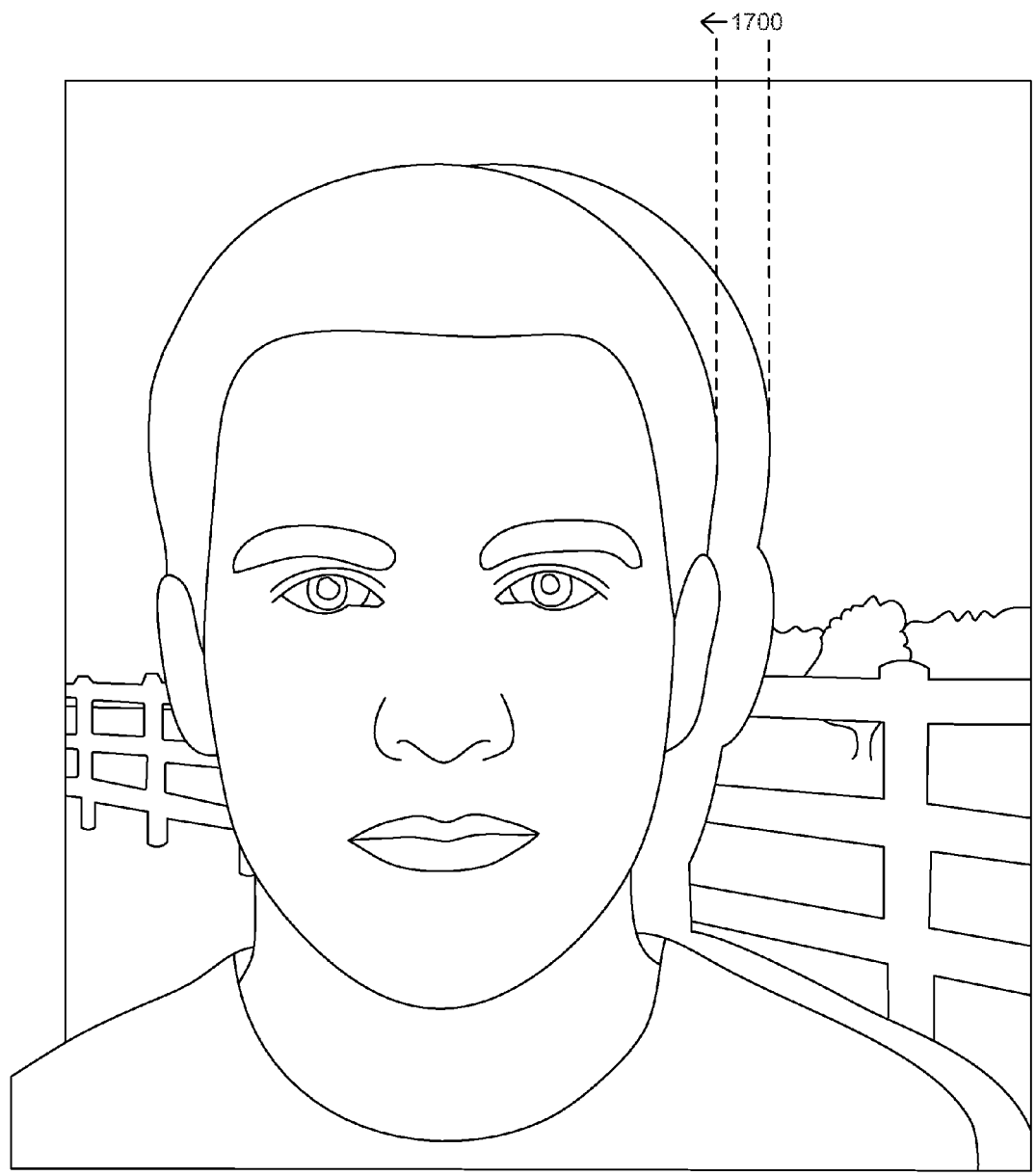
FIGS. 17A-17B illustrate examples of a horizontal object shift.
Figure 17B:
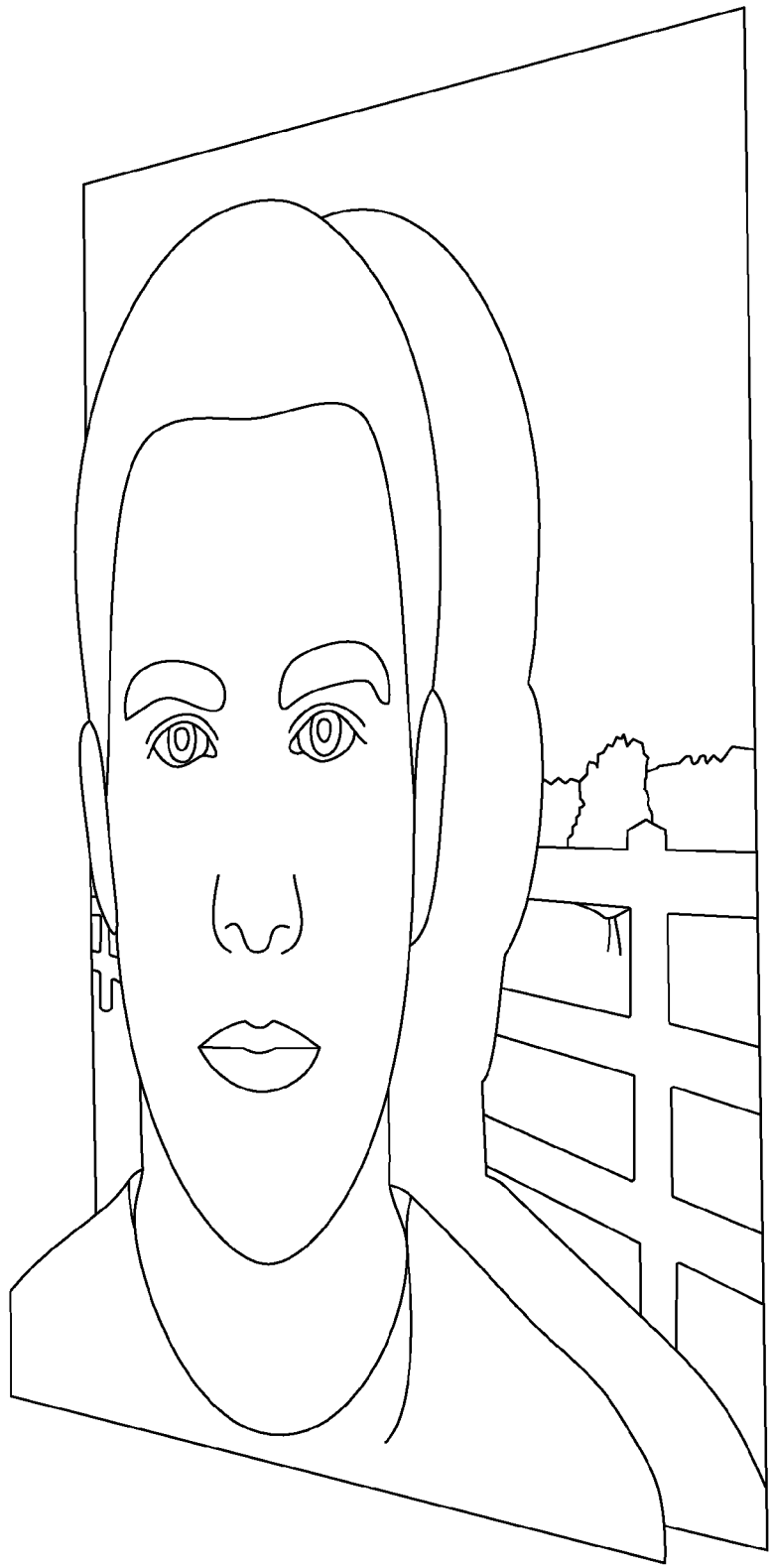
Figure 18A:
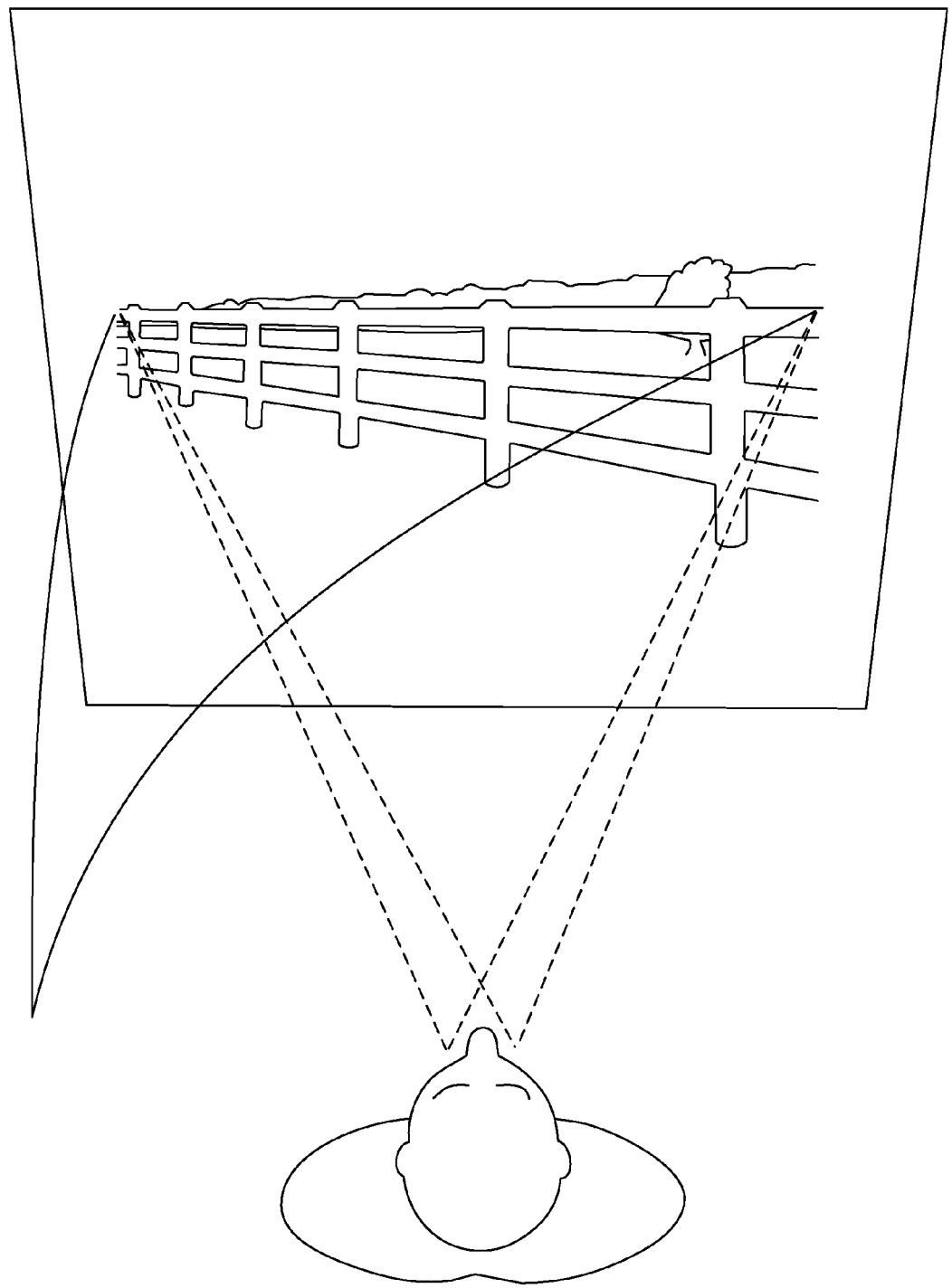
FIGS. 18A-18B illustrate examples of an image and viewer depicting object perspective shifts.
Figure 18B:
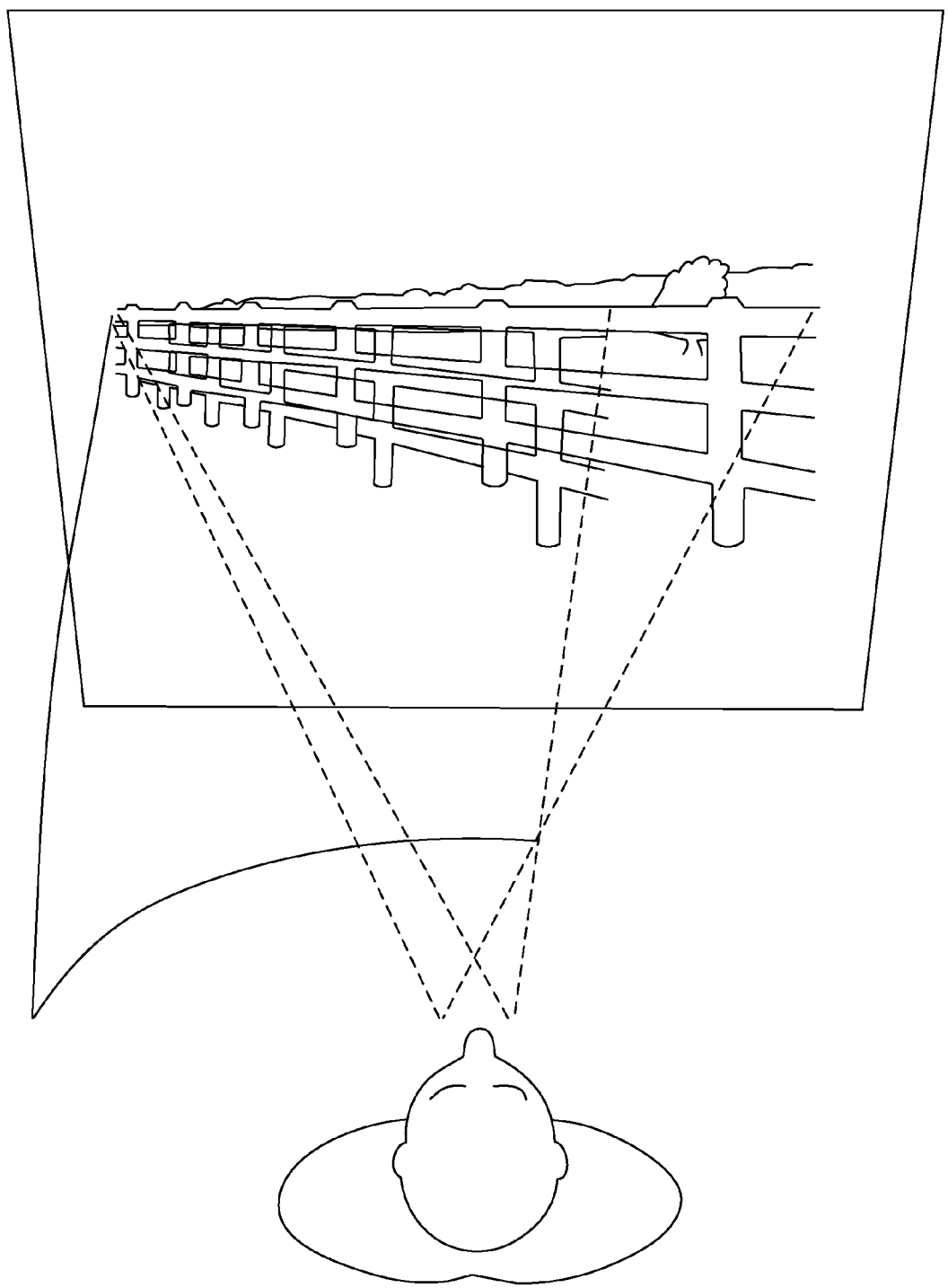

The following description now describes various techniques related to depth creation and shaping. One methodology for creating depth is to shift entire regions of pixels horizontally. To achieve this in a user friendly fashion, the techniques presented herein include the ability to reposition pixels via a depth parameter adjustment. In embodiments, a single object path line or a plurality of object path lines are selected, and associated with a depth parameter value. The depth parameter value is directly equivalent to the amount of horizontal shift to the region of pixels isolated by the object path line(s). The depth parameter value can be a negative value, in which case the depth of the pixel region will appear to project forward, or a positive value, in which case the depth of the pixel region will appear to recede backward. The depth parameter value can be set to sub-pixel increments, and allows for a very fine and a very fast placement of objects in depth. FIG. 16 is an illustration of one embodiment of an object depth shift. FIG. 17A is an illustration of an image showing a horizontal object shift. FIG. 17B is an illustration of a perspective view of an image showing a horizontal object shift. FIG. 18A is an illustration of an image and viewer before an object perspective shift. FIG. 18B is an illustration of an image and viewer showing an object perspective shift.

Perspective Drawing Tools and Parameters for Pixel Skewing.

In order to represent continuous, linear changes in depth, such as the perspective of objects approaching a vanishing point or horizon, pixel skewing is the preferred and simplest method. In embodiments, the pixel skewing is accomplished via a vector representation of perspective created with drawing tools and parameter adjustments. In some scenarios, the perspective vector is created and associated with an object. The perspective vector is drawn using the same tools used to create the object path line, wherein the first point drawn in the line becomes the initial point, the last point drawn becomes the terminal point, and the distance between them is the magnitude.

Figure 19A:
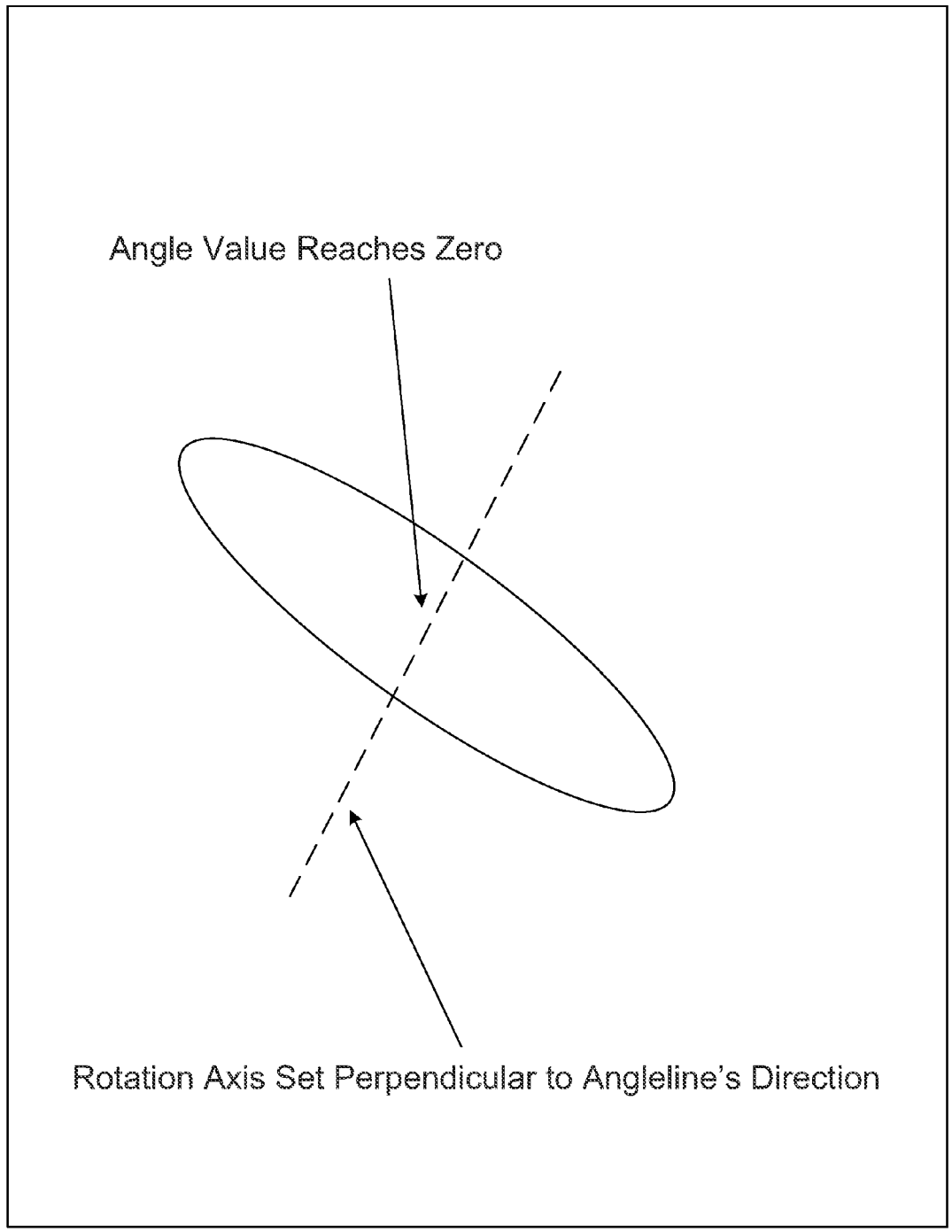
FIGS. 19A-19C illustrate examples of applying an object perspective vector.
Figure 19B:
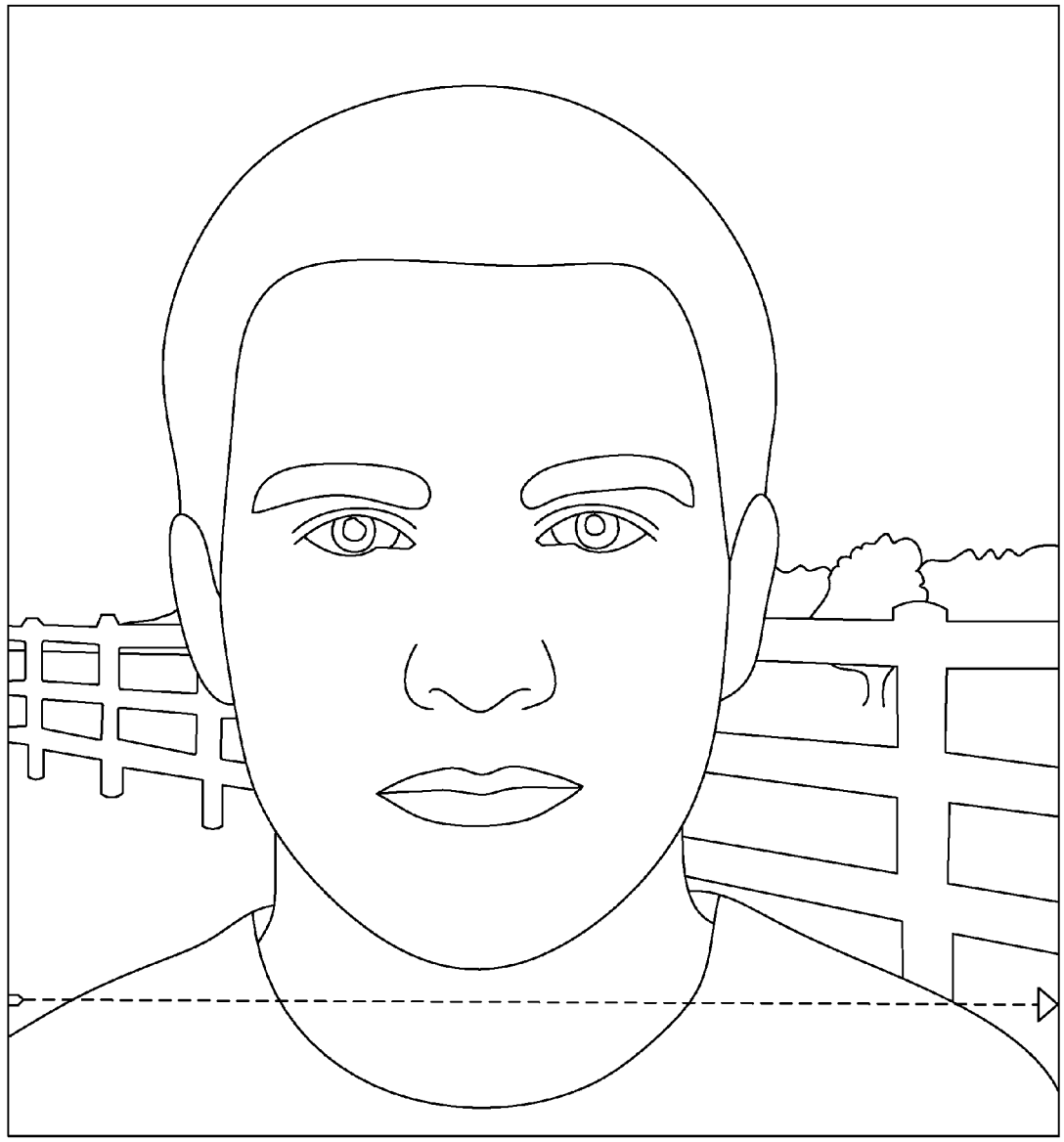
Figure 19C:
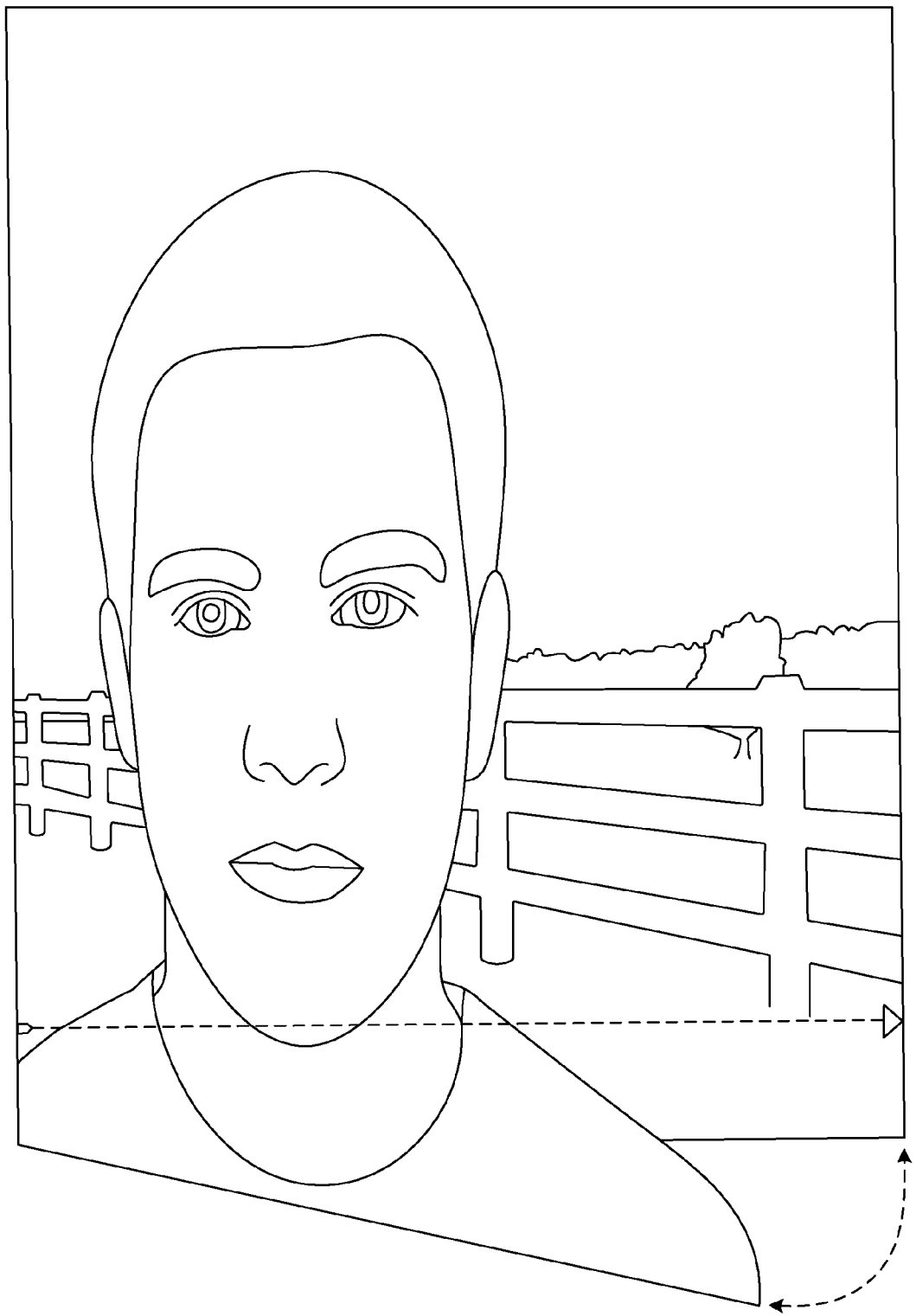

Once the perspective vector is associated with an object, a perspective amplitude parameter may be specified by the user. The perspective amplitude can be a negative value, in which case the depth at the terminal point will appear to project forward, or a positive value, in which case the depth at the terminal point will appear to recede backward. The initial point remains at the object's baseline depth, and is considered a pivot point. The difference between the depth at the terminal point and the depth at the initial point is equal to the perspective amplitude value. Although the perspective amplitude value only applies to the magnitude of the perspective vector, depth perspective is continued past the terminal point (in the same direction) and past the initial point (in the opposite direction). Therefore, the effect of perspective can be changed in three ways: (1) by moving the position of the perspective vector; (2) by changing the magnitude of the perspective vector; and/or (3) by changing the perspective amplitude. The perspective vector, when used in conjunction with the perspective amplitude parameter, allows for pixel skewing calculations. The result is a smooth, linear change in depth across the length or width of the object. FIG. 19A illustrates an example of an object perspective vector. FIG. 19B is an illustration of an image before applying an object perspective vector. FIG. 19C illustrates changes in the exemplary image after applying an object perspective vector.

Shape Contour Drawing Took and Parameters for Pixel Warping.

Figure 20:
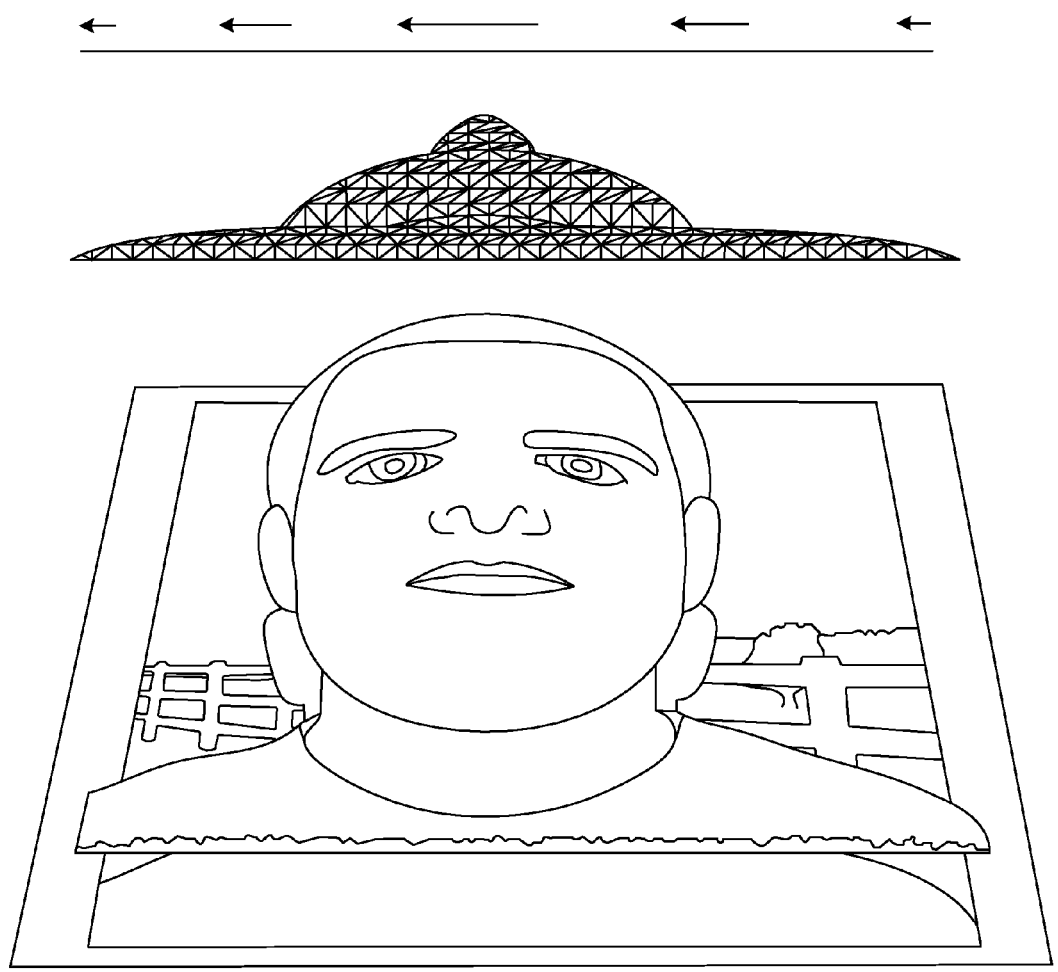
FIG. 20 illustrates an example of object shaping.
Figure 21:
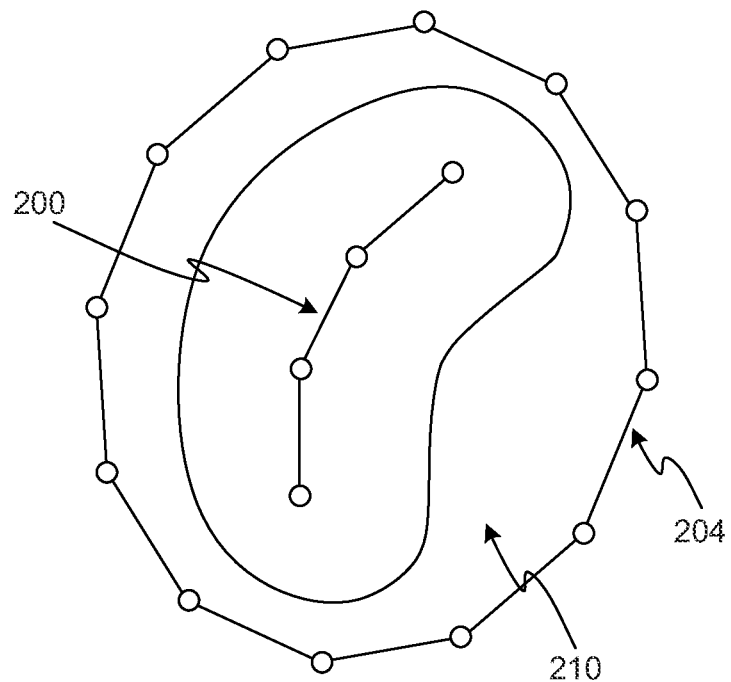
FIG. 21 illustrates an example of shaping elements use for object shaping.

To obtain high quality 3D images, few, if any objects in an image are, or should appear, completely flat in depth. Accordingly, it is a great benefit to the user to be able to easily warp pixels, because this creates the illusion of variable depth across the surface of an object. Accordingly, the techniques discussed herein further include the ability to warp pixels via shapes created with drawing tools and parameter adjustments. FIG. 20 is an illustration of an image showing object shaping. In embodiments, a shape contour line is created and associated with a shape outline. FIG. 21 is an illustration of one embodiment of object shaping elements. In at least some embodiments, the shape contour line 200 and shape outline 204 are drawn using the same tools that are used to create the object path line. This allows the user to input all of the same modifications, including replacing and trimming. If no shape outline is available or provided, the points, of the existing object path line may be used instead. In the illustrated embodiment, the addition of an independent shape outline is generally unnecessary because the object path line already exists for the purpose of object segmentation and repurposing for shaping calculations is an efficient use. However, it is noted that giving the user the option to create a supplemental shape outline allows for more creative control of the shaping process.

Figure 22A:
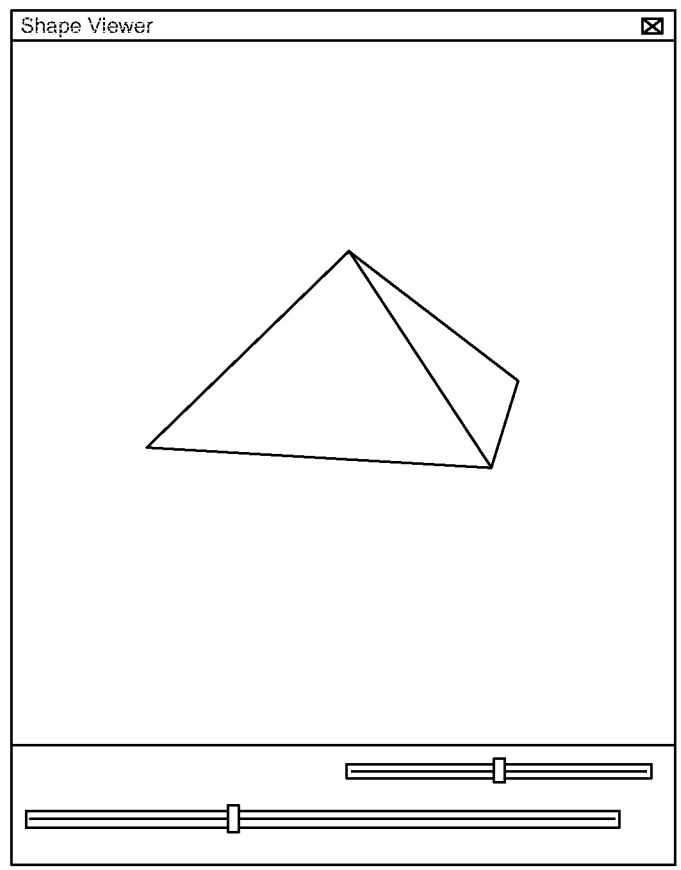
FIGS. 22A-23D illustrate examples of various shape viewer displays.
Figure 22B:
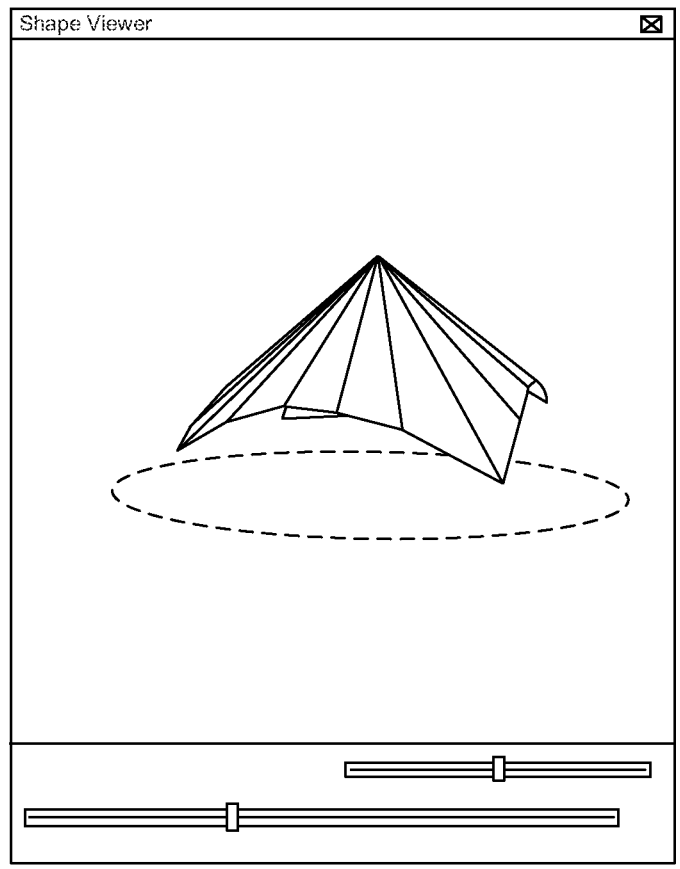
Figure 23A:
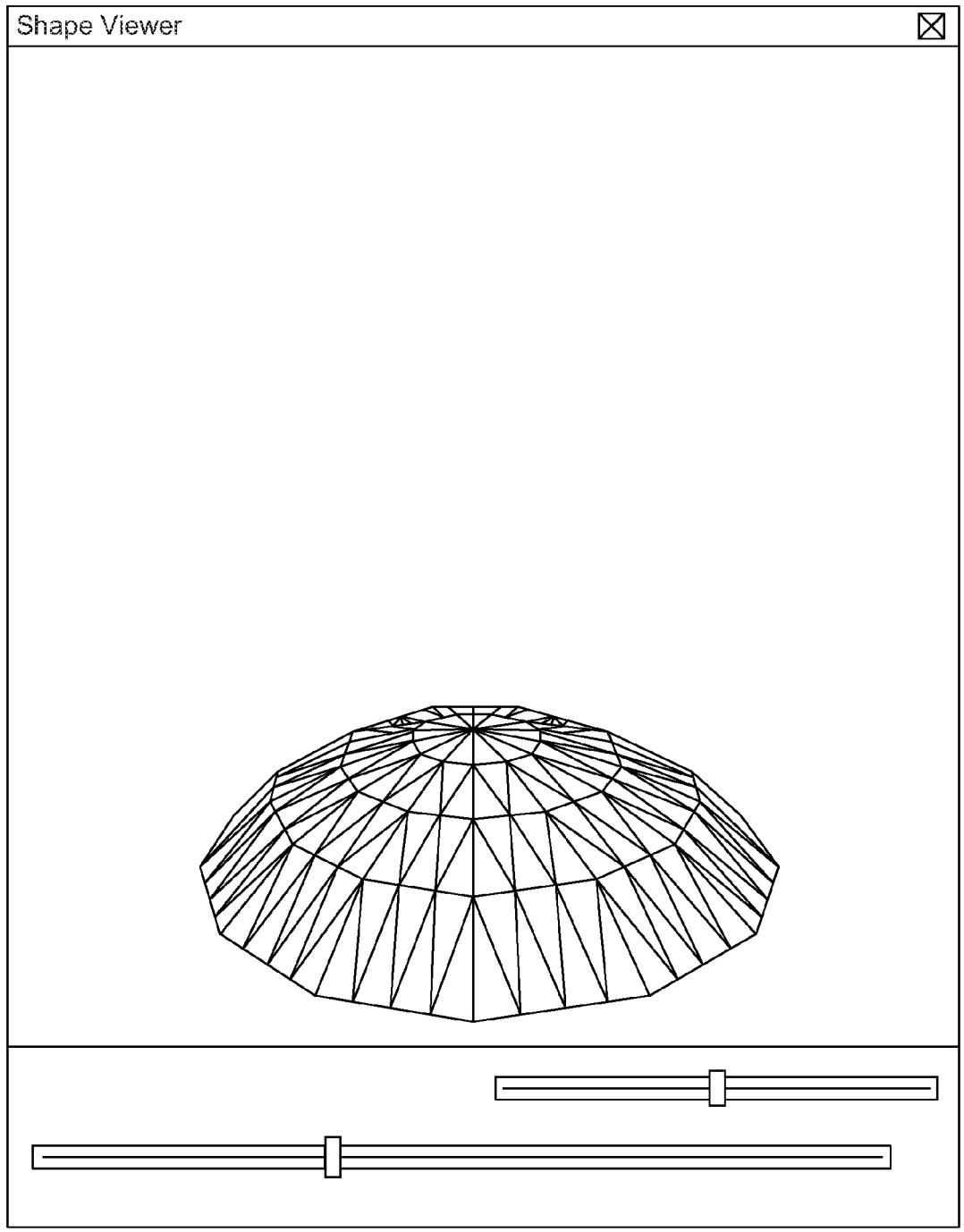
Figure 23B:
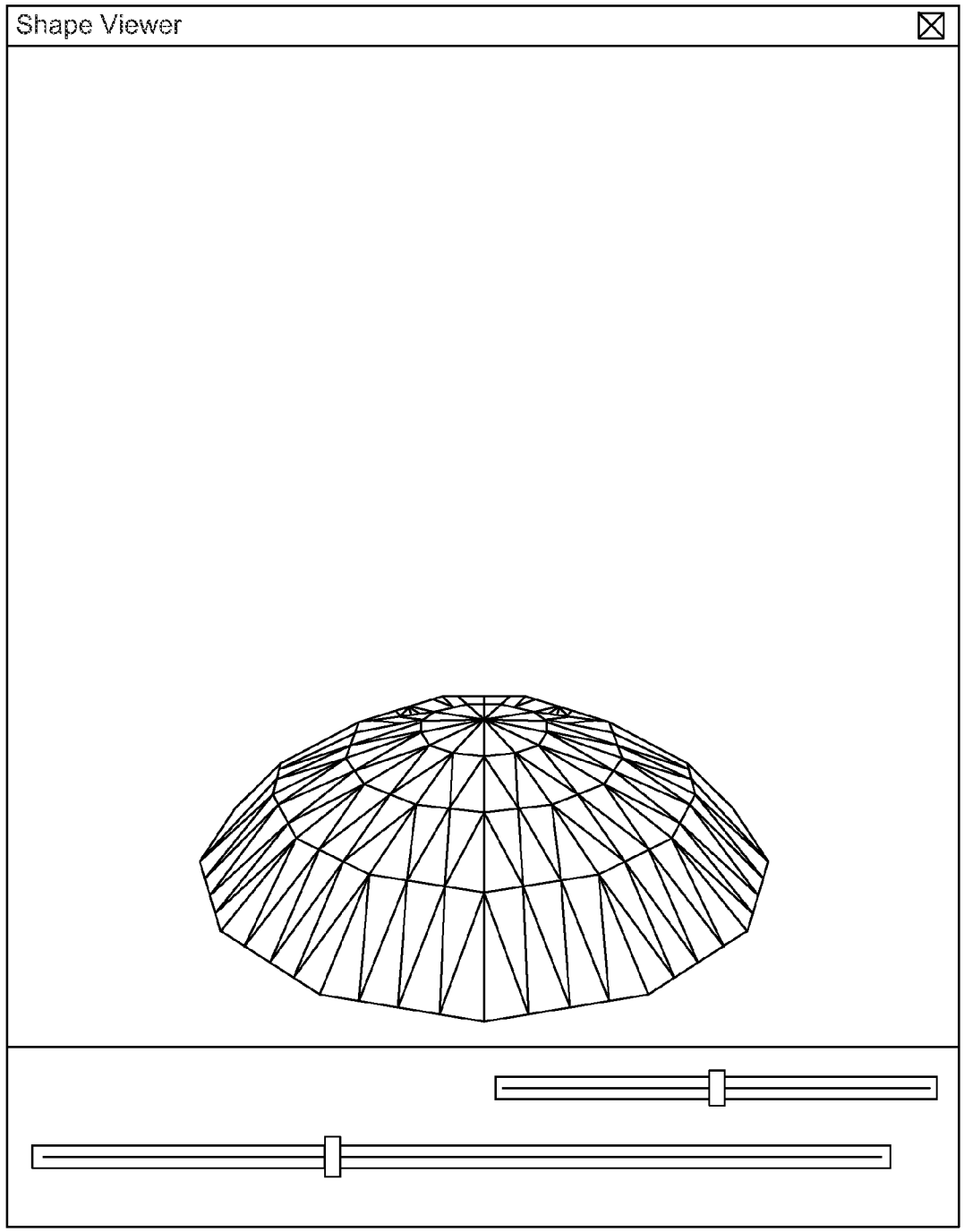
Figure 23C:
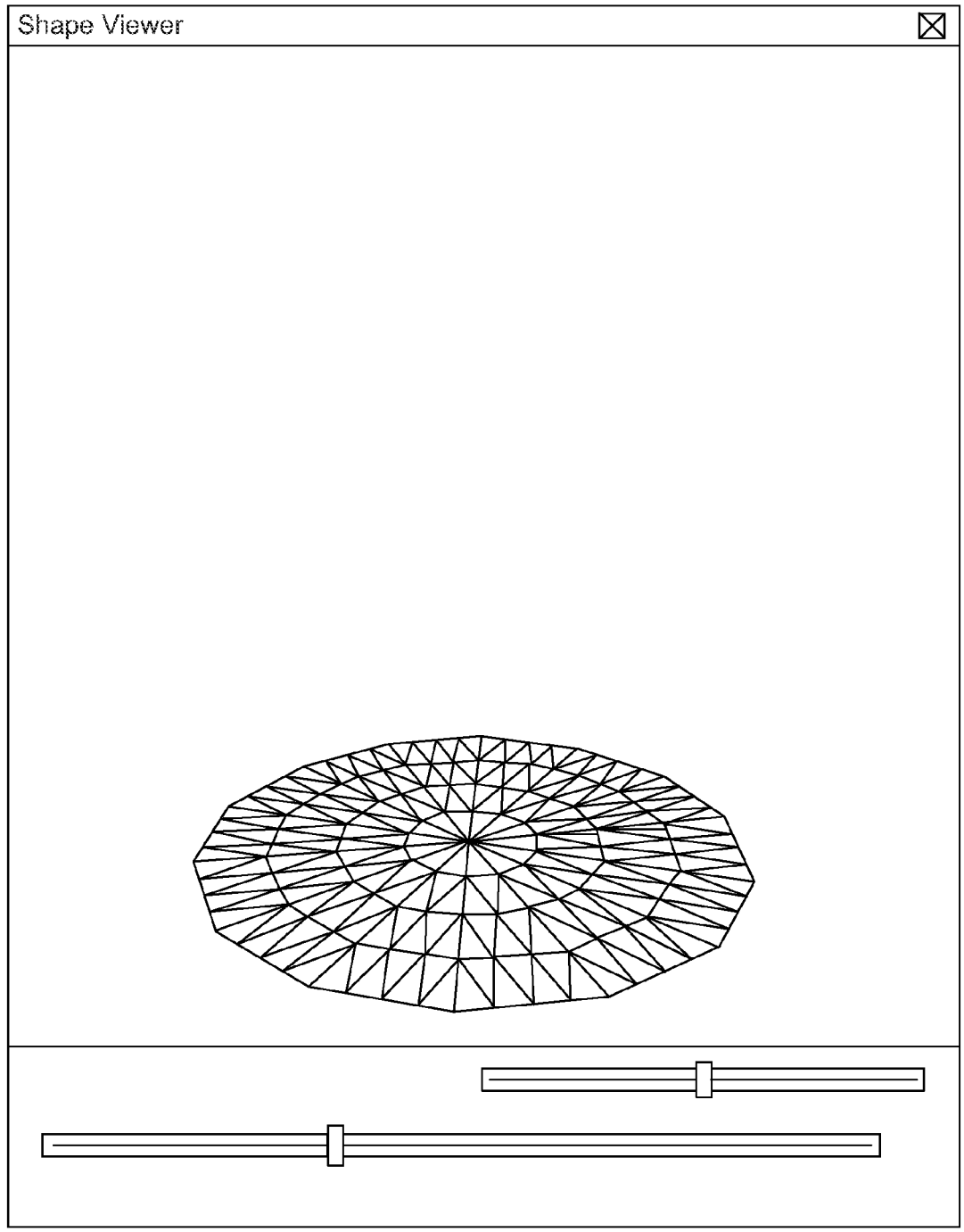
Figure 23D:
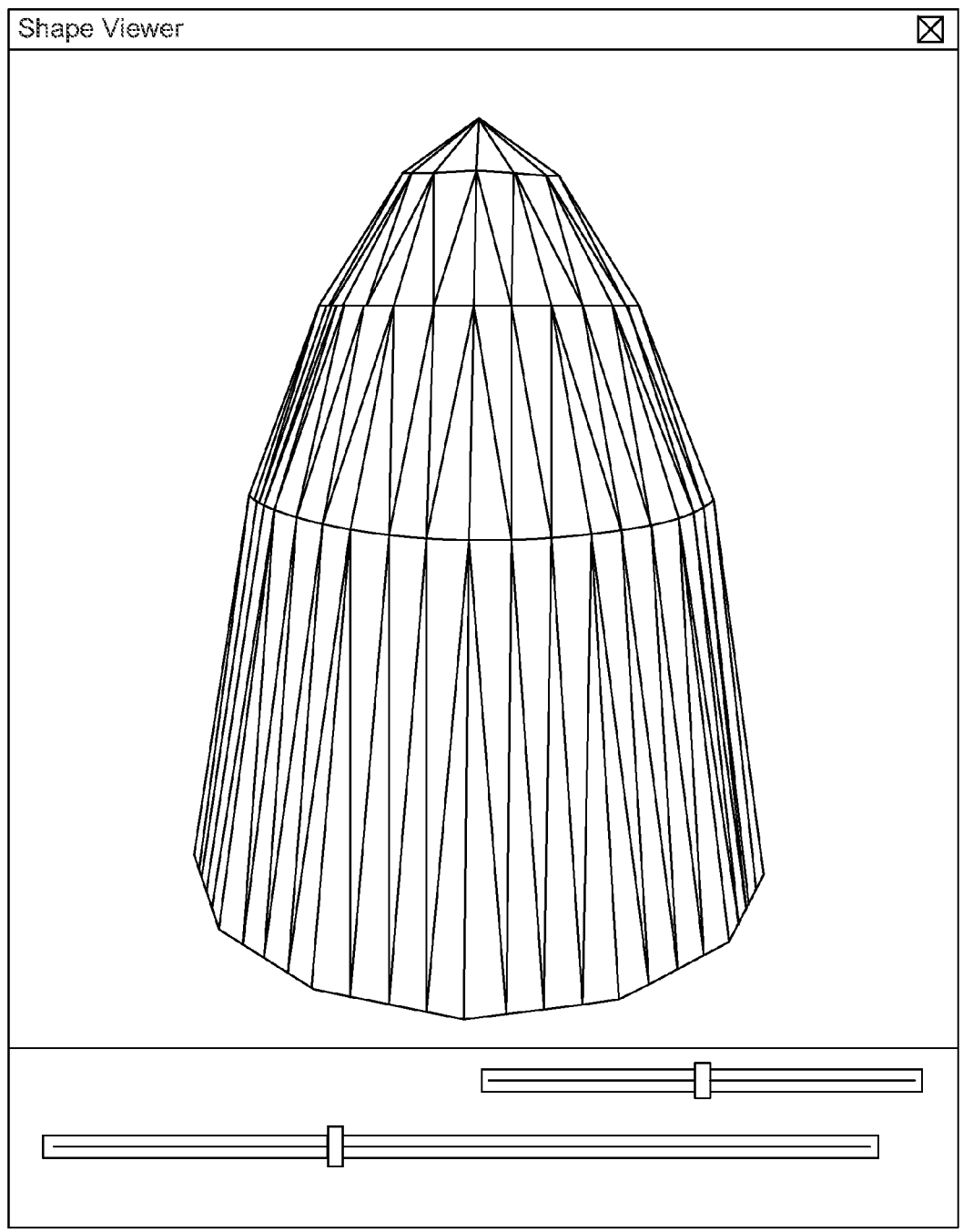
Figure 24A:
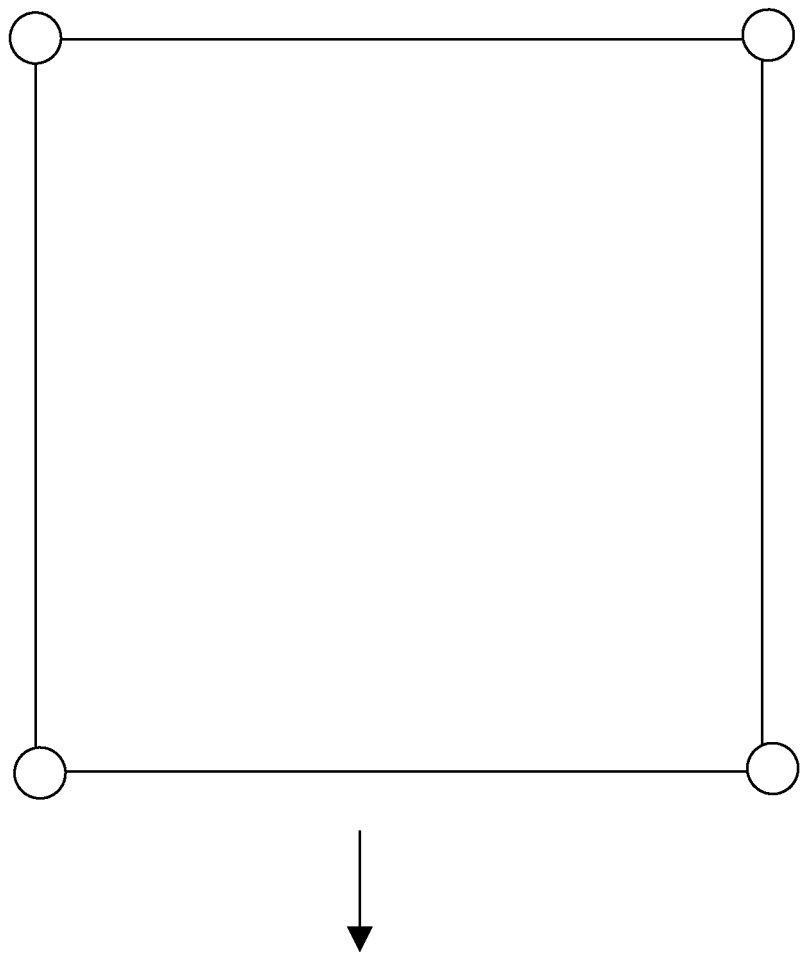
FIGS. 24A-24D illustrate examples of a polygon mesh formation used for object shaping operations.
Figure 24A:
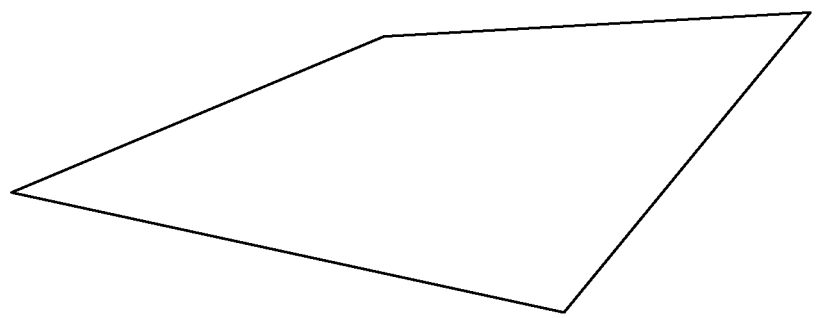
Figure 24B:
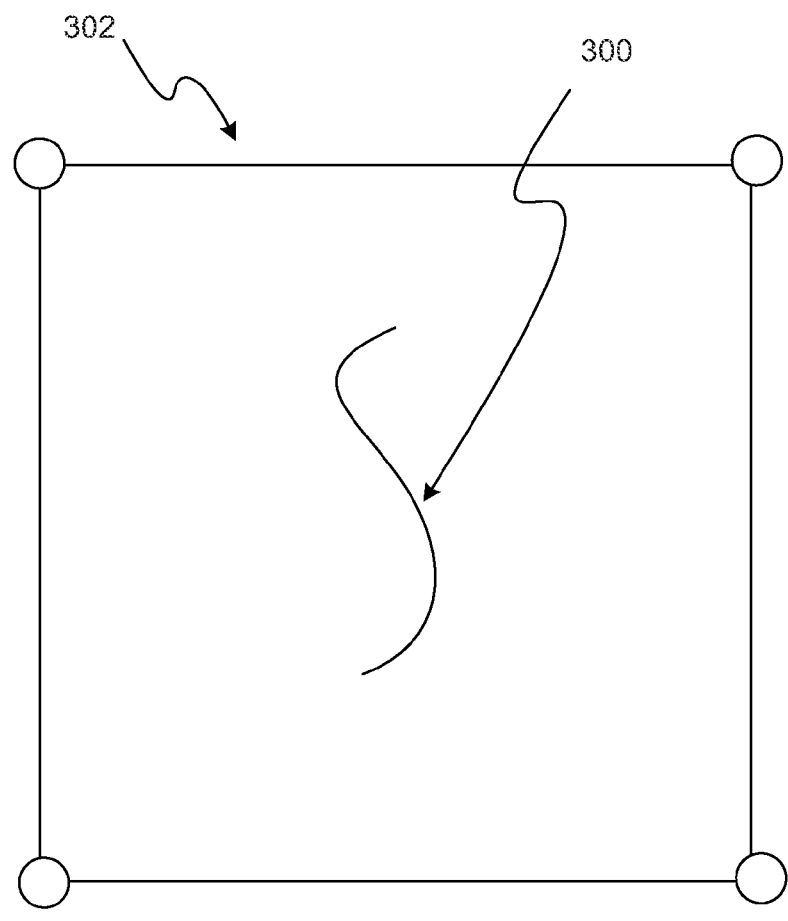
Figure 24B:
Figure 24B:
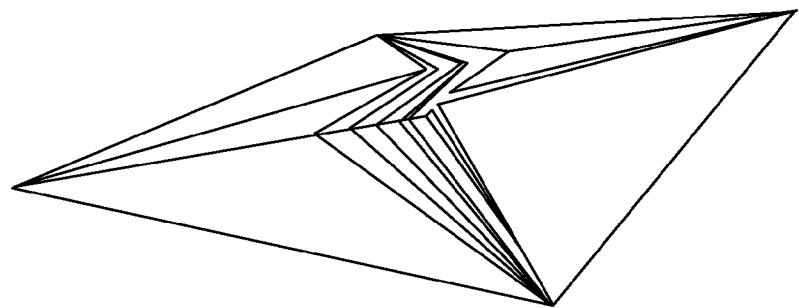
Figure 24C:
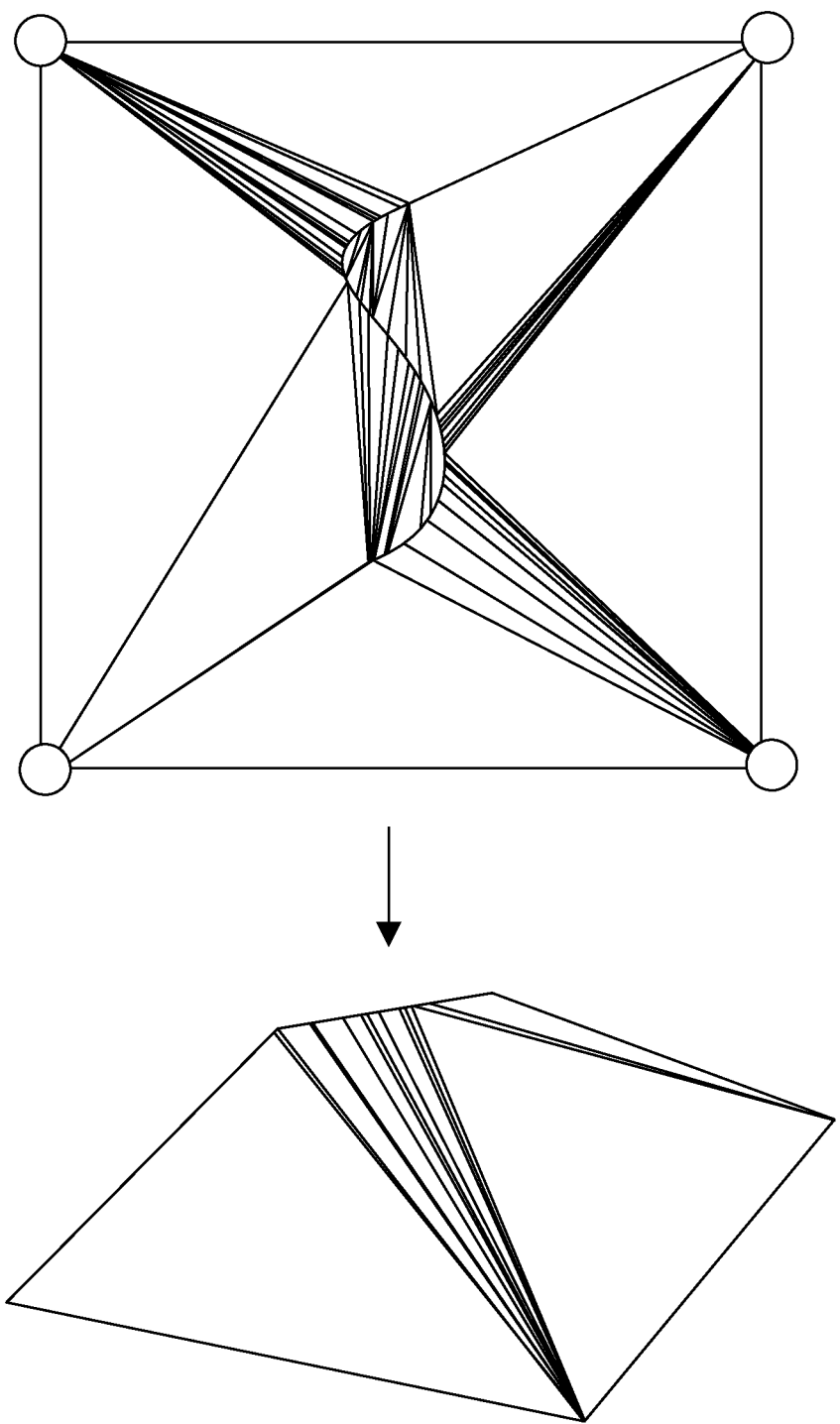
Figure 24D:
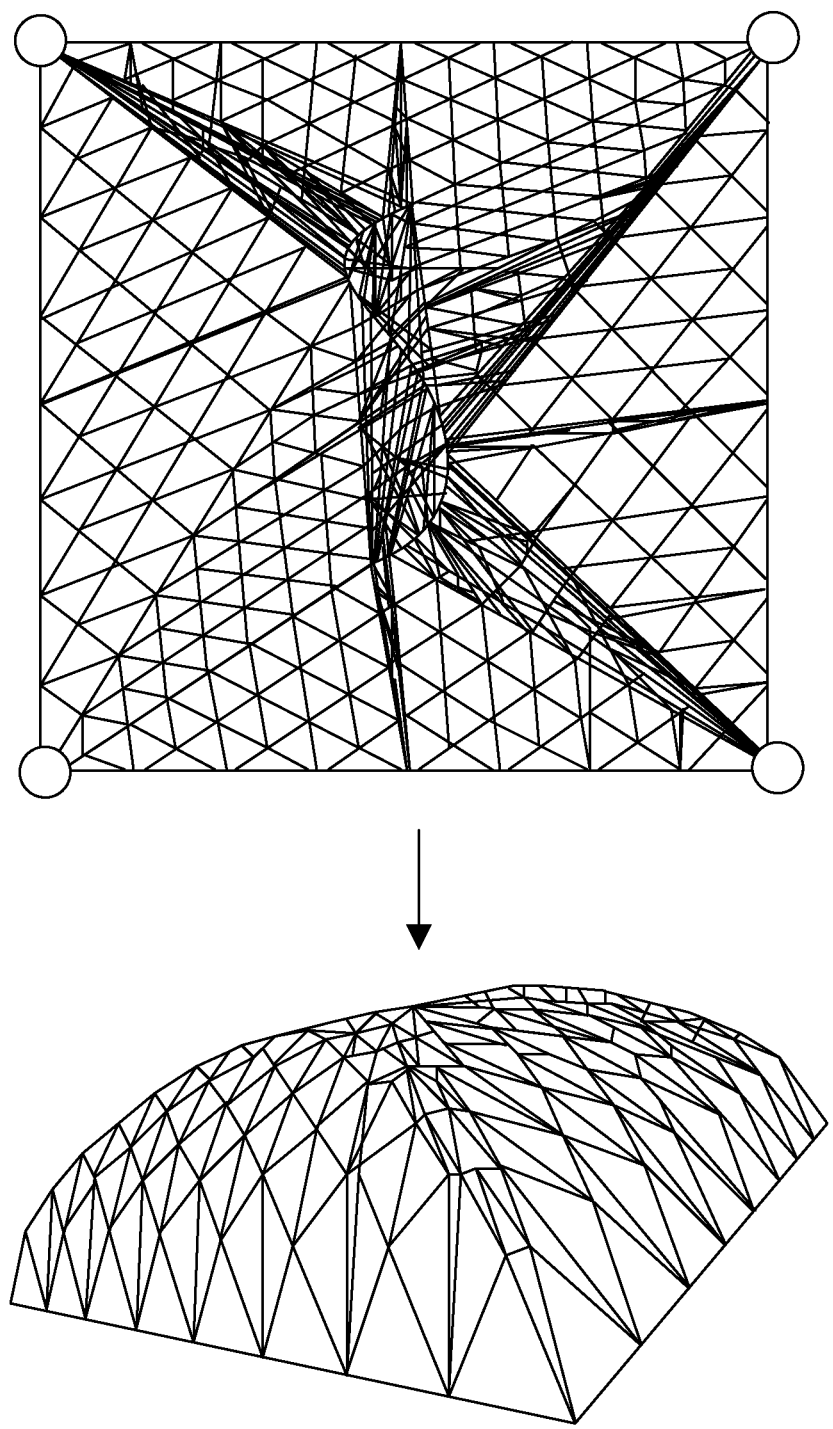

The shaping operations discussed herein are aided by displaying the object on a shape viewer. FIG. 22A is an illustration of a shape viewer display that shows an object. FIG. 22B is an illustration of a shape viewer display that shows an object being shaped with a shape outline. In embodiments, after the shape contour line is associated with a shape outline, a shape amplitude parameter may be specified by the user. The shape amplitude can be a negative value, wherein the depth will appear to project forward from the object, or a positive value, wherein the depth will appear to recede backward from the object. The shape outline remains at the object's baseline depth, while the shape contour line represents the object's shaping zenith or nadir. In some scenarios, the falloff between the shape outline and the shape contour line may be represented as a computed curve, and can be adjusted by the user through a curvature parameter. The curvature parameter directs the falloff curve to be either convex or concave, allowing for sharp falloff, gradual outward falloff, linear falloff, gradual inward falloff, and any or all variants in-between. FIG. 23A is an illustration of a shape viewer display that shows an object with a first shape amplitude. FIG. 23B is an illustration of a shape viewer display that shows an object with a second inverted shape amplitude. FIG. 23C is an illustration of a shape viewer display that shows an object with a third flat shape amplitude. FIG. 23D is an illustration of a shape viewer display that shows an object with a fourth, tall shape amplitude.

Figure 25A:
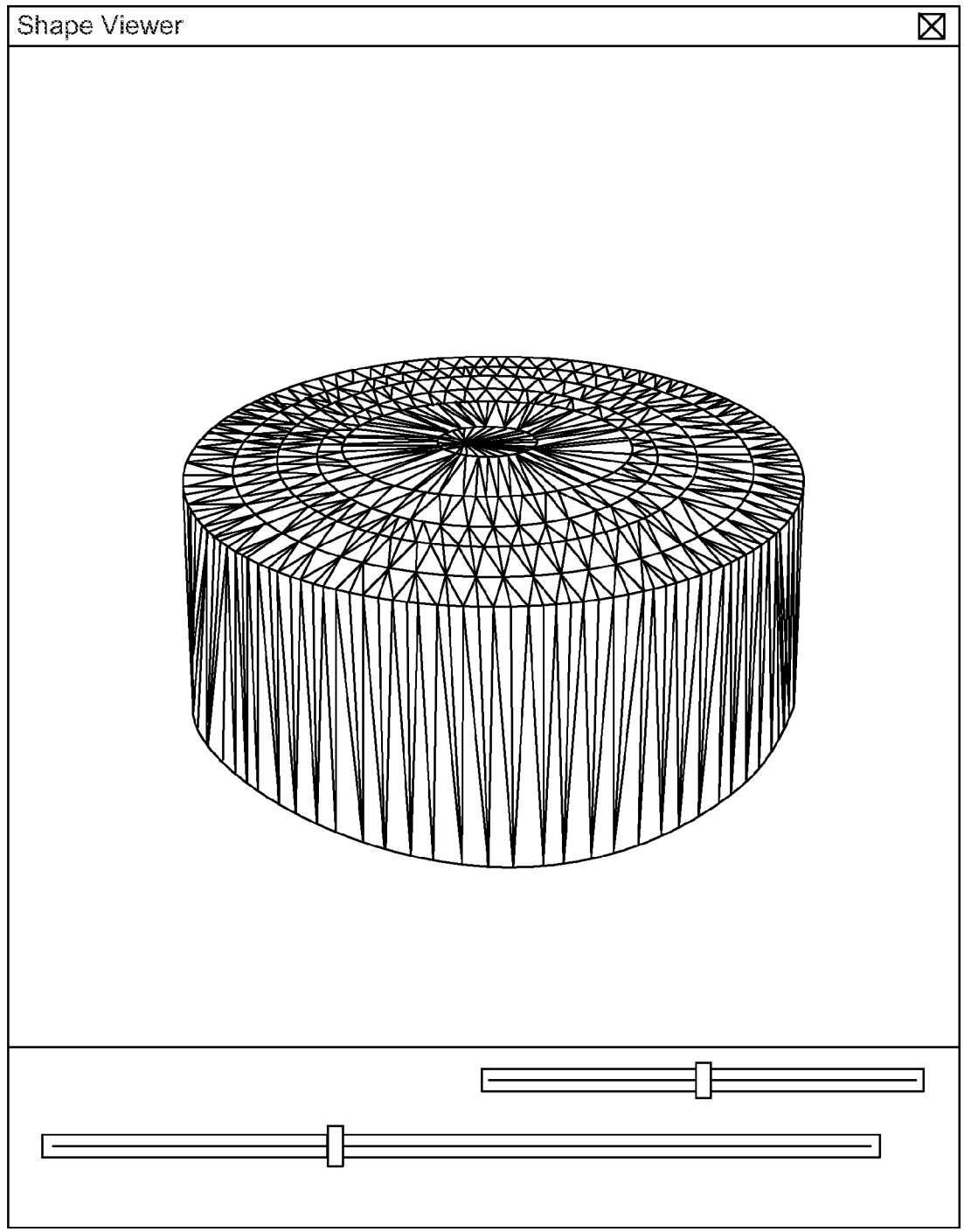
FIGS. 25A-25D illustrate examples of shape viewer displays that depict various curvature falloff operations.
Figure 25B:
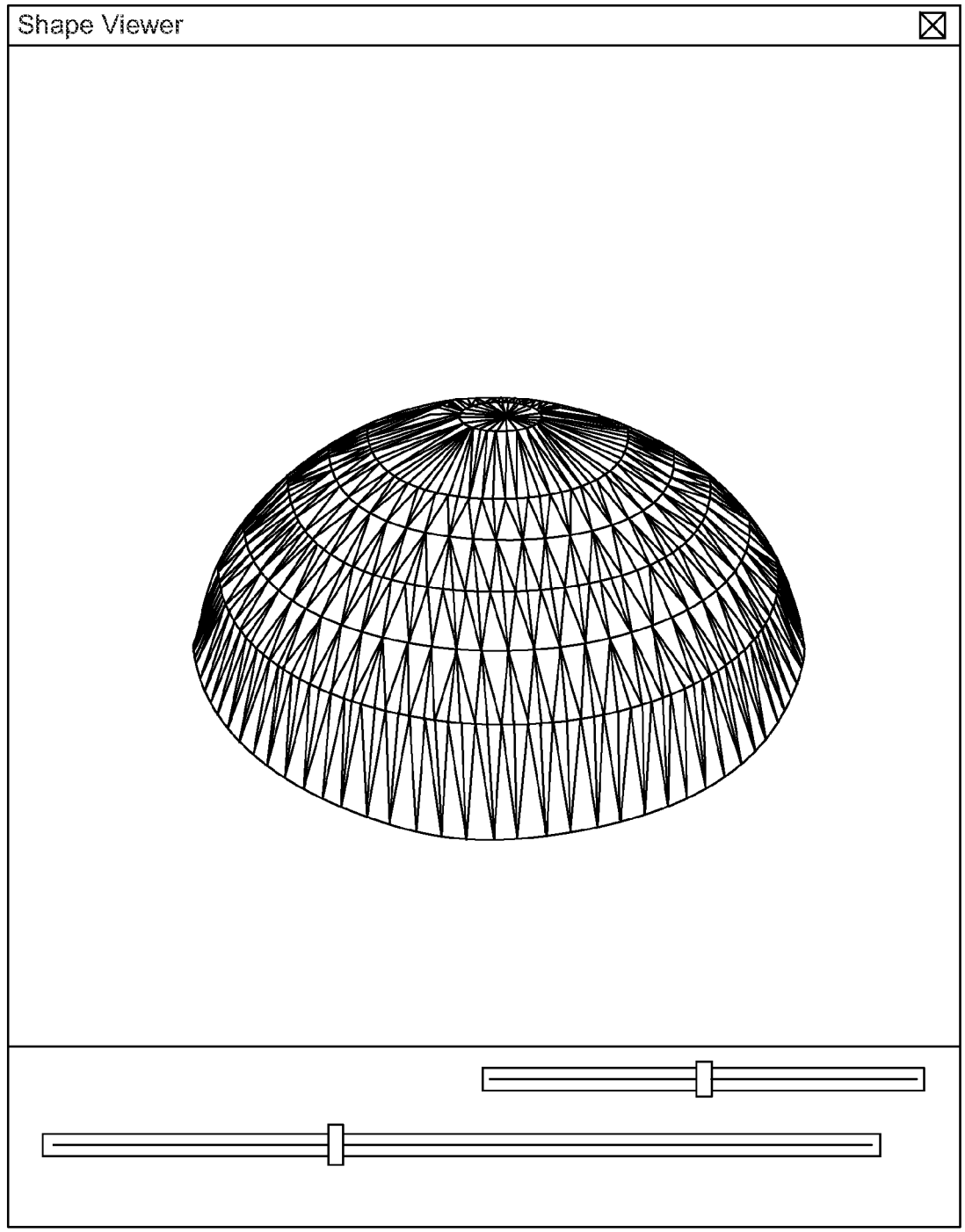
Figure 25C:
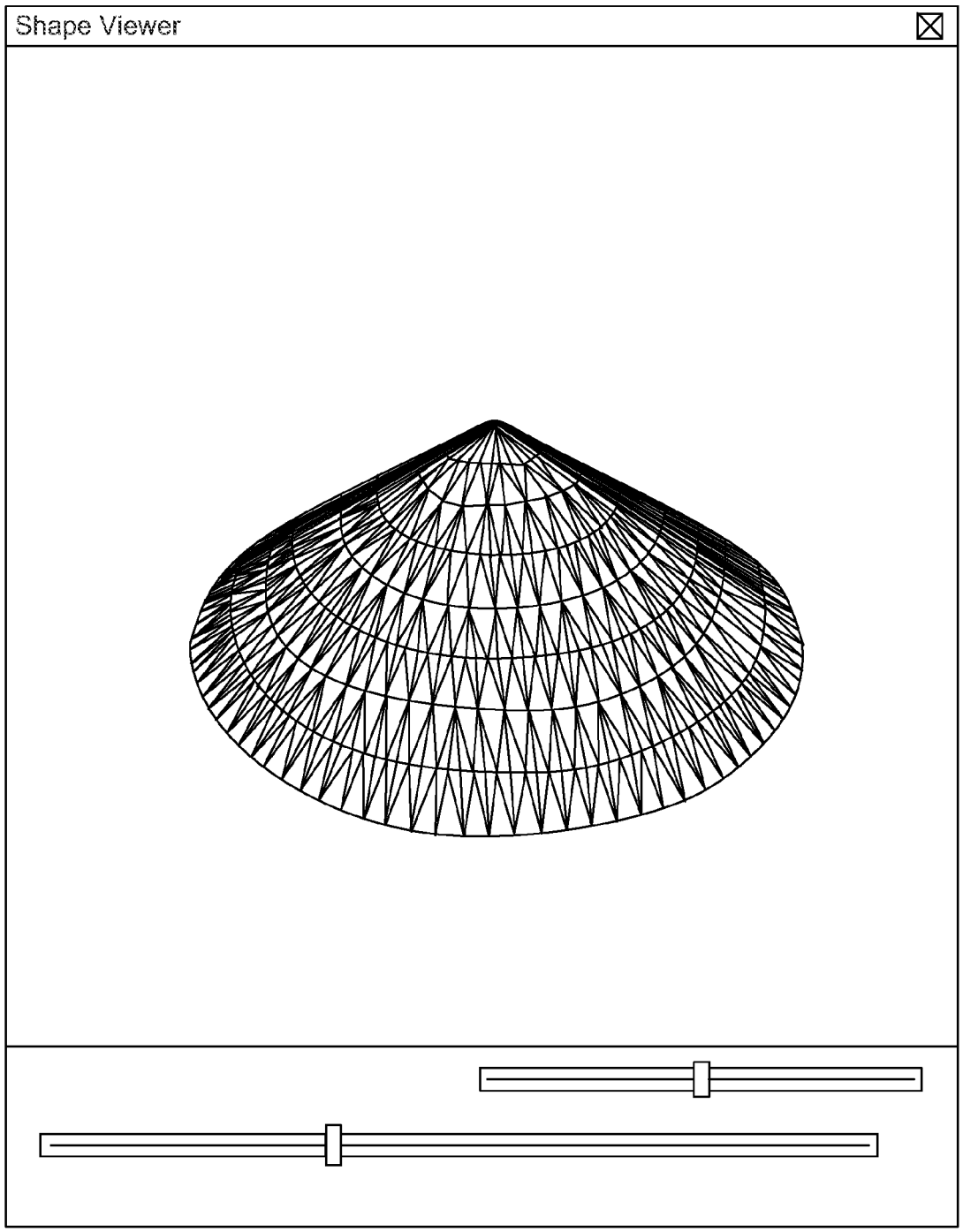
Figure 25D:
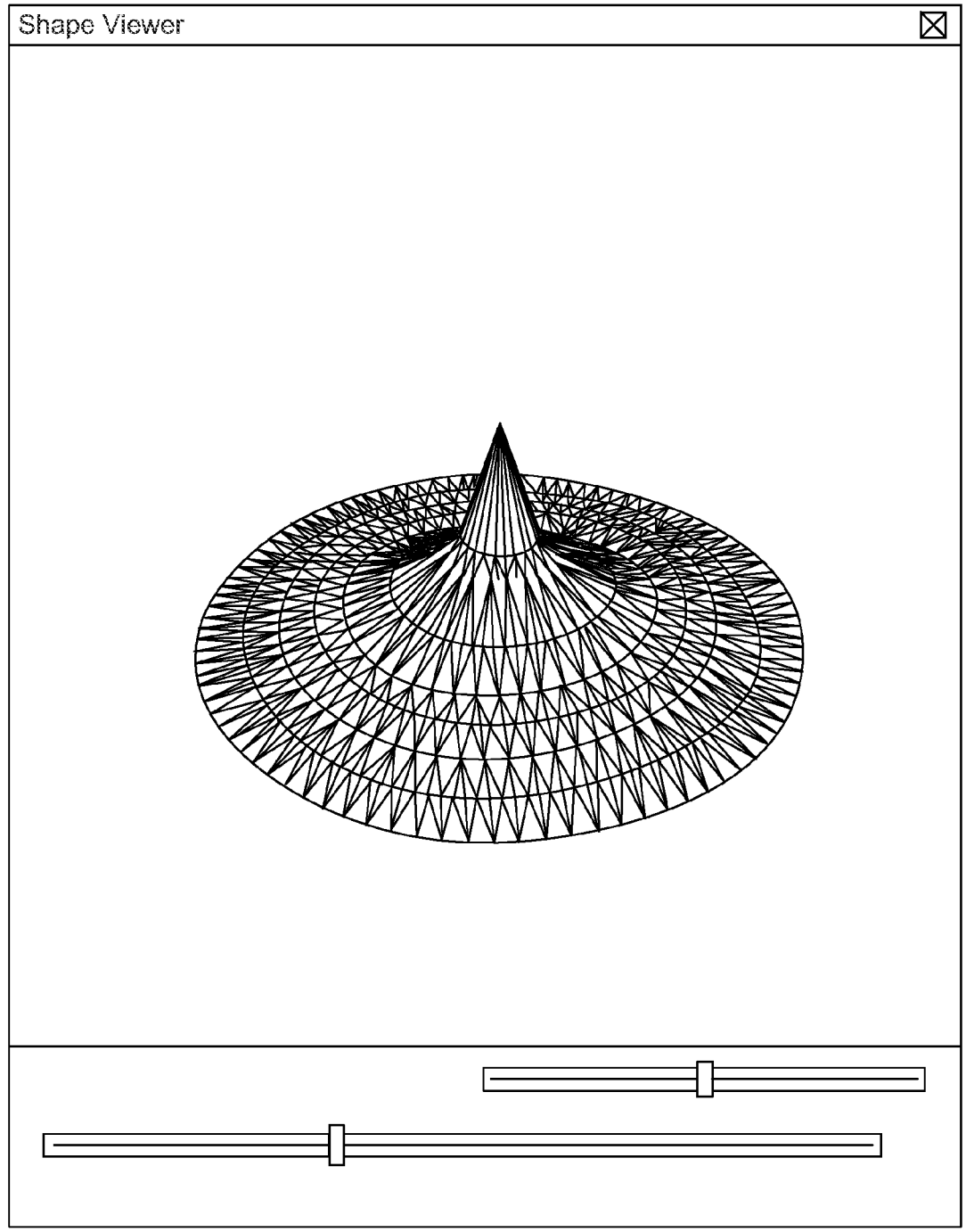

FIG. 24 is an illustration of one embodiment of a polygon mesh formation. As shown in FIG. 24, the polygon is formed around an object shaping element 300 and outline 302. FIG. 25A is an illustration of a shape viewer display that shows an object with a first edge curvature falloff. FIG. 25B is an illustration of a shape viewer display that shows an object with a second, rounded edge curvature falloff. FIG. 25C is an illustration of a shape viewer display that shows an object with a third, conical edge curvature falloff. FIG. 25D is an illustration of a shape viewer display that shows an object with a fourth edge curvature falloff.

Figure 26A:
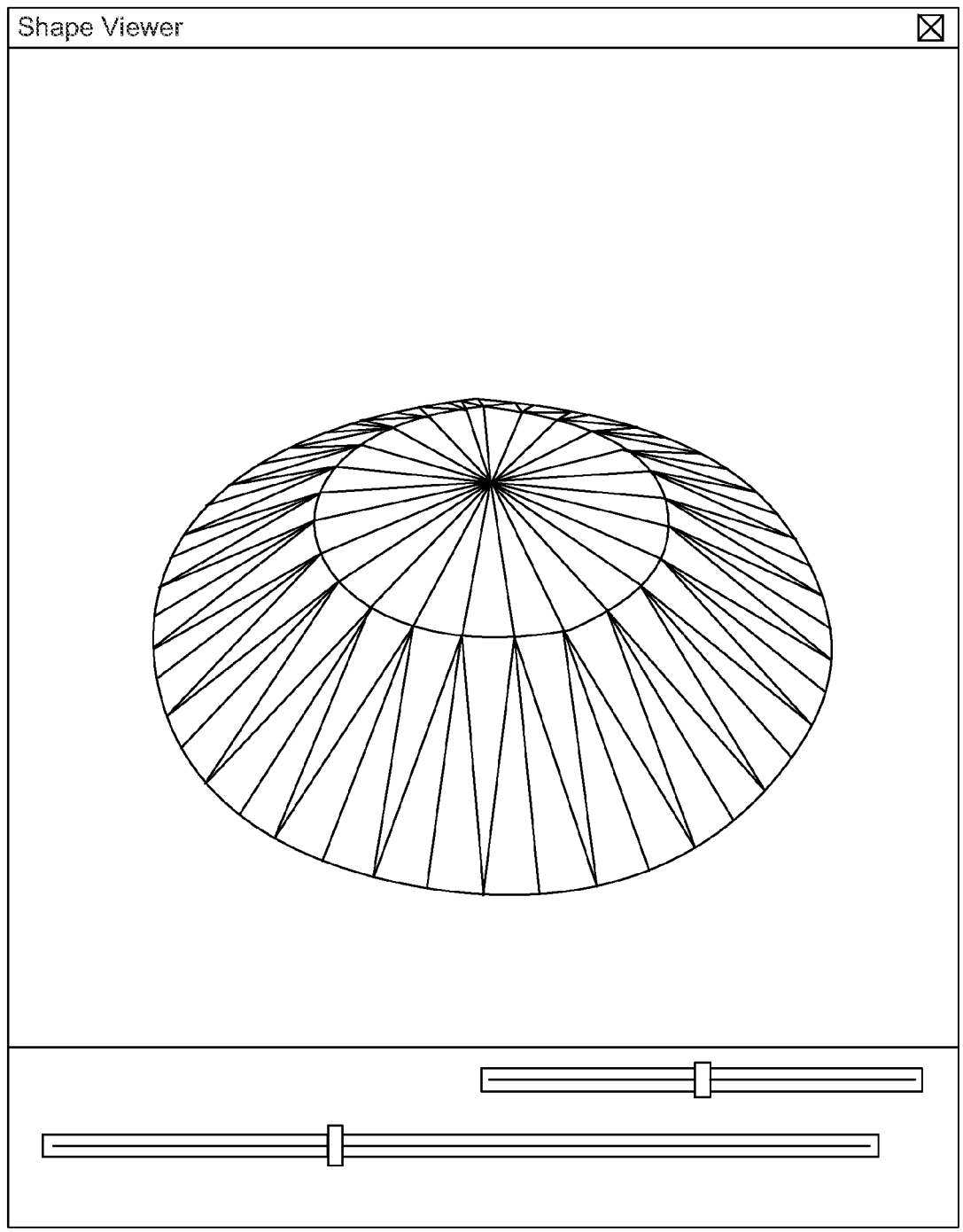
FIGS. 26A-26B illustrate examples of shape viewer displays depicting polygon mesh refinement operations.
Figure 26B:
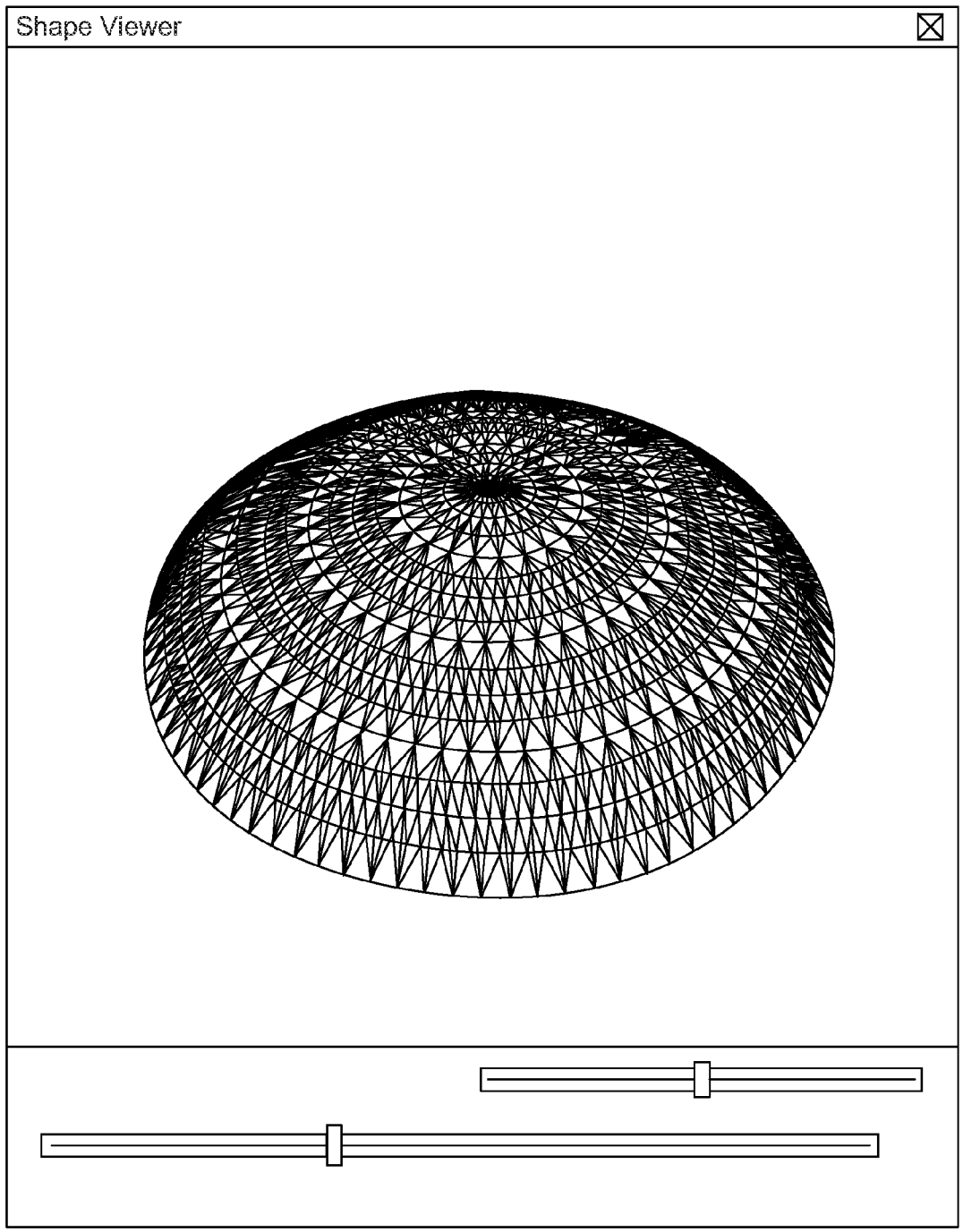

The shape contour line, when used in conjunction with the shape outline, the shape amplitude parameter, and the curvature parameter, allows for performing pixel warping calculations. In embodiments, these calculations are accomplished through the use of a mesh of polygons. As shown in FIG. 21, the points on the shape outline 204 and the points on the shape contour line 200 are the minimum set of vertices for the polygons. Additional vertices are added by means of a polygon refinement parameter, which is set by the user. For ease of computation, triangles are used in at least some scenarios. FIG. 26A is an illustration of a shape viewer display that shows an object before polygon mesh refinement. FIG. 26B is an illustration of a shape viewer display that shows an object after polygon mesh refinement.

In embodiments, a mesh tessellation may be calculated to maximize triangle homogeneity through the use of tessellation algorithms such as, for example, Delaunay triangulation. Once the object triangles have been calculated in 2D, the shape amplitude and curvature parameters are used to give vertices Z-depth, thus creating a 3D mesh. The surfaces of the 3D mesh polygons are used to generate offset values for every point in the object, allowing for accurate, sub-pixel level segmentation and warping.

When sub-pixel calculations are used, pixel filtering may result in image softening. In order to match the original image as closely as possible, so as to maintain image clarity and avoid stereoscopic disparities, various types of pixel filters may be used, including, but not limited to: Bicubic; Bilinear; Box; Catmull-Rom; Dirac/Impulse; Gaussian; Keys; Lanczos; Mitchell; Quad; Sinc; Simon; Rifmen; Triangle; and/or adaptive.

Figure 27A:
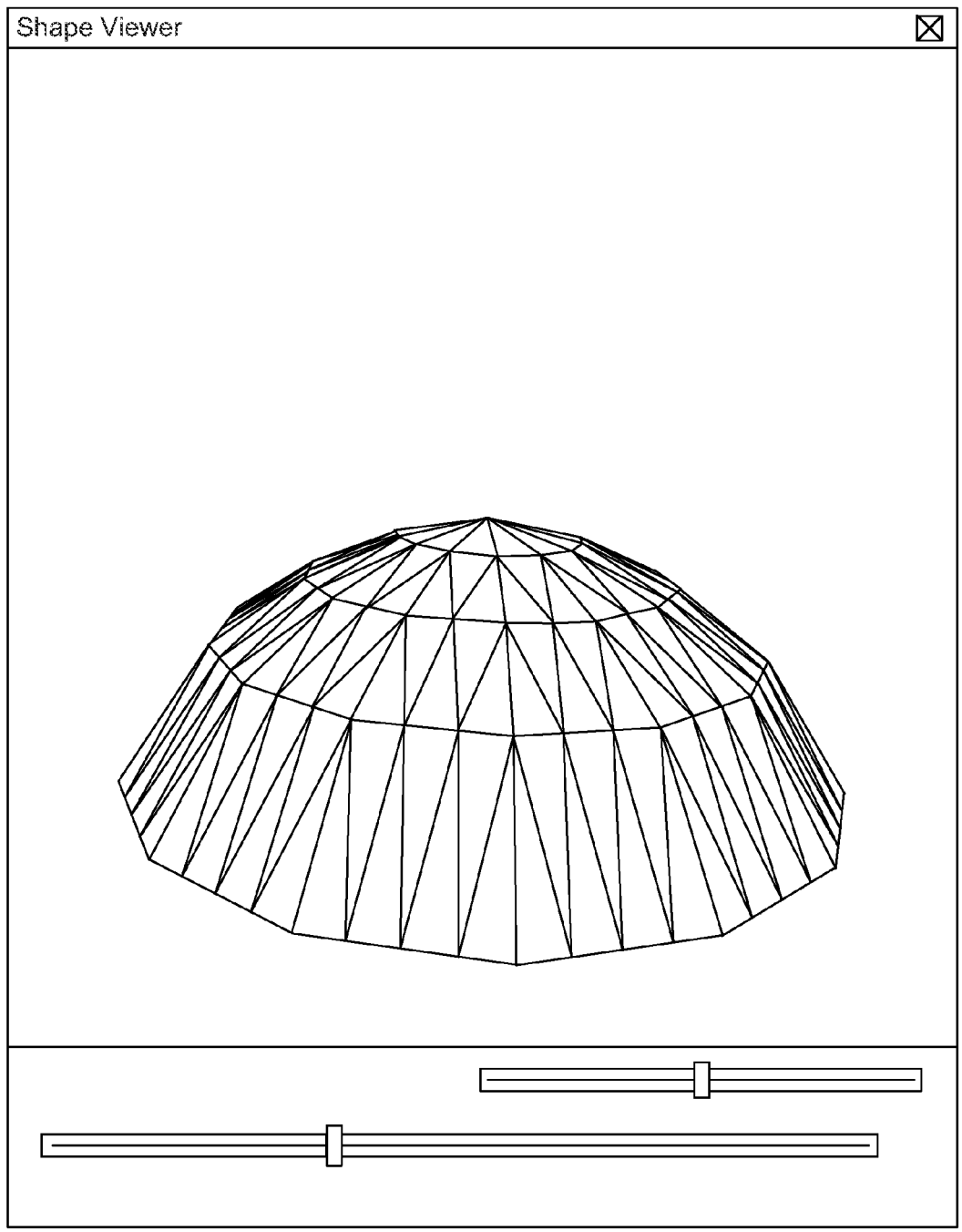
FIGS. 27A-27B illustrate examples of shape viewer displays depicting various supplemental object shaping.
Figure 27B:
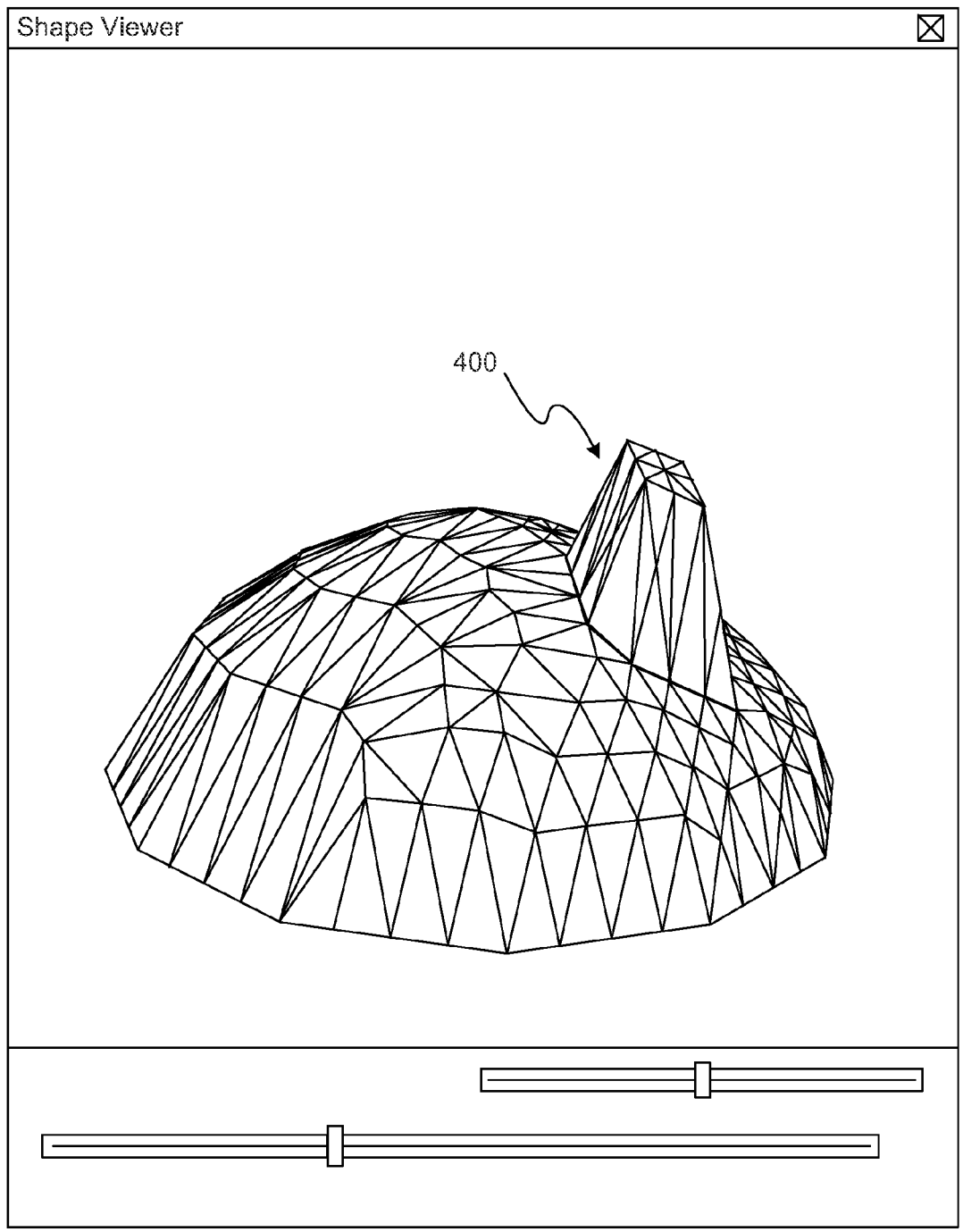

In embodiments, additional user-guided modifications to the 3D mesh may be performed using various tools. An example of such a tool is the mesh deformation tool, which allows the user to draw and associate a supplemental sub-object with a parent object. FIG. 27A is an illustration of a shape viewer display that shows an object before supplemental object shaping. FIG. 27B is an illustration of a shape viewer display that shows an object after supplemental object shaping. FIG. 27B shows the deformed supplemental shape 400. The association between a sub-object with a parent object may be completed even if the sub-object has an independent shape outline and shape contour line. Moreover, in at least some scenarios, the supplemental sub-object may have a different shape amplitude value than the parent object, and can, therefore, be used to create depressions or protrusions on the 3D mesh, which further varies the depth across the surface of the object. In embodiments, an unlimited number of user-guided mesh deformations are possible per object. In some embodiments, the resulting 3D mesh is visible to the user, at any time and from any angle, using a dedicated shape viewer. The shape viewer can be set to present a perspective or orthogonal view of the selected 3D mesh, which the user can pan across, zoom into, and/or orbit around in 3D space, as shown in FIG. 22B.

In embodiments, the 3D mesh can be viewed, textured, or untextured, and with or without a wireframe overlay. If multiple objects are selected, all of their 3D meshes may be viewed together in the shape viewer. An object can be viewed with the mesh deforming contributions of the sub-objects, or the sub-object meshes can be viewed on their own. Updates to the parent object and sub-object's shape outlines or shape parameters are preferably updated in the shape viewer in real-time. The shape viewer may also display changes in surface texture and shape over time. Viewing the changes over time allows the user to view the shape during image sequence playback. The 3D mesh data is preferably cached to memory to allow for the quick retrieval required for playback in the shape viewer.

Figure 28A:
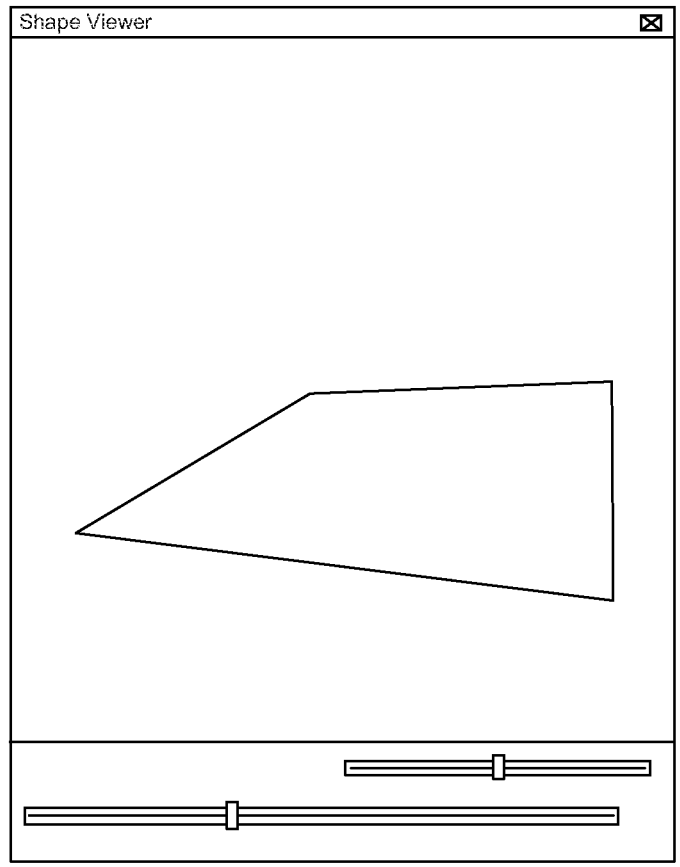
FIGS. 28A-28C illustrate examples of shape viewer displays depicting various depth mapping operations.
Figure 28B:
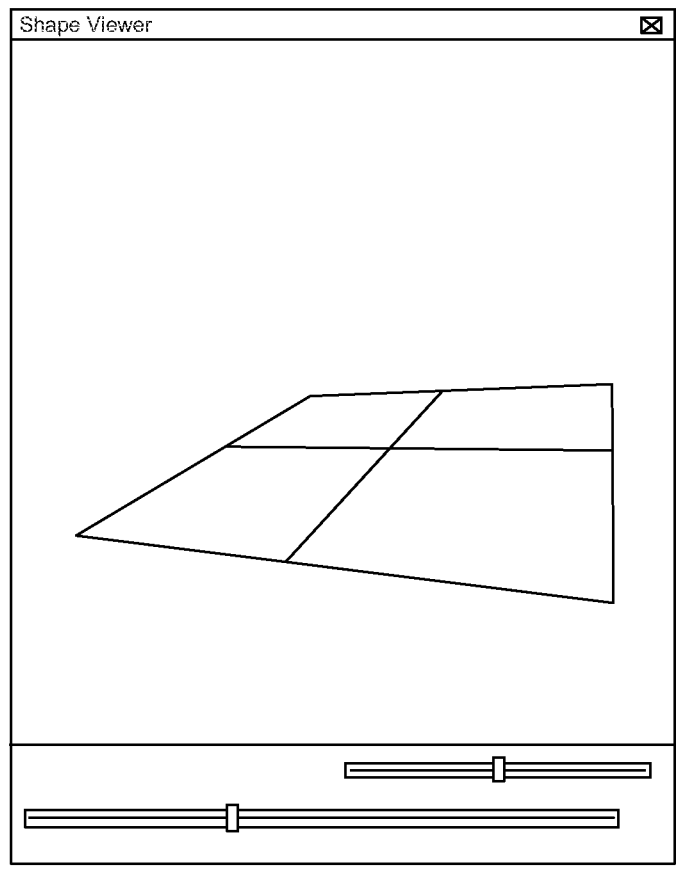
Figure 28C:
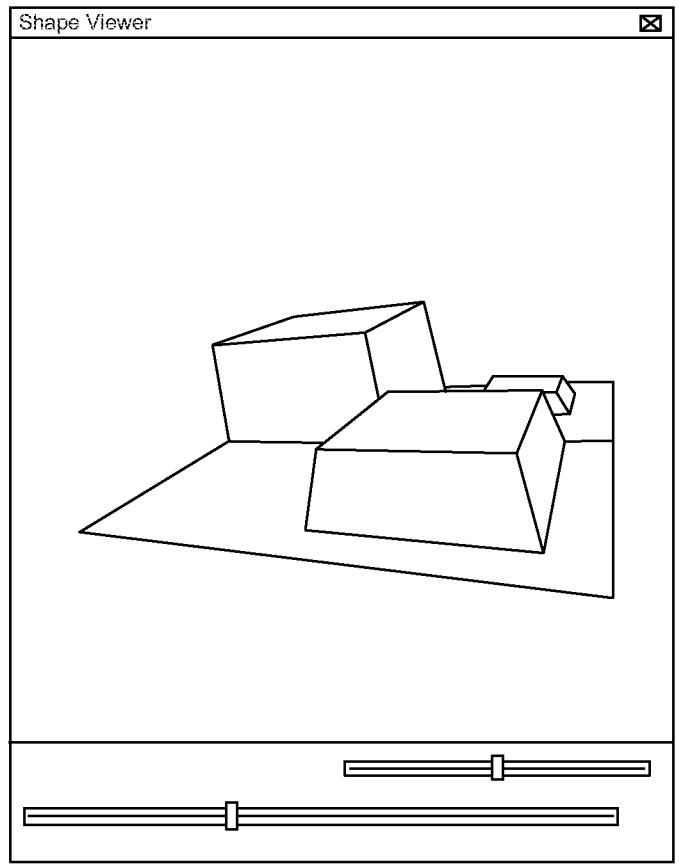
Figure 29A:
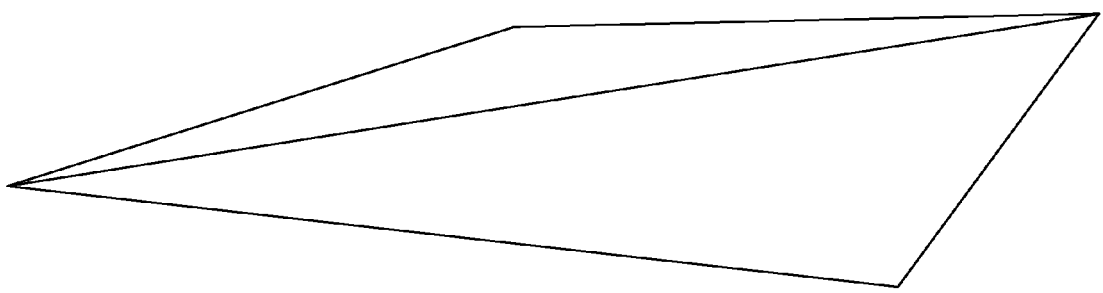
FIGS. 29A-29D is illustrate examples of an object wherein a depth map is combined with shaping data.
Figure 29B:
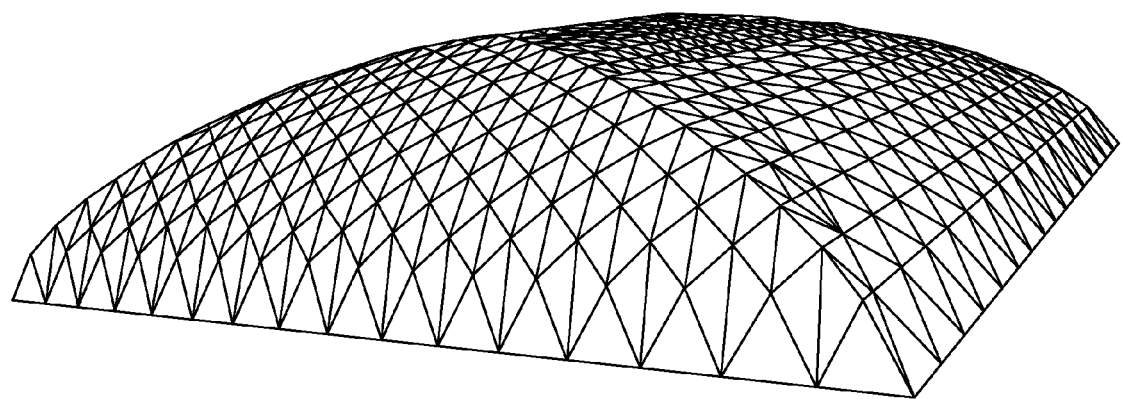
Figure 29C:
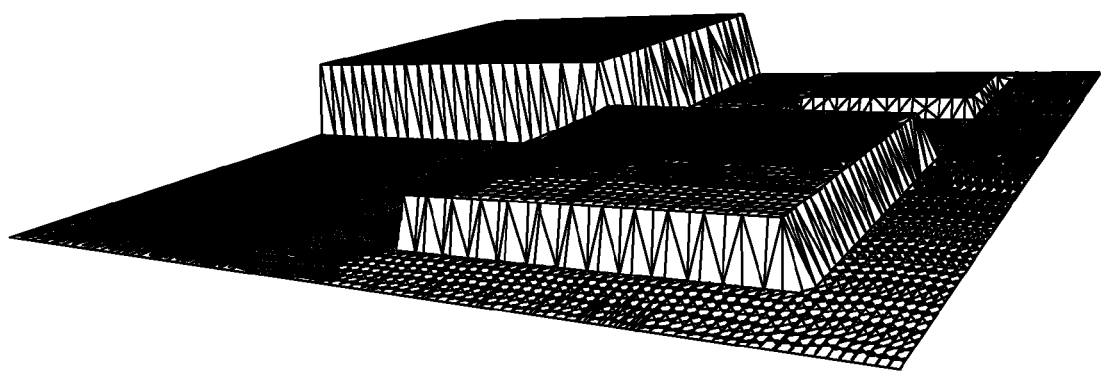
Figure 29D:
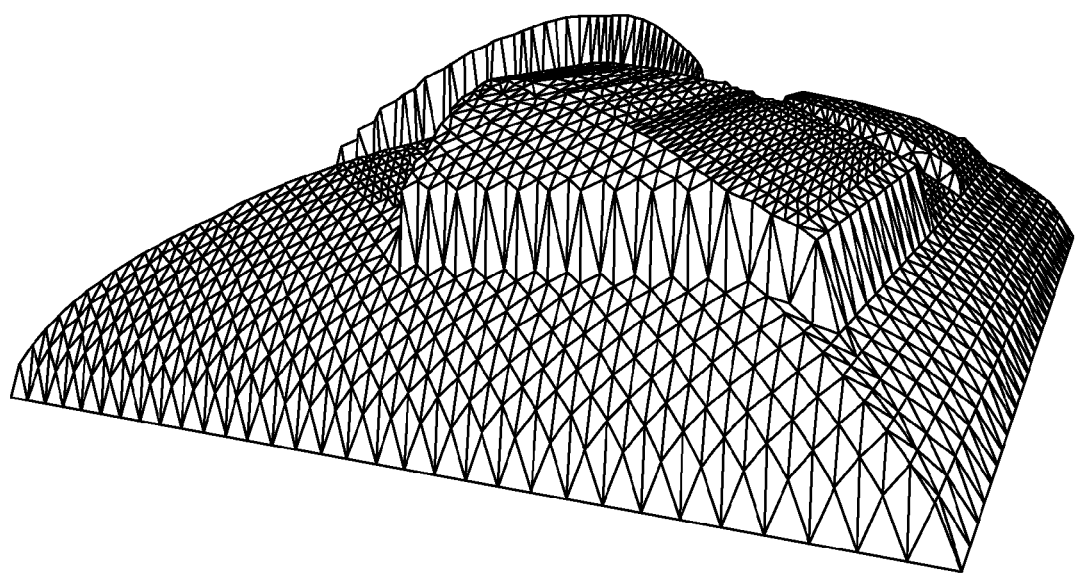

FIG. 28A is an illustration of a shape viewer display that shows an object before depth mapping. This is the original, unaltered footage. FIG. 28B is an illustration of a shape viewer display that shows an object during importation of a depth map. This is a grayscale representation of the stereoscopic z-depth. FIG. 28C is an illustration of a shape viewer display that shows an object after application of an imported depth map. This allows 3D geometry to be created and displayed based on the pixel color represented in the depth map.

Figure 30A:
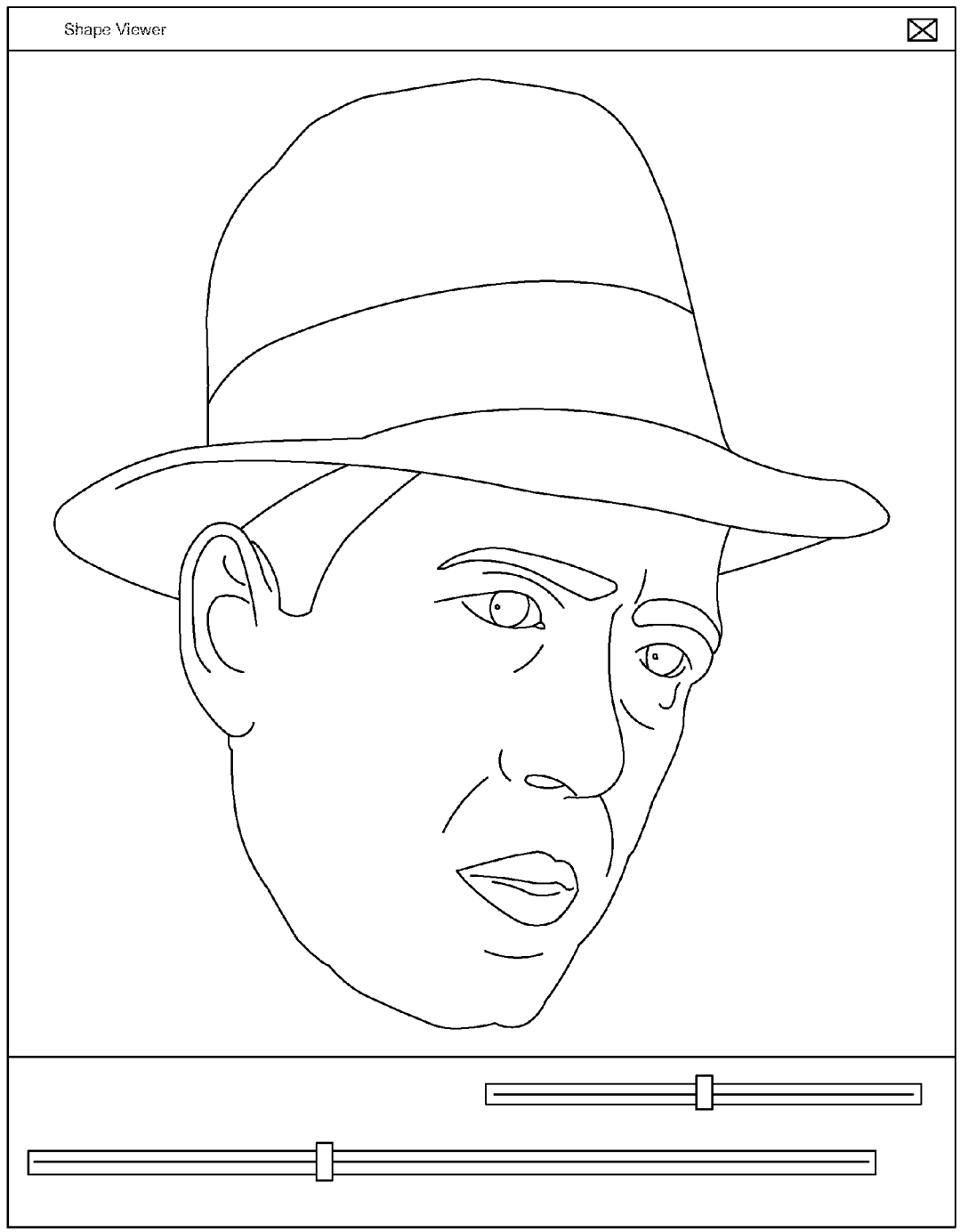
FIG. 30A illustrates an example of a shape viewer display of an image showing a textured view.
Figure 30B:
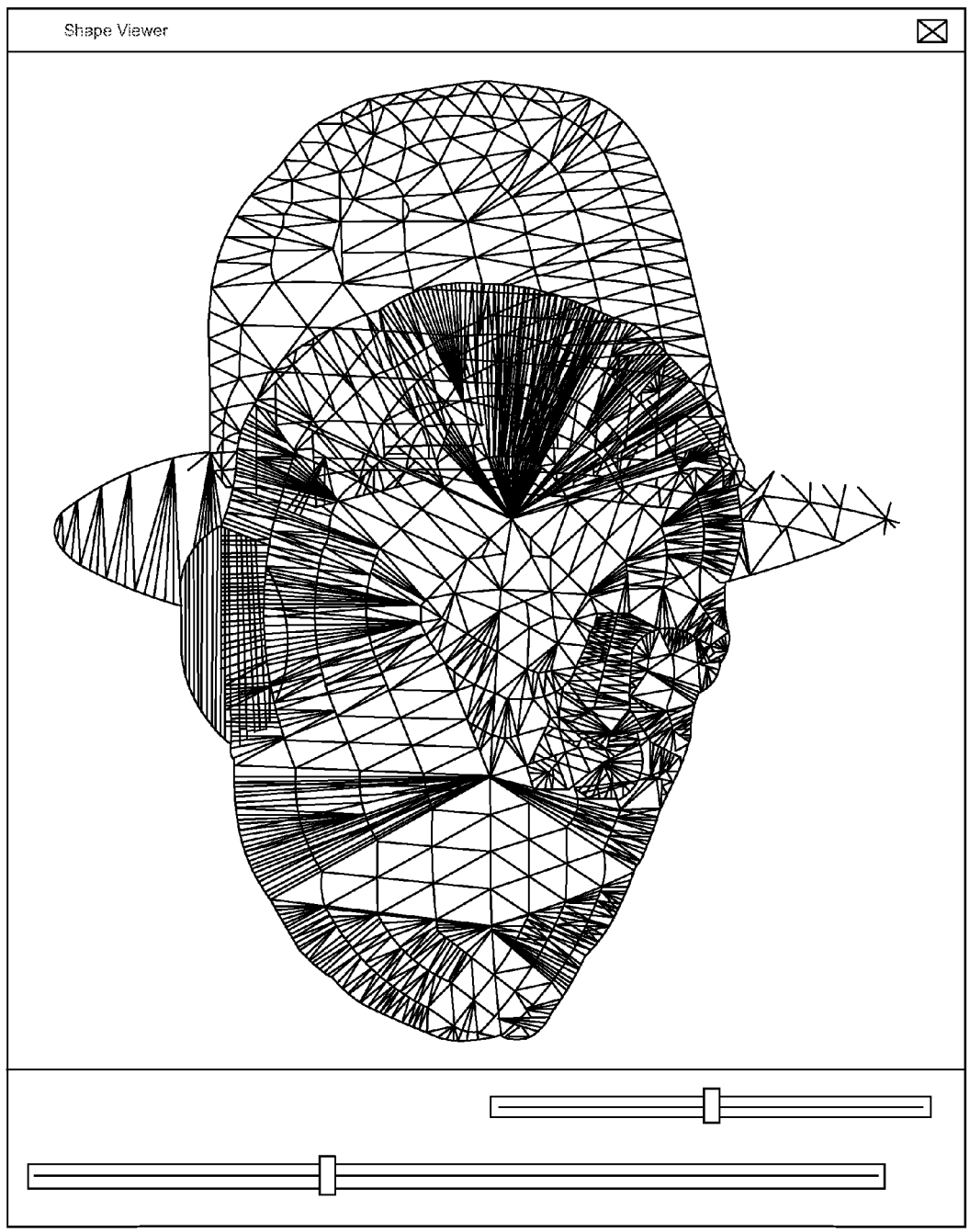
FIG. 30B illustrates an example of a shape viewer display of an image showing a wireframe view.
Figure 31:
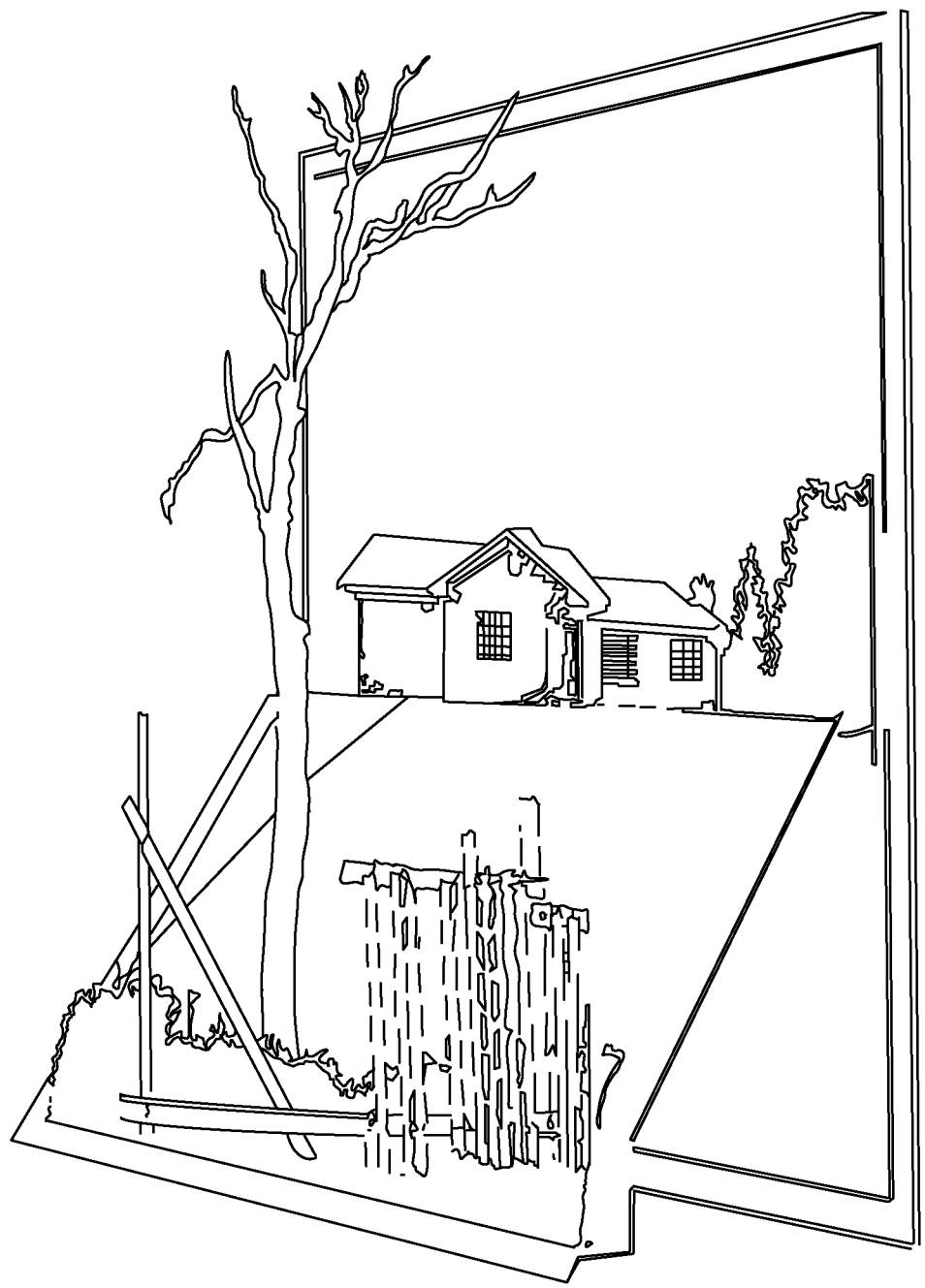
FIG. 31 illustrates an example of a perspective view of an image shown in a diorama view.

In some scenarios, if the user wishes to view the entire scene represented within the image or image sequence from any angle of view, the user may initiate a diorama view. A diorama view is similar to the shape viewer, because it presents many of the same viewing options. These viewing options include, but are not limited to, presenting a perspective or orthographic view of the entire 3D scene, which the user can pan across, zoom into, and orbit around in 3D space, and viewing objects textured, untextured, and/or with or without a wireframe overlay. The difference between the shape viewer and diorama view is that, regardless of object selection, diorama view shows all of the objects within the image (or sequence of images) as they relate to each other in depth. In embodiments, diorama view specifically takes into account object properties, such as depth, perspective, and edge transparency. Changes to any of the object properties are generally updated in diorama view in real-time. Diorama view can also display changes in surface texture, edge transparency, depth, perspective, and shape over time, which allows the user to view the image or sequence of images during playback. Preferably, 3D mesh data is cached to memory to allow for the quick retrieval required for playback in diorama view. FIG. 29 is an illustration of one embodiment of an object wherein a depth map is combined with shaping data. FIG. 30A is an illustration of a shape viewer display of an image showing a textured view. FIG. 30A is an illustration of a shape viewer display of an image showing a wireframe view. FIG. 31 is an illustration of perspective view of an image shown in a diorama view. FIGS. 29 to 31 show various views preferably available in the shape viewer of the present invention.

The actual pixel warping that may result from shaping may preferably be seen by viewing the alternative perspective image on a 2D display. In order to see how the subtle warping of pixels affects the perceived depth of the scene, a stereoscopic 3D display and glasses are required. Viewing the stereoscopic pair of images in this way allows the user to see the updates in depth created by the changes to the various shaping parameters. This increases the efficiency of the computer and user interface, because changes resulting from user input are presented back to the user instantly.

Figure 32:
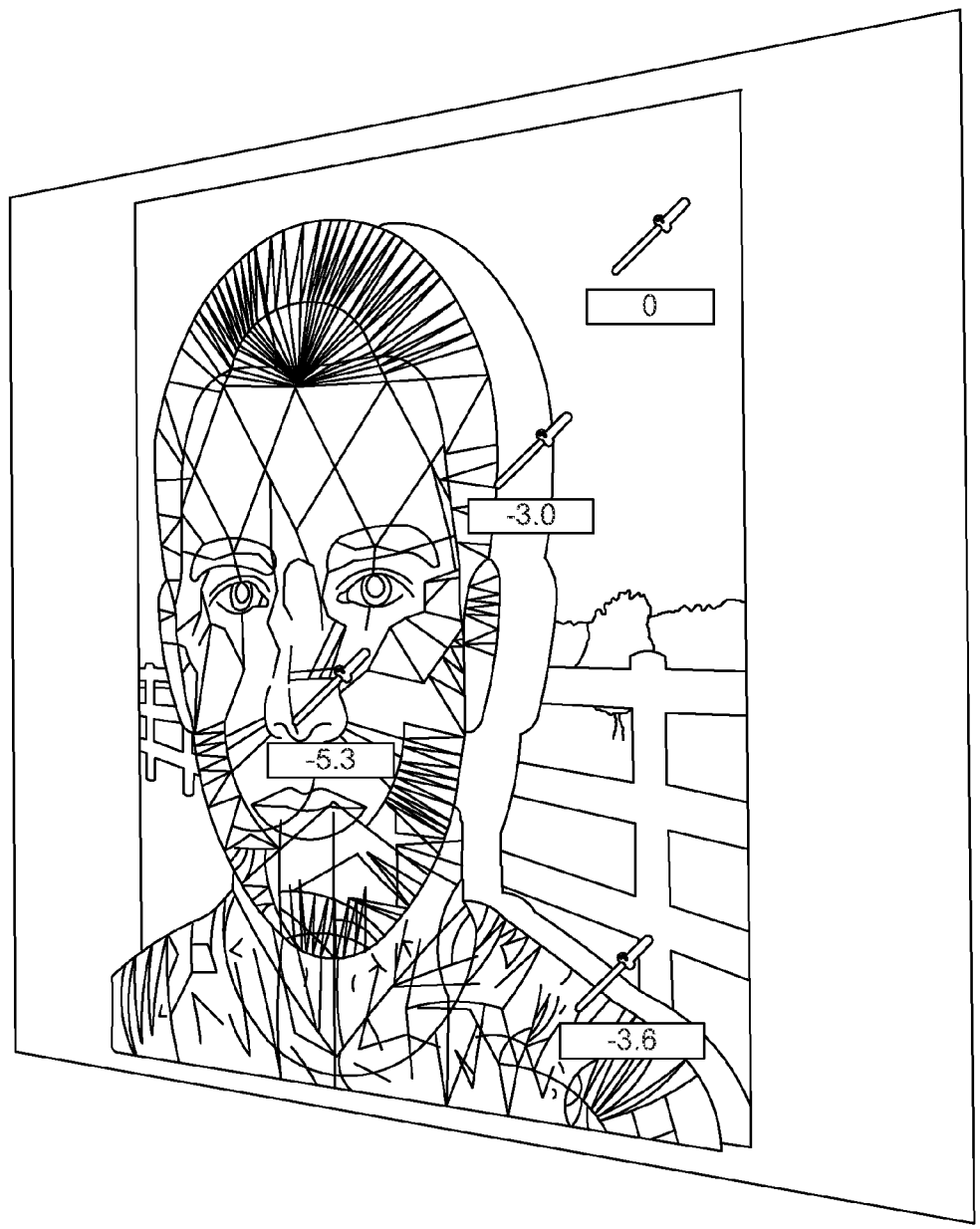
FIG. 32 illustrates an example of an image showing use of one embodiment of a depth sampler.
Figure 33:
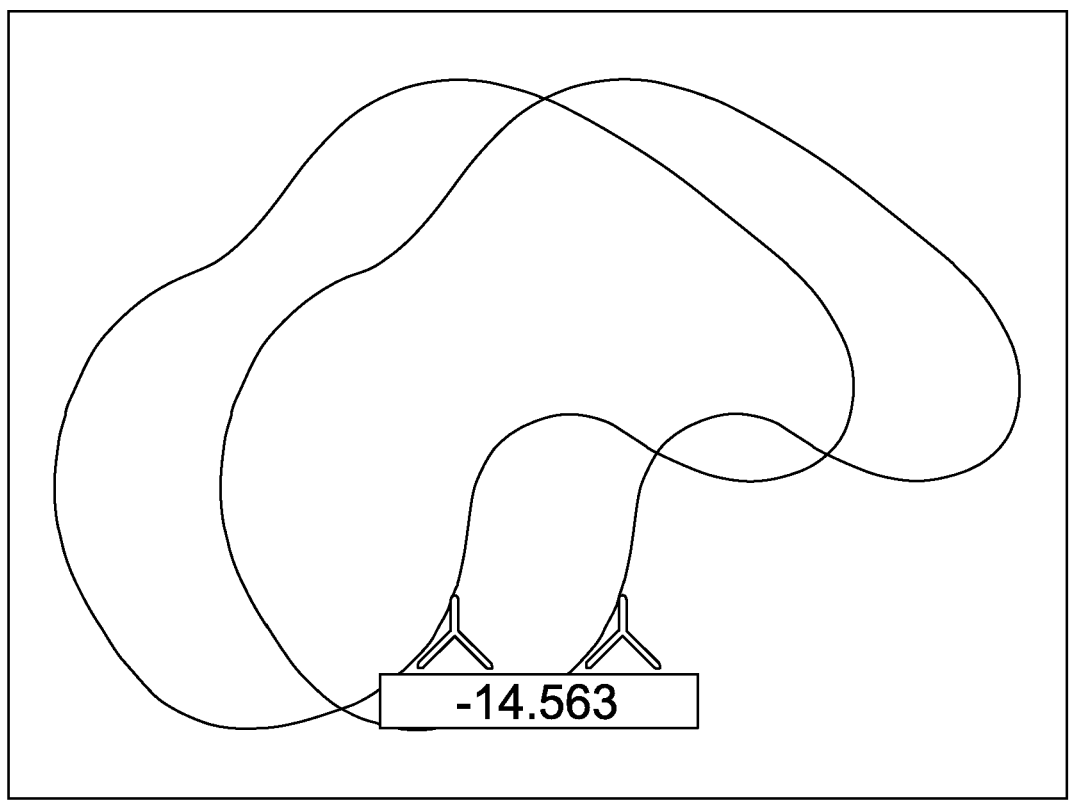
FIG. 33 illustrates an exemplary use of depth cursors.

In embodiments, if the user needs a more accurate measurement of the depth of a particular image element, this may be accomplished by using a depth-sampling tool. The depth-sampling tool samples the Z-depth value of the polygon mesh directly below a display cursor and displays the sampled value as an absolute or normalized number value. If the extrapolation of Z-depth is not possible, as would be the case with an imported stereoscopic pair of images, which does not have an underlying polygon mesh, the user may engage a depth cursor as an alternate tool. The depth cursor is a visual measurement tool. FIG. 32 is an illustration of an image showing use of one embodiment of a depth sampler. FIG. 33 is an illustration of one embodiment of a depth cursor.

By horizontally offsetting the cursor in the two alternate stereoscopic images, the user can measure the parallax difference between the left and right eye views. Additionally, when viewed on a stereoscopic 3D display, the cursor will appear to project or recede into the screen. The user may adjust the horizontal offset of the depth cursor in sub-pixel increments, and may view the updates on the display in real-time. By adjusting the cursor to line up in depth with image elements within the stereoscopic images, the user is able to ascertain the absolute or normalized Z-depth values of those elements.

The drawing tools and parameters needed to create a 3D mesh are user friendly and easy to learn. The ability to view updates to the mesh in a shape viewer and in stereoscopic 3D in real-time allows the user to confirm that his or her input reflects the desired effect. Additionally, the repurposing of object path lines as shape outlines results in efficiencies that are absent in prior 2D to 3D conversion methodologies.

The use of the above disclosed image element segmentation tools, methods, and systems, and other available techniques, allow the user to position objects in a precise and exacting manner. By allowing the user to interact with image elements at the object level, the process remains intuitive and fast. By modifying the image elements at the sub-pixel level using computer algorithms, the process remains fast and accurate.

Element Isolation

In embodiments, after objects have been segmented within an image or sequence of images, the user has the option to make further modifications to objects and depth parameters within the same image or sequence of images. To accomplish this, the user must first isolate the object he wishes to modify. For a complicated image, this might require isolating one specific object out of hundreds of objects. The modified object may also exist on a plurality of frames or images within an image sequence, which means that changes to the parameters of the object need to adjust over time. To accomplish this, a variety of object selection and object interpolation methods, systems, and/or tools may be utilized. Examples of machine-aided and easy to use, methods, systems, and/or tools for object selection include, but are not limited to: tag selection; visibility map selection; and/or object list selection.

Tag Selection

Figure 34A:
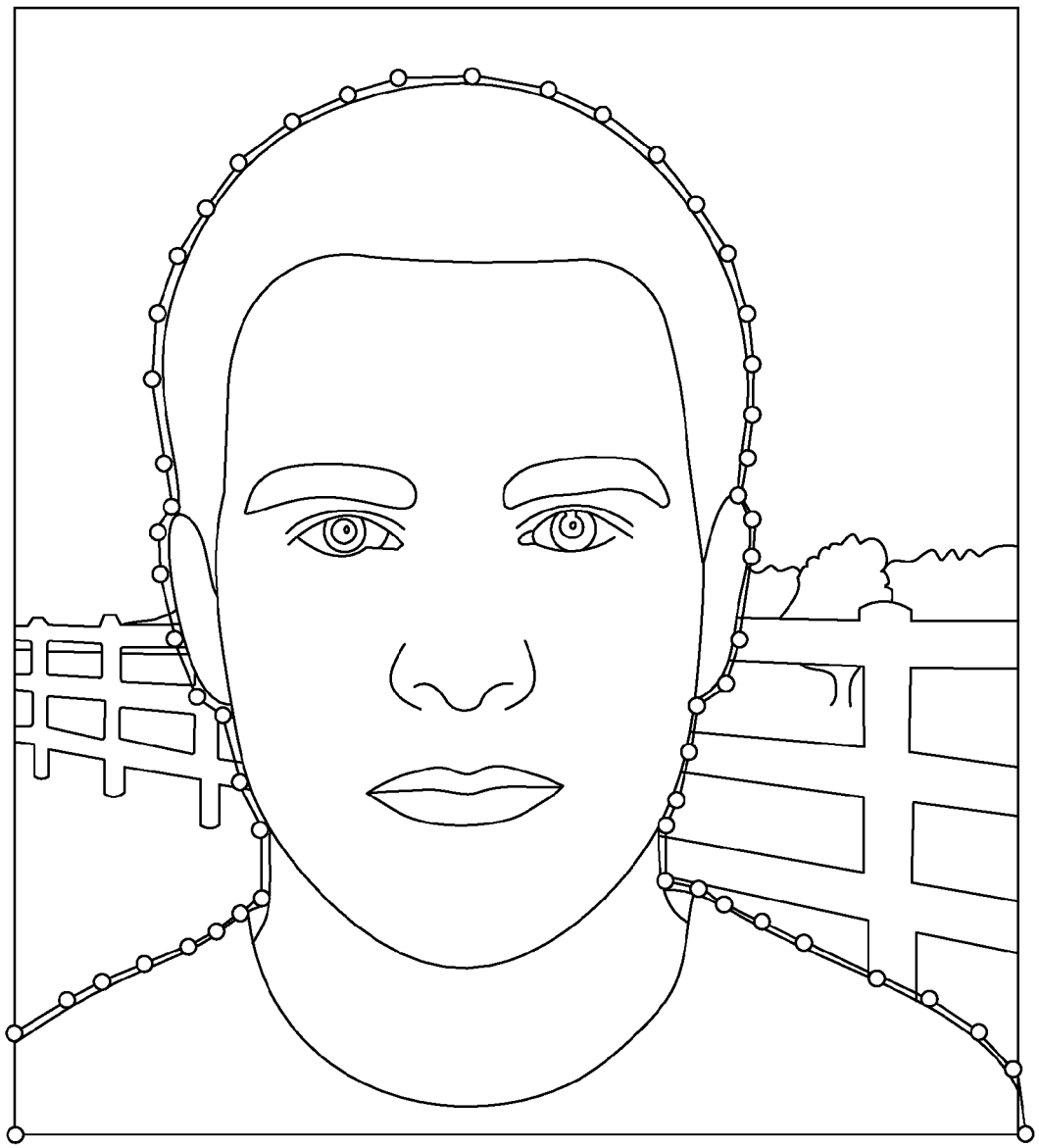
FIGS. 34A-34B illustrate exemplary uses of object path lines used for creating object offset.
Figure 34B:
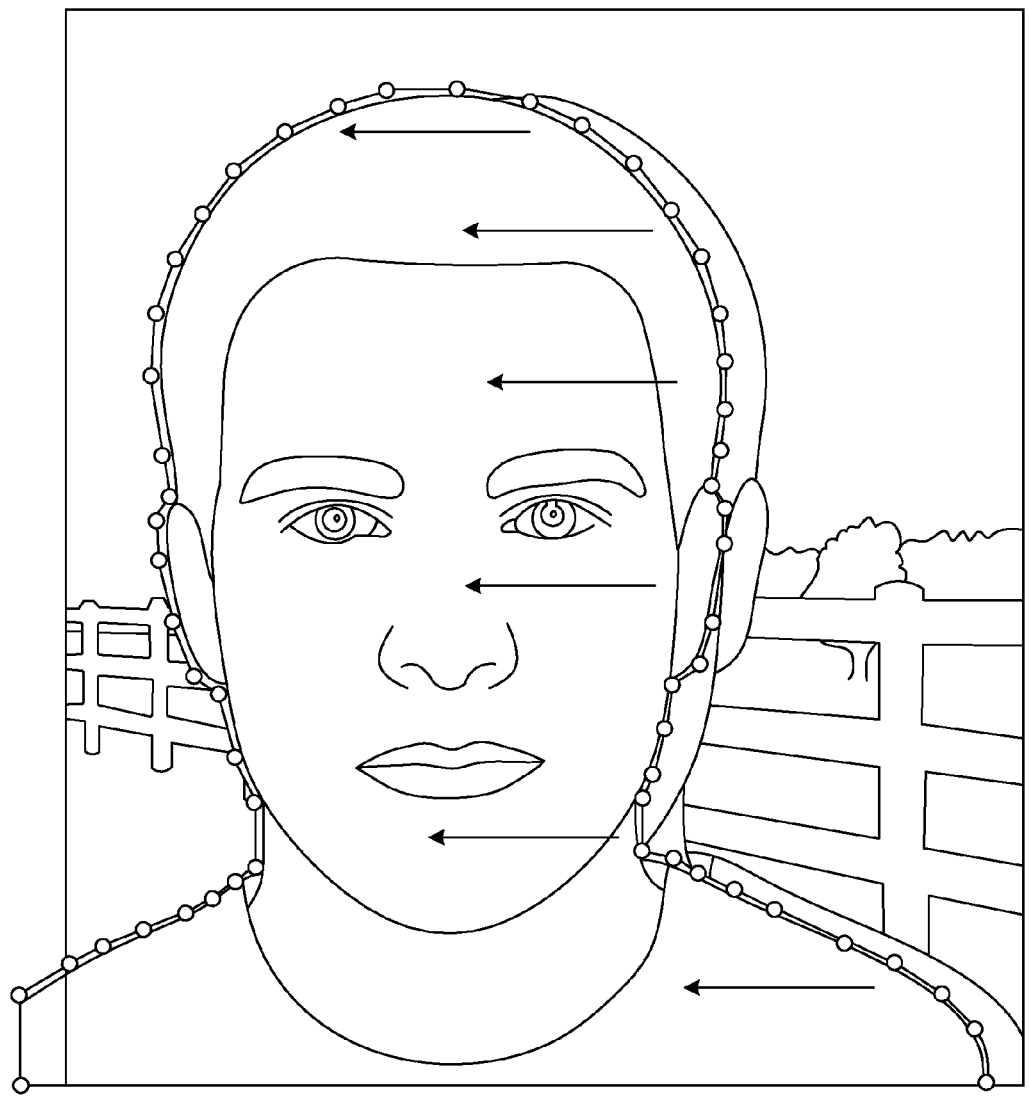

In embodiments, the standard editing drawing tool is a versatile and easy to use tool and it is readily available to a user. The drawing tool allows the user to select objects by drawing a line that intersects one or more preexisting object path lines. After drawing the line, the user may isolate and select those objects in a process known as "tagging". The tagging line can be drawn in any view, and objects may be selected regardless of their depth. To aid in this selection method, object path lines are preferably given the same horizontal offset as the object they encompass when an alternate perspective is viewed. This allows object path lines to visually line up with image elements, regardless of any pixel repositioning that may have occurred due to the new perspective being generated. FIG. 34A is an illustration of an image wherein an object includes an object path line. FIG. 34B is an illustration of an image showing an object and object path line being offset along with pixel data.

Figure 35A:
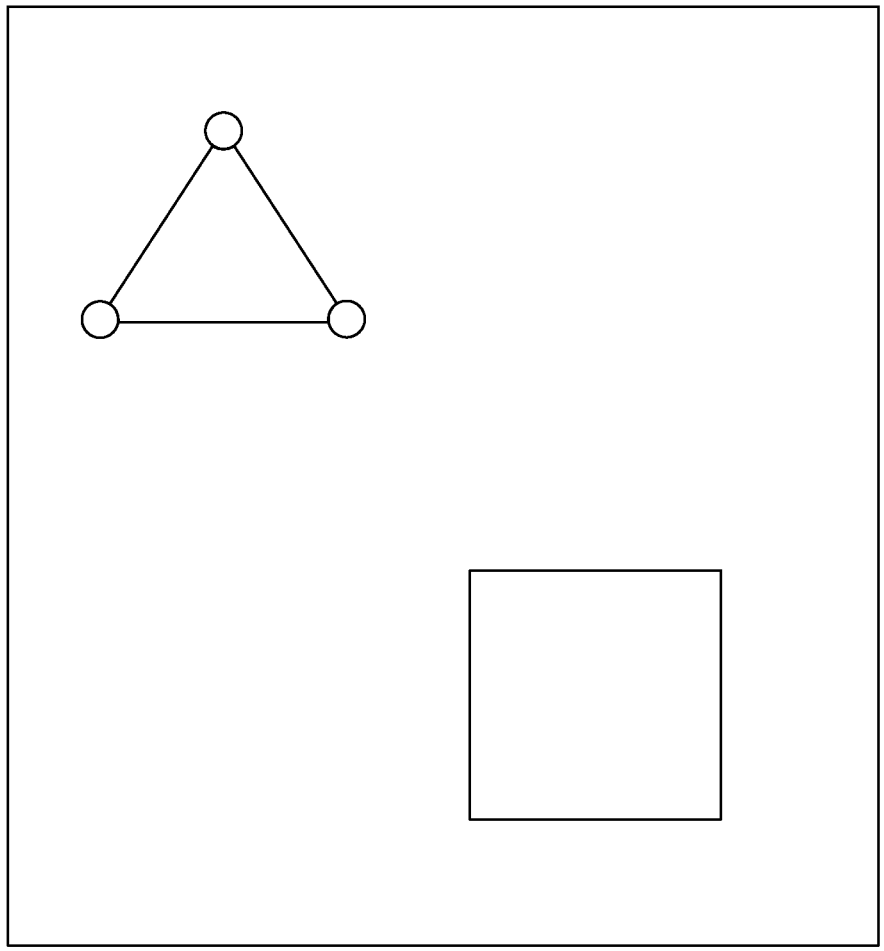
FIG. 35A-35C illustrate examples of tag selection techniques.
Figure 35B:
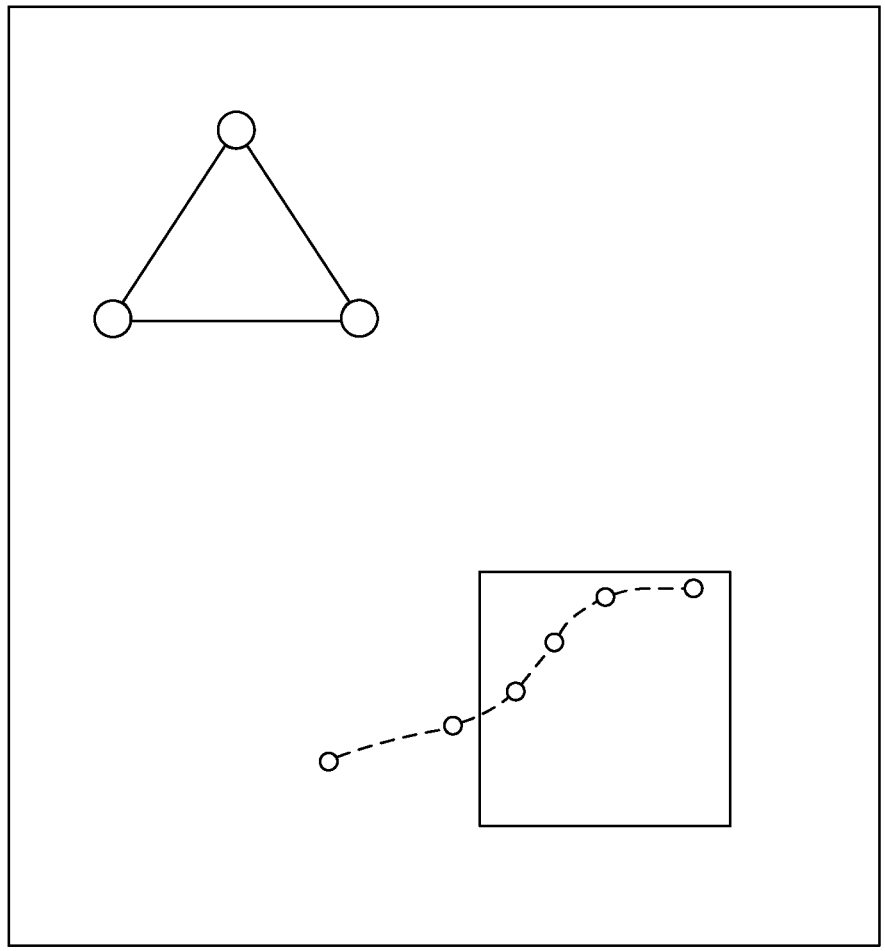
Figure 35C:
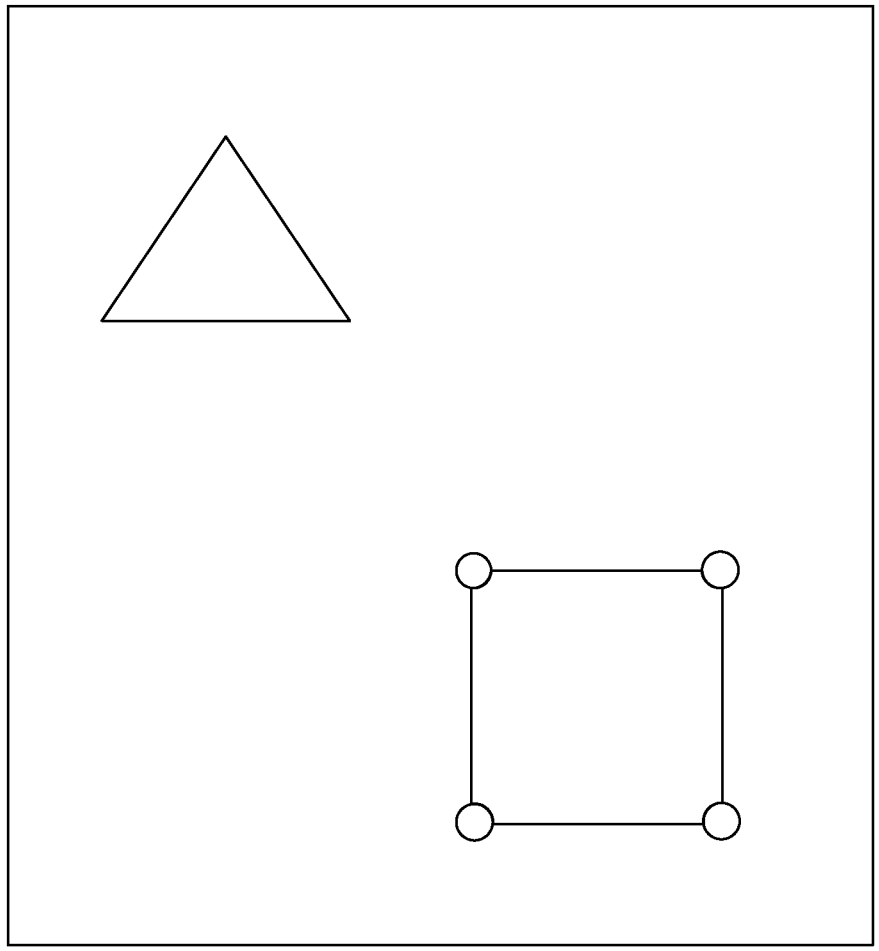

FIGS. 35A, 35B, and 35C are illustrations of one embodiment of a tag selection technique. FIG. 35A shows an unselected square object and a previously selected triangle object. FIG. 35B shows a user initiated path line passing into the unselected square object. This is the act of tagging, as any object path line that intersects with the user initiated path line is considered "tagged." At this stage, the user would initiate a tag selection operation, which will add any tagged objects to the selection set. FIG. 35C shows the newly selected square after tag selection is applied.

Visibility Map Selection

After objects are created and segmented within a scene, image, or sequence of images, a visibility map may be generated. The visibility map defines each object as a unique, flat color that is visible from multiple perspectives. The visibility map takes the object's depth, perspective, and shaping into account. The visibility map can then be used by one or more selection tools to isolate and select objects. This is typically accomplished by the user using standard function keys on a computer keyboard and moving a cursor, via a mouse, over the image. As the cursor passes over a colored region of a display (such as a monitor) of the visibility map, the software aiding the user in completing the method of the present invention recognizes the object that generated that colored region, and automatically selects it.

Figure 36A:
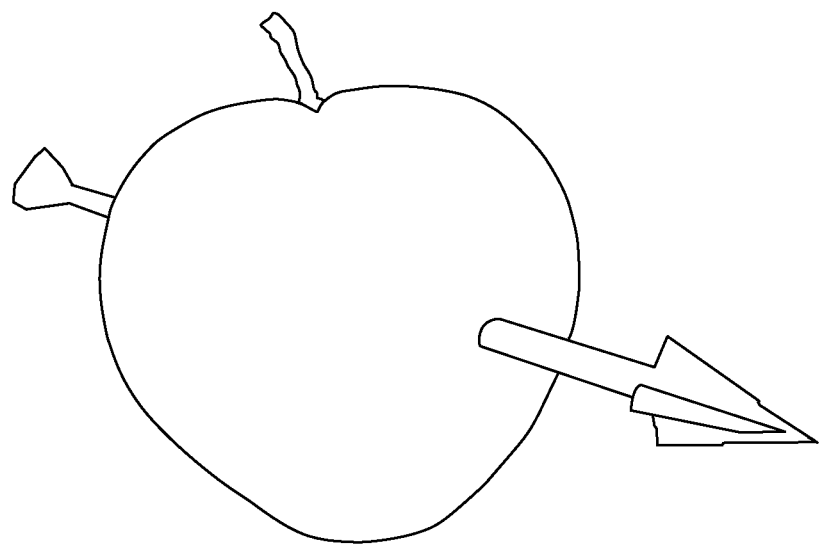
FIG. 36A-36C illustrate examples of using visibility maps for object selection.
Figure 36B:
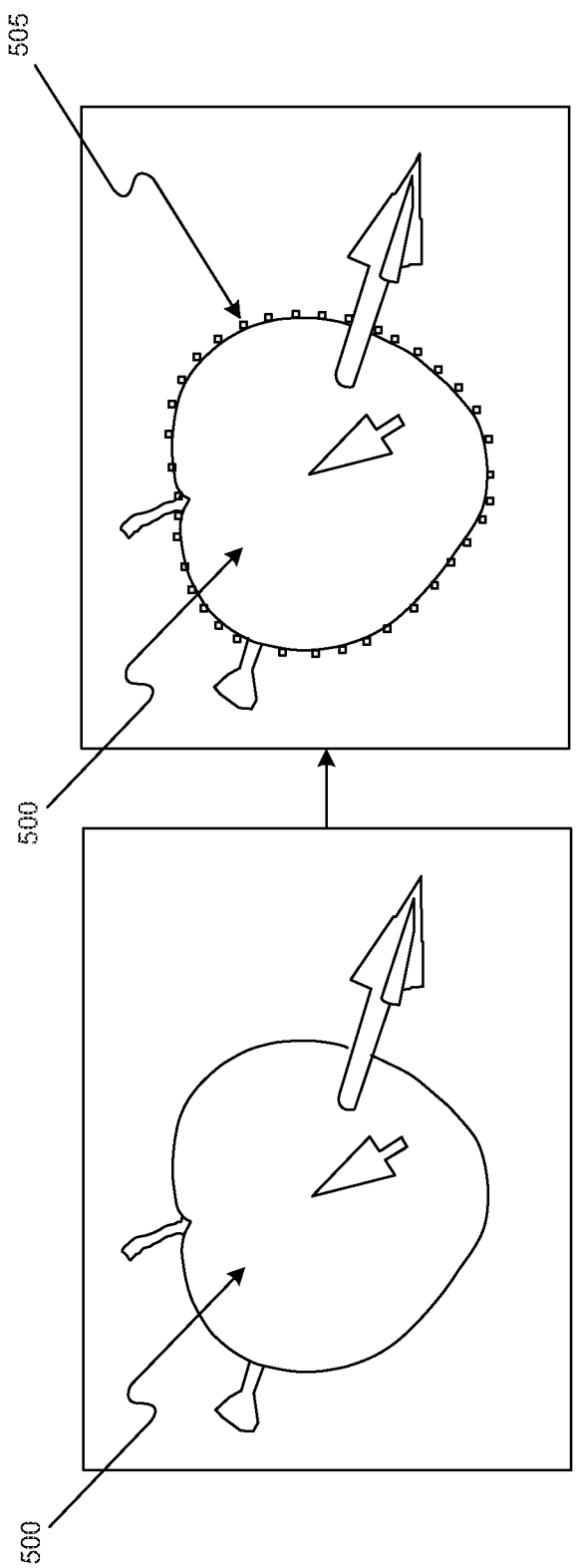
Figure 36C:
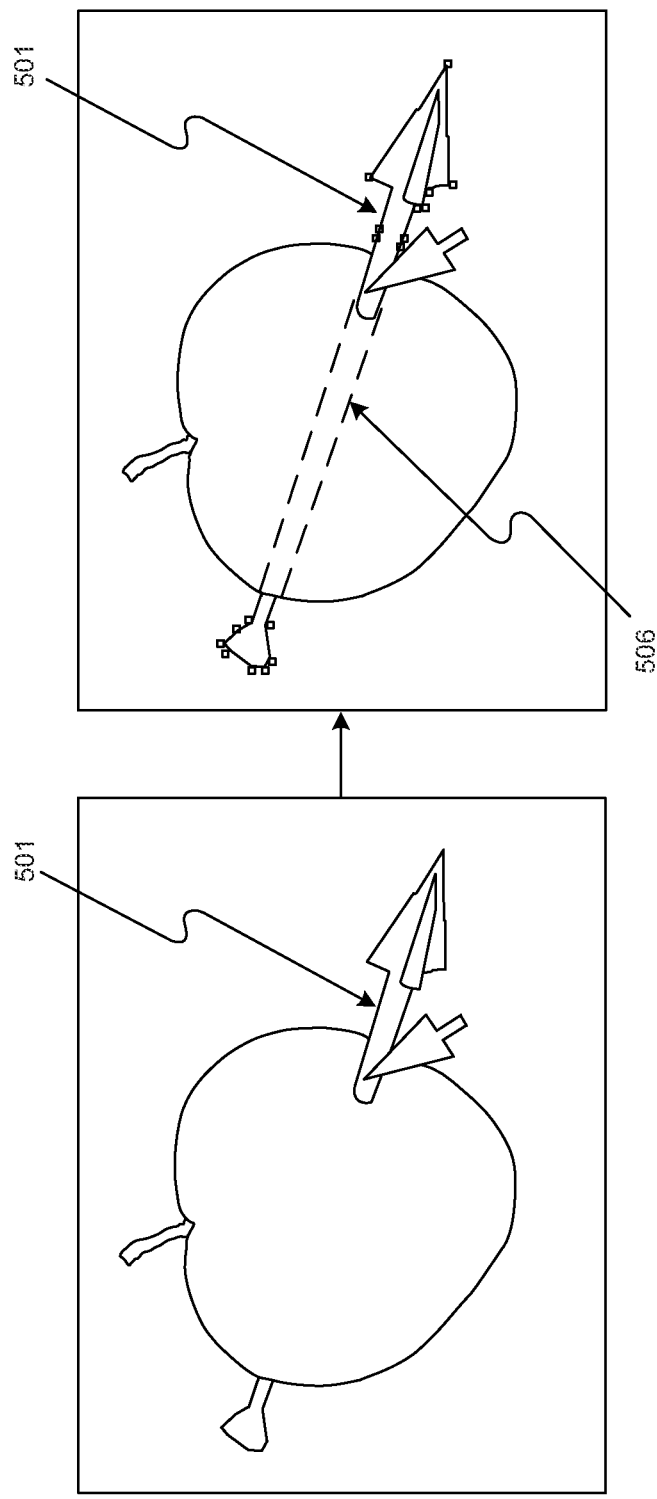

Alternately, the user can select (e.g., by using a computer mouse) a portion of the image in a display, and that will trigger a selection based on the depth of the objects at that region. Each click will select the object behind the current selection, until the furthest back object is selected, and the selection cycles back to the foremost object. FIG. 36A is an illustration of an image wherein a visibility map has been applied. FIG. 36B is an illustration of an image wherein a visibility map has been applied and the user has selected an object. FIG. 36C is an illustration of an image wherein a visibility map has been applied and wherein the user has selected a second object. In FIG. 36B, the user has selected apple 500. In FIG. 36C, the user has selected arrow 501. After selection the outlines 505 and 506 is visible in the shape viewer.

Object List Selection

Figure 37:
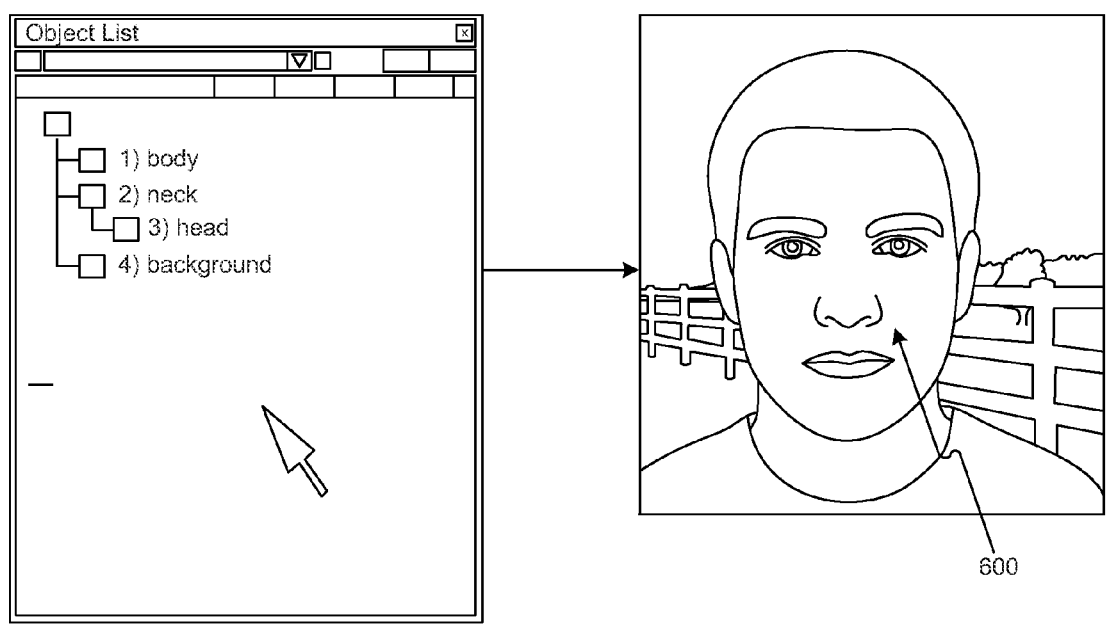
FIGS. 37-38 illustrate examples of object lists and object selection from object lists.
Figure 38:
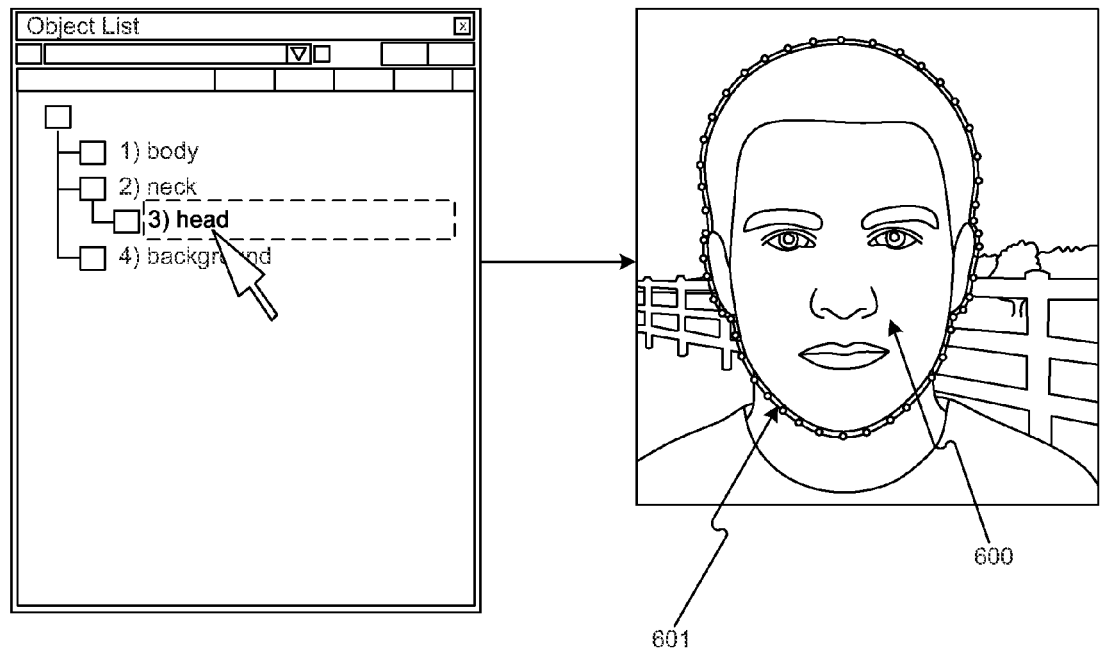

In some scenes, images, or sequence of images, the density of the object path lines may be overwhelming to the user, which prevents the user from easily making selections based off the image display. If this occurs, the selection may be aided by an ordered list. Every object that is created and segmented is on an ordered list. The objects may be moved up or down the hierarchy of the list, and are preferably given identifying names, which allow the list to be sorted. If the user wants to select an object, all the user must do is find and select the name of the object on the ordered list. The ordered list can also be overlaid on top of the image so that when the cursor is moved over a specific region of the frame, the ordered list displays the object names under the cursor. In this case, the ordered list only lists the objects that fall within the region beneath the cursor. FIG. 37 is an illustration of one embodiment of an object list. FIG. 38 is an illustration of one embodiment of an object list and using the object list for object selection. FIG. 38 shows the user selecting "3) head" and the head 600 is shown as selected with the outline 601 visible.

Figure 39:
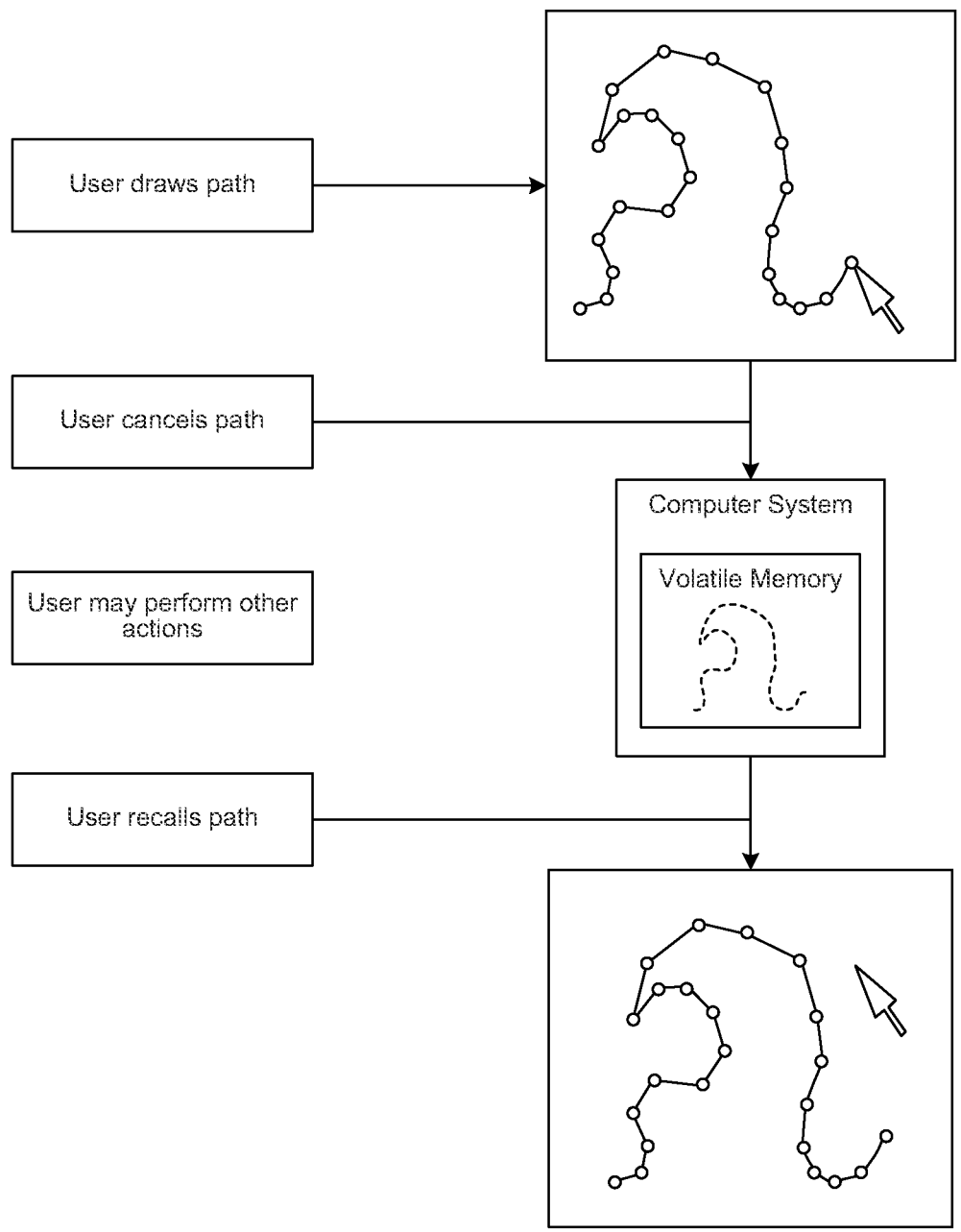
FIG. 39 is a flow diagram illustrating an exemplary path recall operation.

Using the selection methods discussed above, a user can quickly find and isolate one object out of hundreds on the screen. Further, after the selection is made, the user has the option to make changes to the selected object. In embodiments, the user also has the ability to make changes to the selected object that varies over time. These time varying changes can be based on a mathematical formula, which makes the change process very efficient. Also, changing the values for multiple objects, either uniformly or relatively, is made significantly easier through the automation of a machine. FIG. 39 is a flow chart and illustrations showing one embodiment of a path recall feature. When the user creates a path, and then cancels the path, the path information is maintained in computer memory until another path is created. The user may later recall that data after performing other actions besides path creation. In this way, the user can use the computer cursor for other tasks before committing a drawn path to becoming an object or object element. The path data that will be recalled is automatically updated and overwritten in computer memory whenever the user initiates a new drawn path.

Interpolation

In embodiments, the user guided systems and methods discussed herein preferably include the use of computer aided interpolation methods, systems, and tools to speed up the process of the 2D to 3D conversion. Examples of machine-aided and easy to use methods, systems, and/or tools for object interpolation may include, but are not limited to: key frame animation; parenting; and/or global parameter modification, as will be discussed in further detail below.

Figure 40:
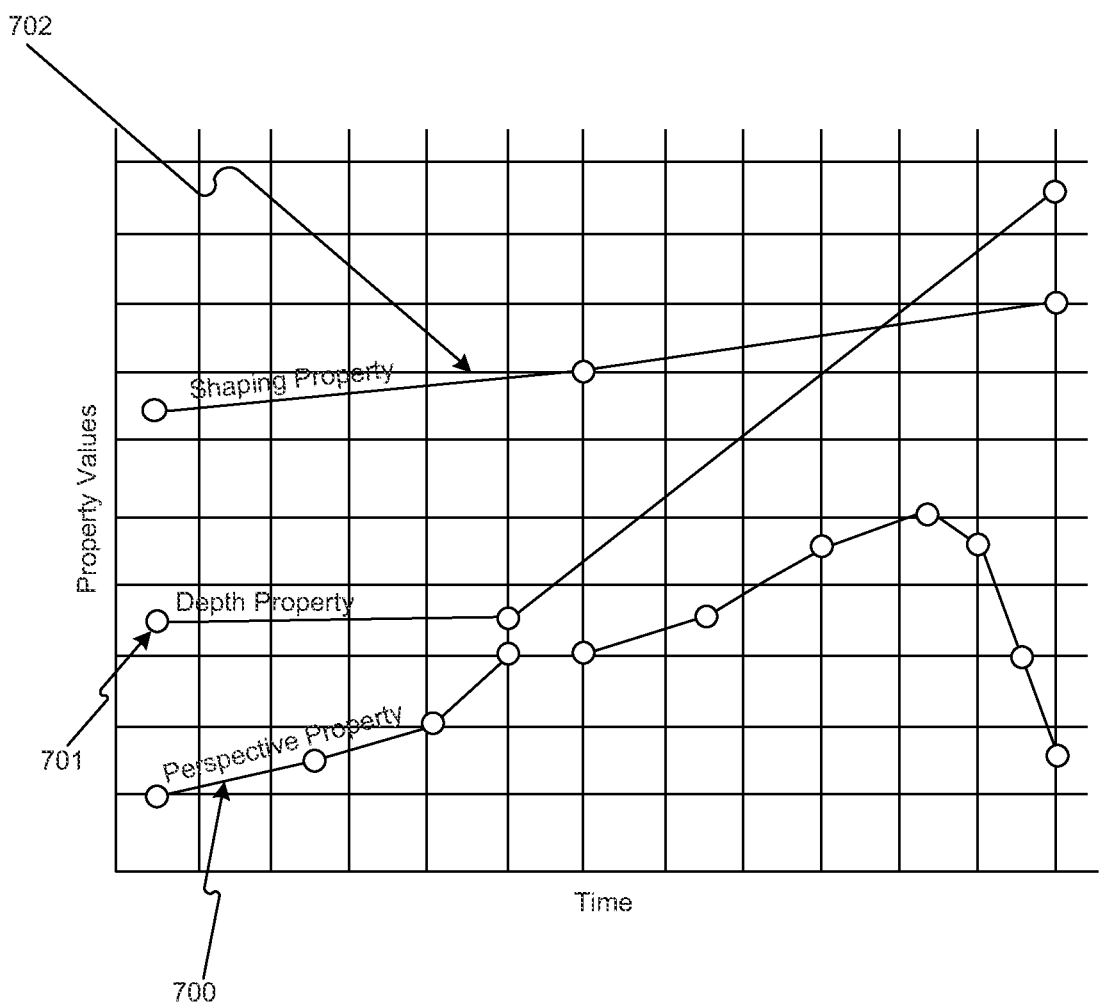
FIG. 40 illustrates an example of animation channels, depicting per attribute key frames.

Key Frame Animation:

The features discussed herein include the ability to alter parameters on different frames, images, or sequences of images, for different objects. The altered values are stored in memory as key frames in discrete animation channels. Animation channels may include, but are not limited to: path line; depth; perspective vector; shape amplitude; shape contour line; shape outline; edge curvature; visibility; depth grade; and depth convergence. Key frames are preferably able to be modified, copied, moved, or deleted from individual animation channels without affecting the key frames of neighboring images. FIG. 40 is a graph of one embodiment of animation channels, showing per attribute key frames. FIG. 40 shows how three the property values of different animation channels, perspective property 700, depth property 701, and shaping property 702, vary over time.

Figure 41A:
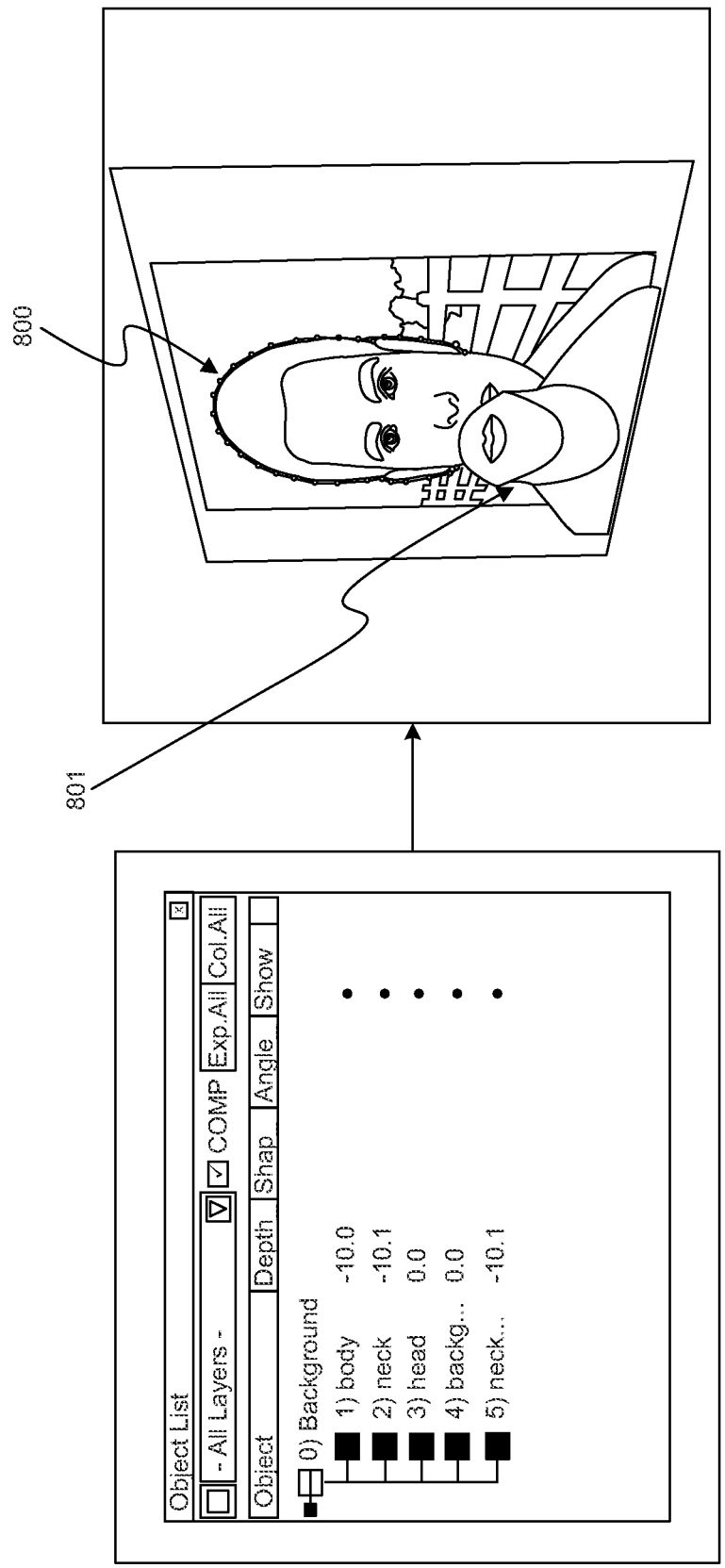
FIGS. 41A-41B illustrate an exemplary object parenting operation and the operation's effect on depth attribute inheritance.
Figure 41B:
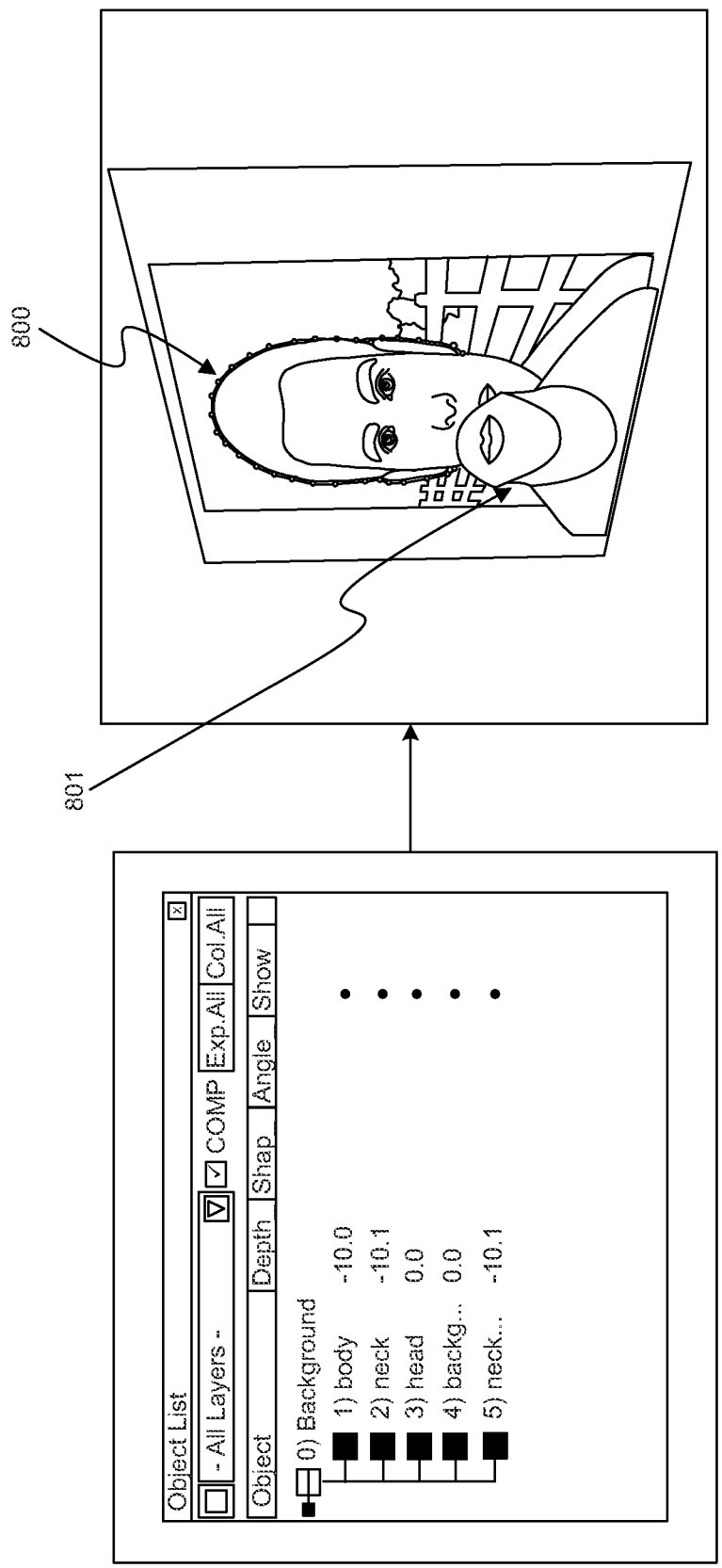

Parenting:

In embodiments, the user is able to parent one object to another object via a simple drag and drop action. After it has been parented, the child object inherits the depth, perspective, and animation attributes of the parent object. The child object preferably maintains the ability to have independent animation key frames, which influence only the child object. FIGS. 41A and 41B are illustrations of object parenting, and its effect on depth attribute inheritance. As shown in FIGS. 41A and 41B the head 800 inherits the depth of the parent mouth, neck, body 801.

Figure 42A:
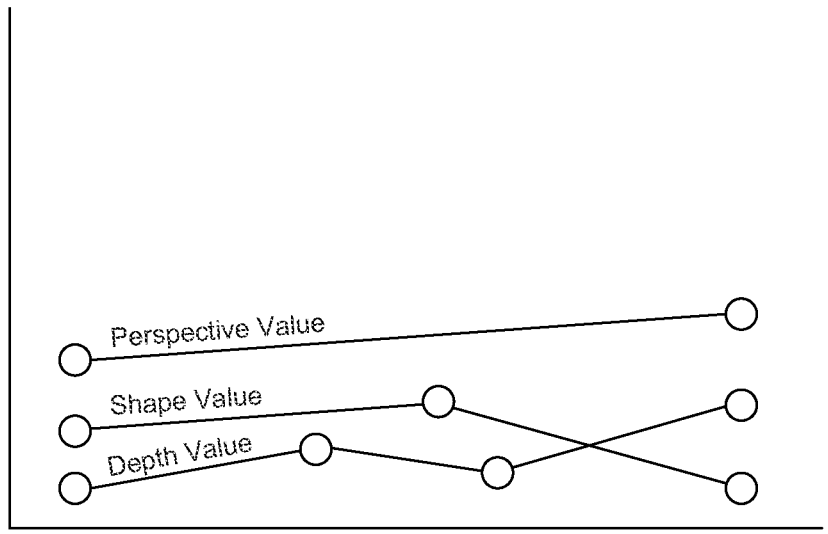
FIGS. 42A-42C depict exemplary animation channels, showing per attribute key frames.
Figure 42B:
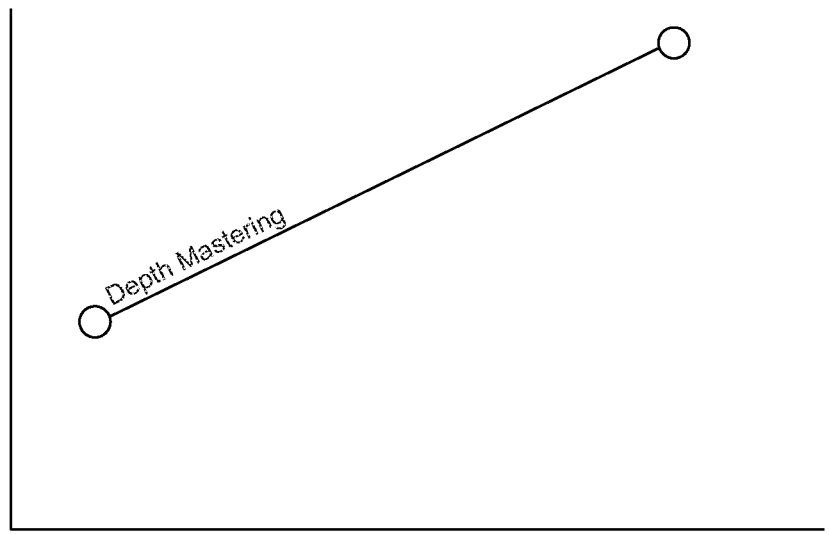
Figure 42C:
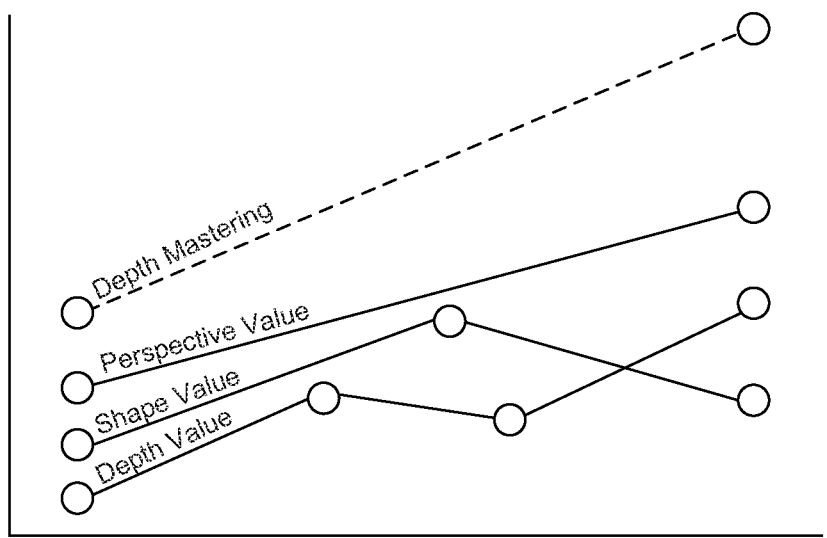

Global Parameter Modification:

After one or more objects have been animated with animation key frames, potentially numbering in the hundreds, it can become difficult to modify the entire scene, image, or sequence of images as a whole. This difficulty may be overcome through the use of a global parameter modification tool. The global parameter modification tool can change global depth values for all objects in the scene, or a group of selected objects. The global parameter modification tool may be used to create additional animation key frames, or can be limited to merely modify only the existing animation key frames. FIG. 42A is a graph of one embodiment of animation channels, showing per attribute key frames. In this way, different aspects of an object's animation are kept separate so they may later be modified. FIG. 42B is a graph of one embodiment of global animation channel. The global animation channel allows the many different animation channels to be modified at once, allowing the user to quickly update animation values. The combination of separate animation channels and global animation channels allows the user to quickly and accurately animate object parameters. FIG. 42C is a graph of the global animation channels acting on top of individual animation channels.

Compositing

After the image or sequence of images has been segmented and the depth of the image has been extrapolated (or interpolated), in at least some instances, the image or sequence of images might exhibit areas of missing image data or artifacts. These artifacts are revealed as previously hidden portions of the scene come into view during creation of the alternative view images. In order to maintain a high quality 2D to 3D conversion, these areas of the new alternative perspective view images must be modified to create a seamless effect. The integration of these image modifications into the 2D to 3D conversion workflow is preferably managed through a computer during the compositing process.

Examples of machine-aided and easy to use methods, systems, and/or tools for image compositing may include, but are not limited to: automated occluded area fills on a per object basis, layering of modified image data, pre-compositing image data to avoid depth collisions, reintroducing transparencies, and edge antialiasing via super sampling.

Figure 43A:
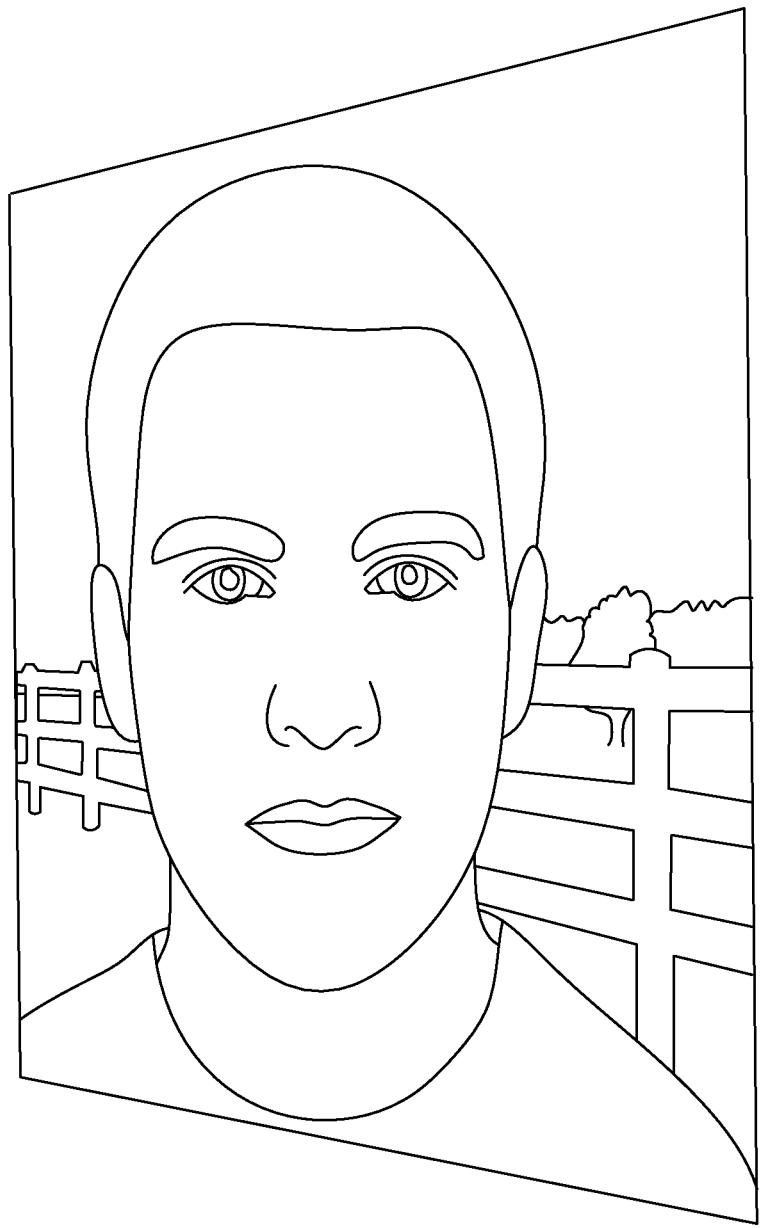
FIG. 43A is an illustration of an image with an object in the foreground.
Figure 43B:
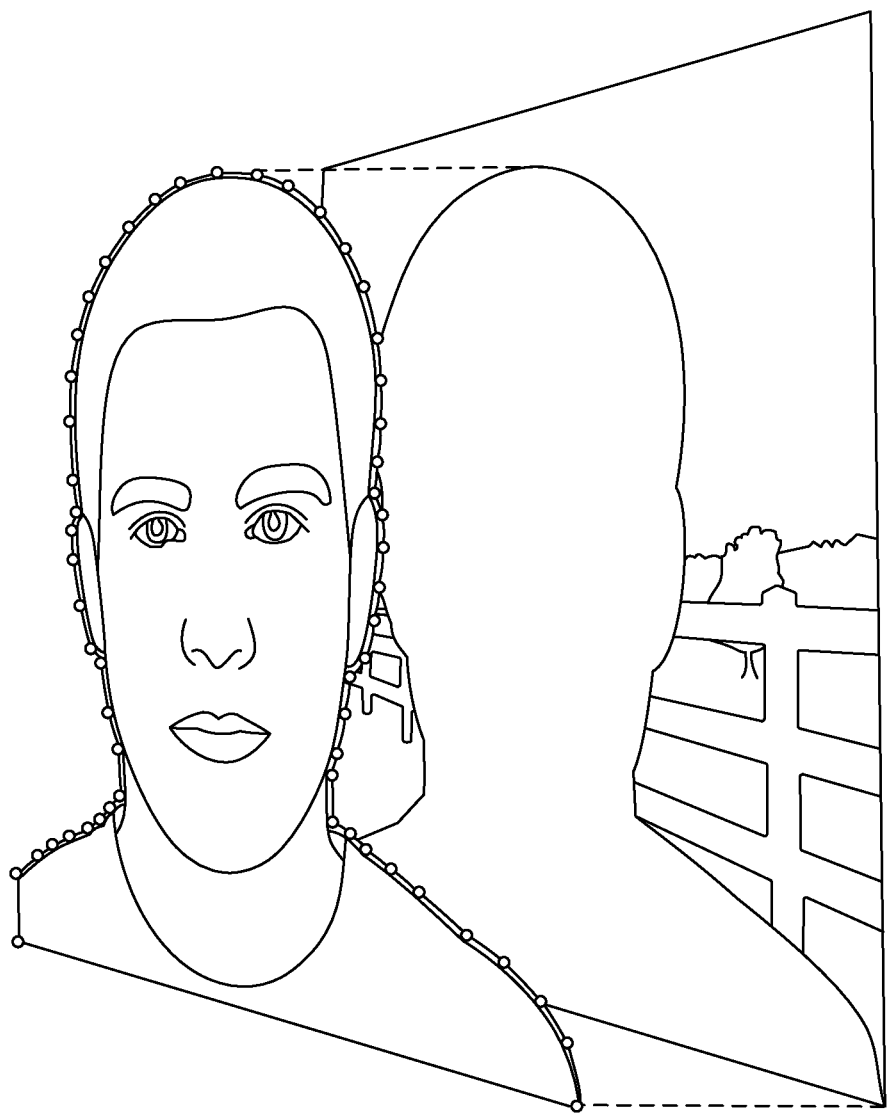
FIG. 43B is an illustration of a perspective view of an image with an object in the foreground and with previously occluded areas in the background revealed.
Figure 44A:
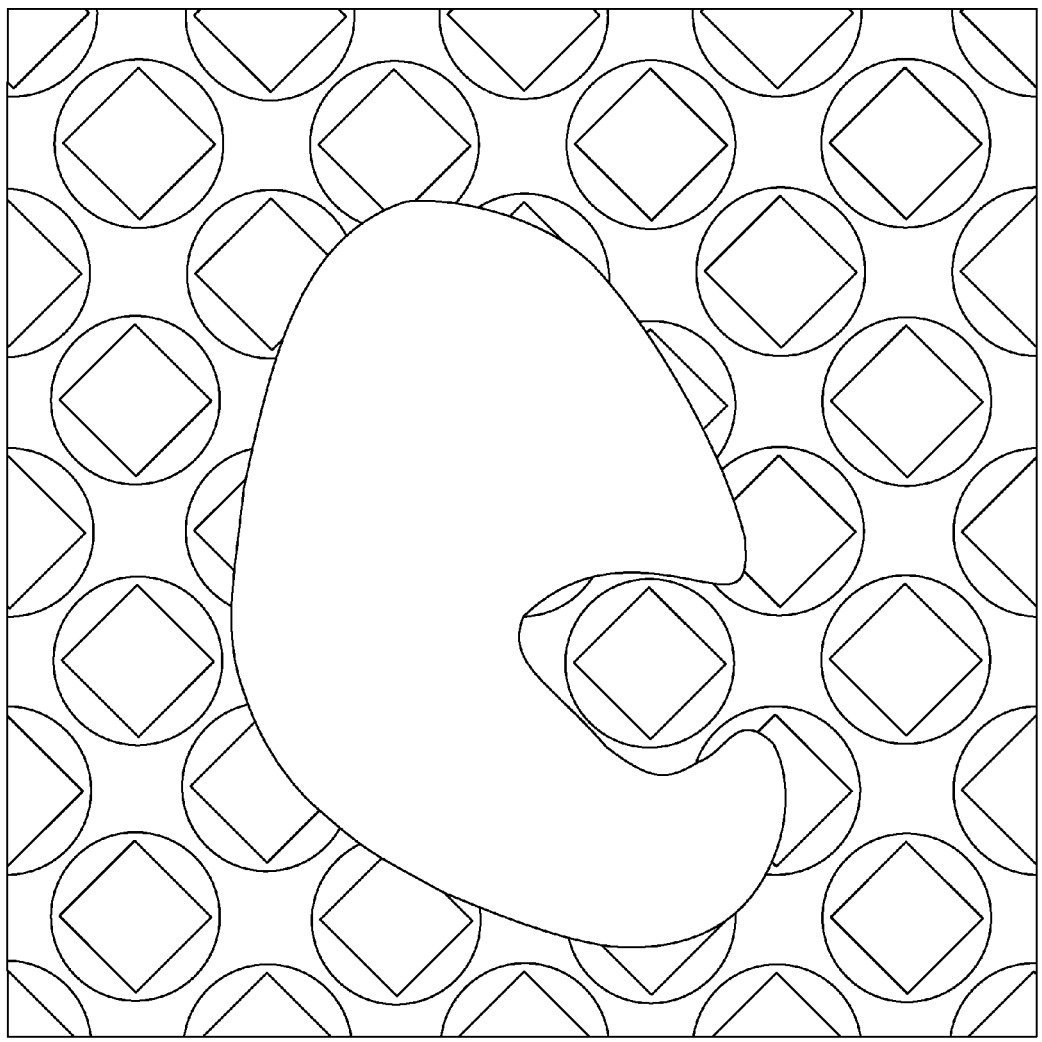
FIGS. 44A-44F illustrate various fill-type techniques used for filling in occluded regions.
Figure 44B:
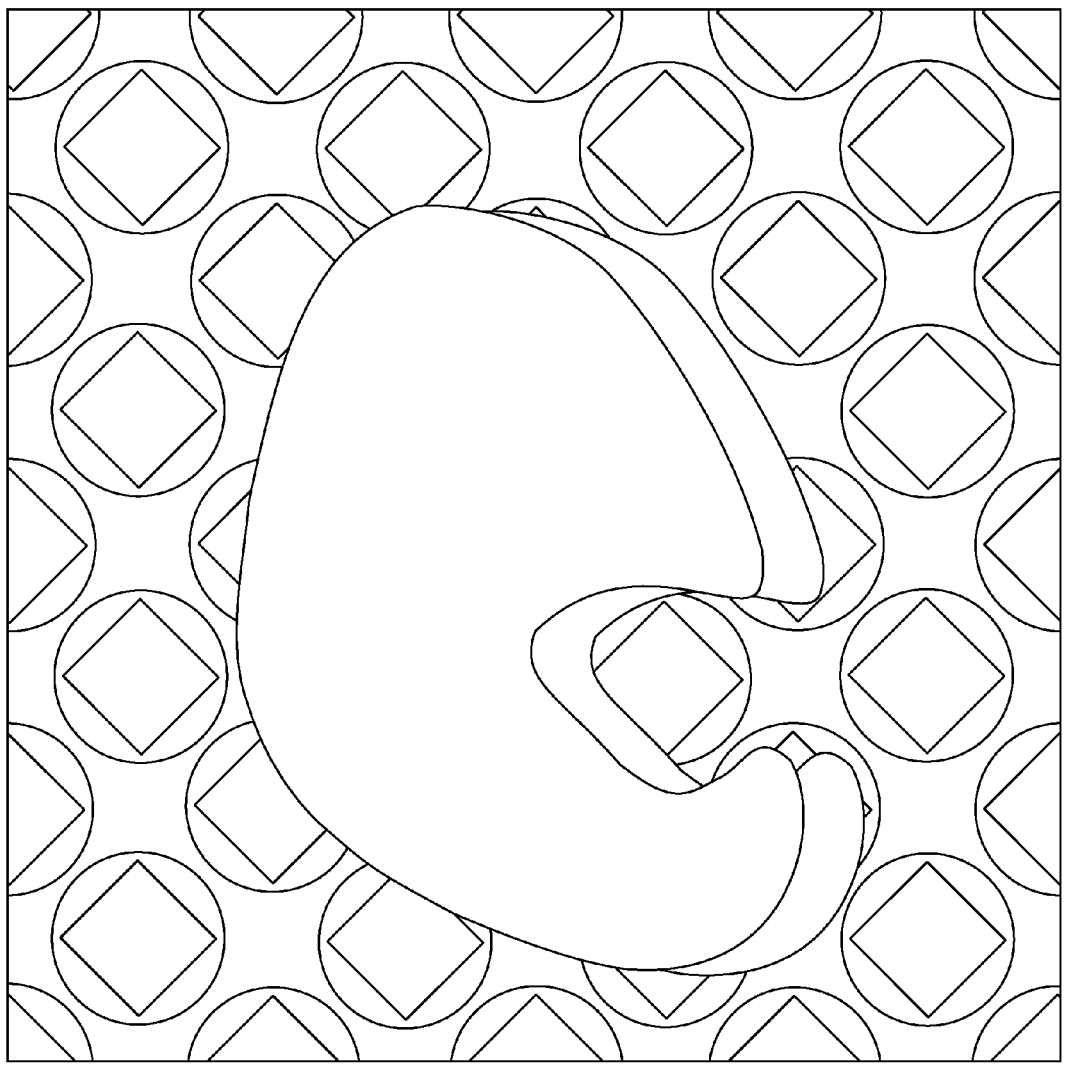
Figure 44C:
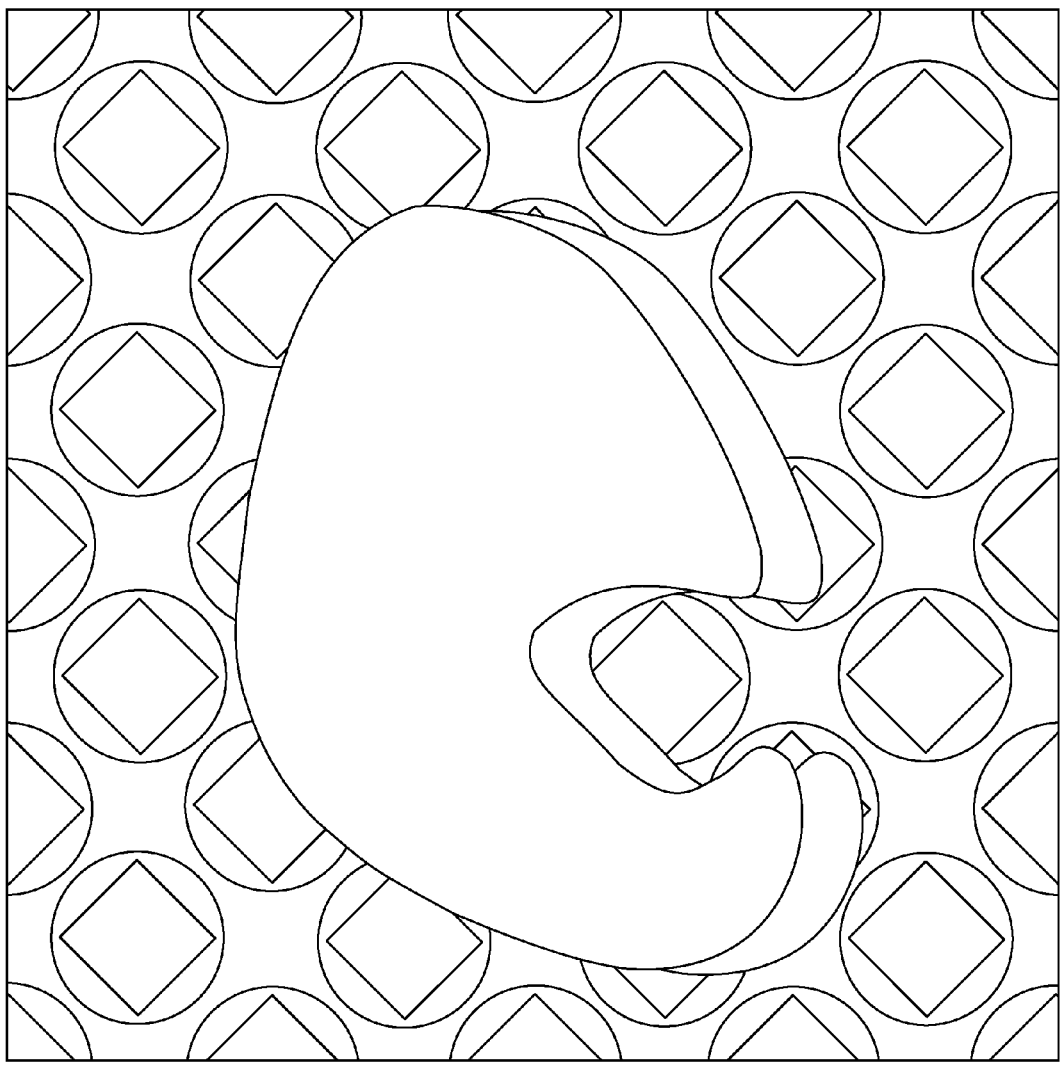
Figure 44D:
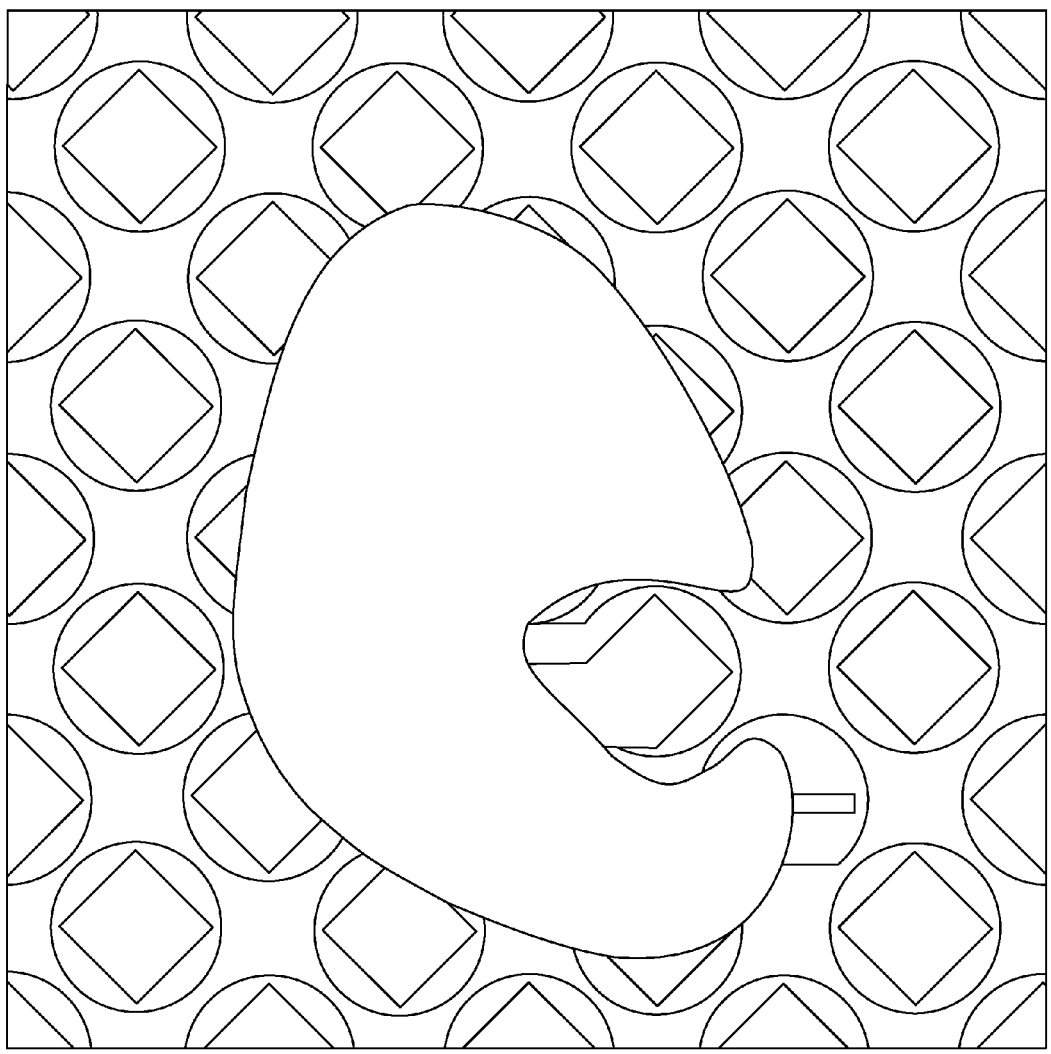
Figure 44E:
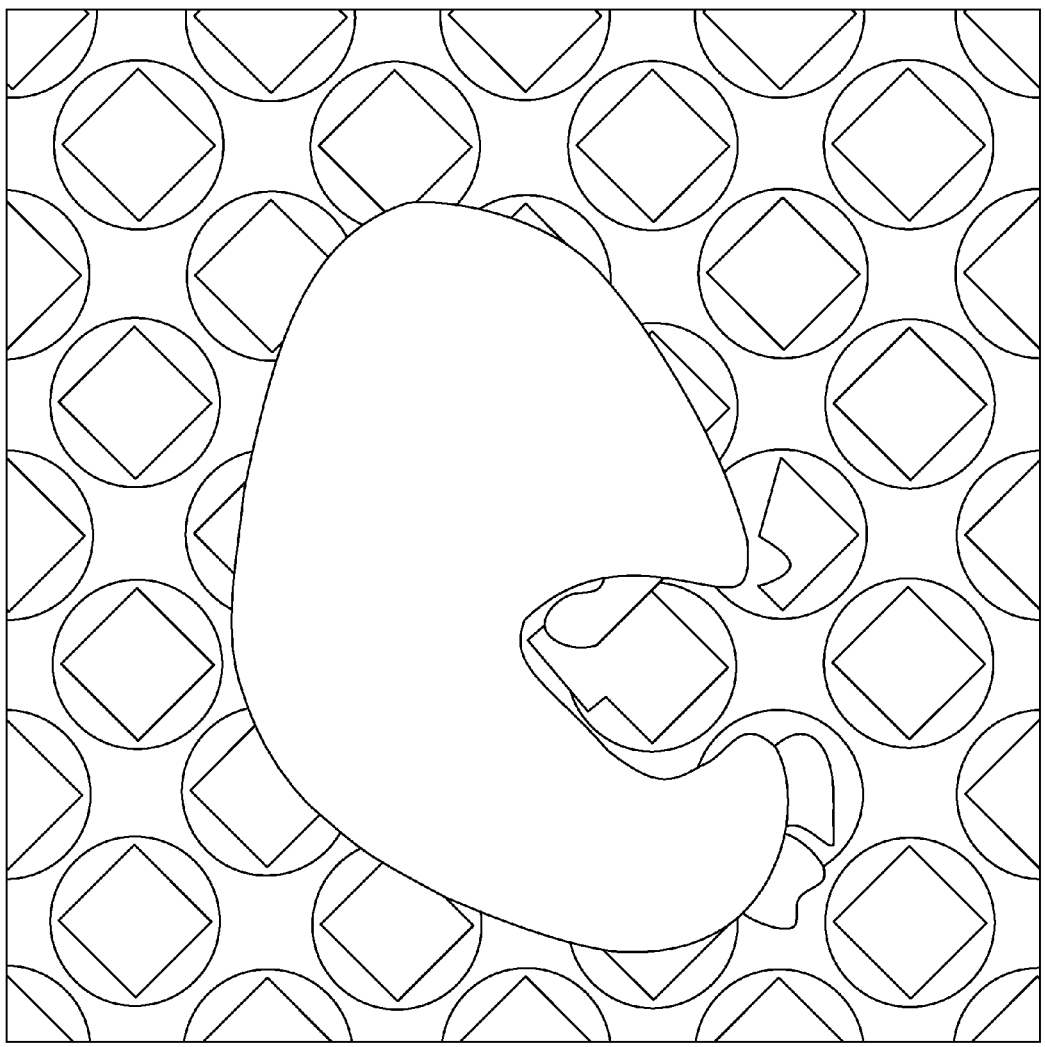
Figure 44F:
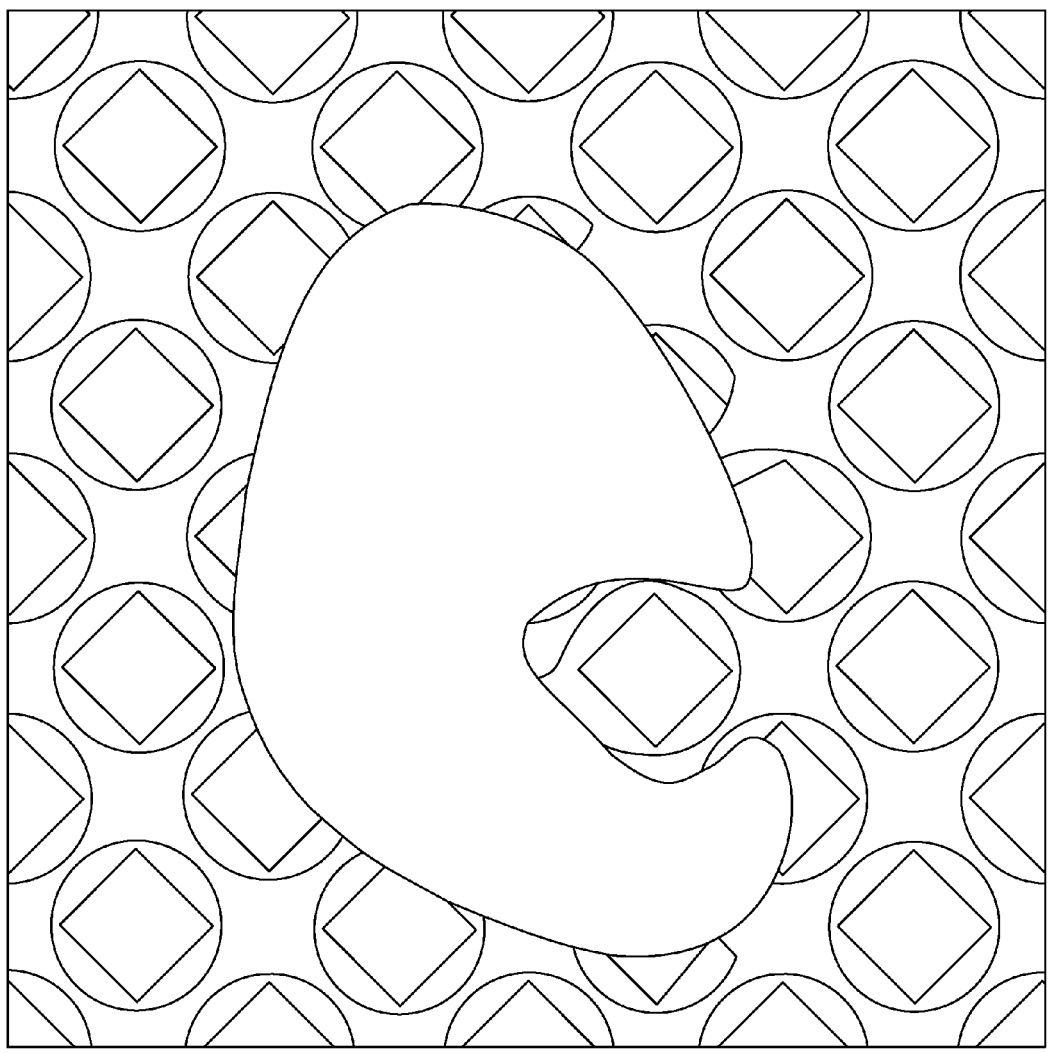
Figure 45:
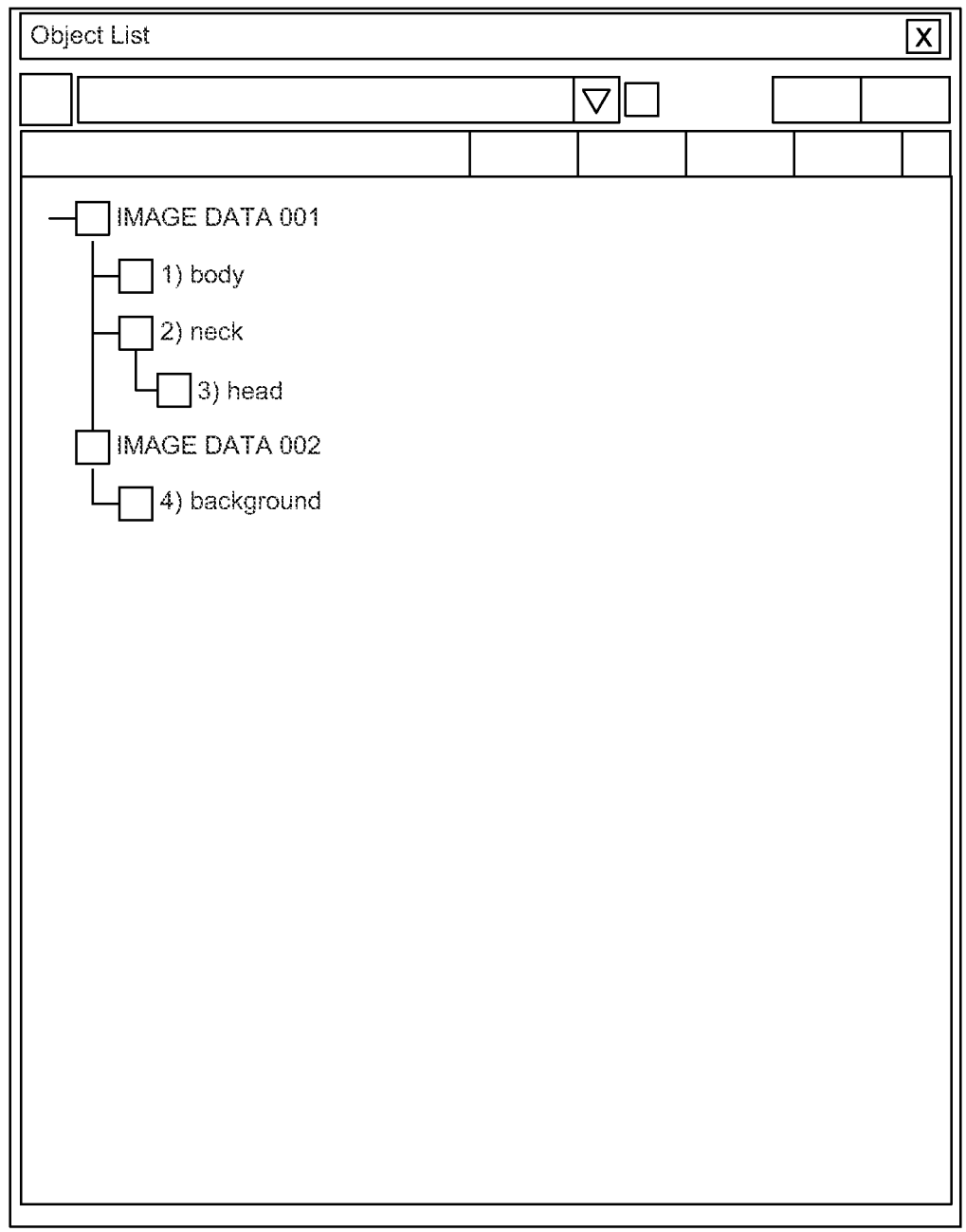
FIG. 45 is an illustration of an object list showing layered image information.

FIG. 43A is an illustration of an image with an object in the foreground. FIG. 43B is an illustration of a perspective view of an image with an object in the foreground and with previously occluded areas in the background revealed. The revealed area typically must be filled in with proper data. FIG. 44A is an illustration of an object showing passthrough fill type. FIG. 44B is an illustration of an object showing image repeat fill type. FIG. 44C is an illustration of an object showing solid color fill type. FIG. 44D is an illustration of an object showing pixel repeat fill type. FIG. 44E is an illustration of an object showing pixel envelope fill type. FIG. 44F is an illustration of an object showing pixel stretch fill type. FIG. 45 is an illustration of an object list showing layered image information. The layered image information shown in FIG. 46 aids in the compositing.

Figure 46A:
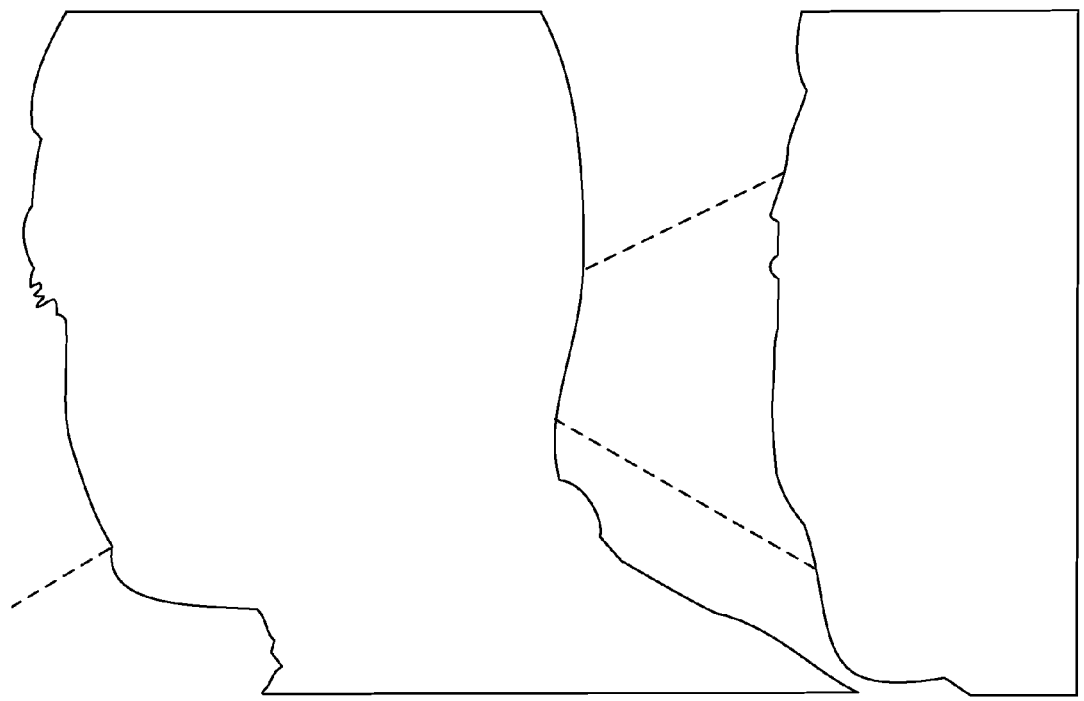
FIGS. 46A-46F illustrate examples of edge-only anti-aliasing operations.
Figure 46B:
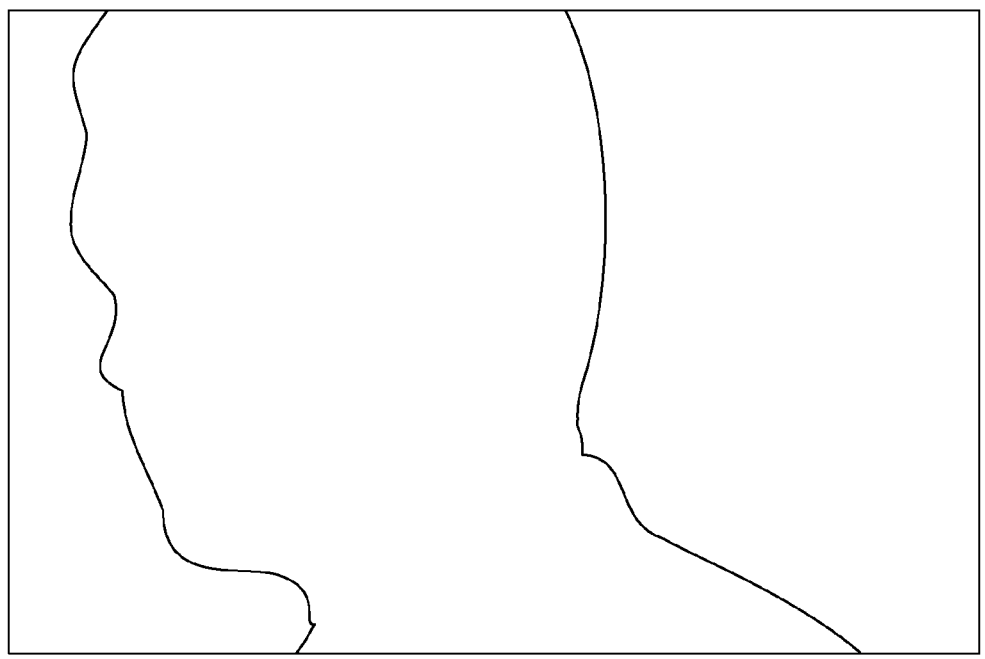
Figure 46C:
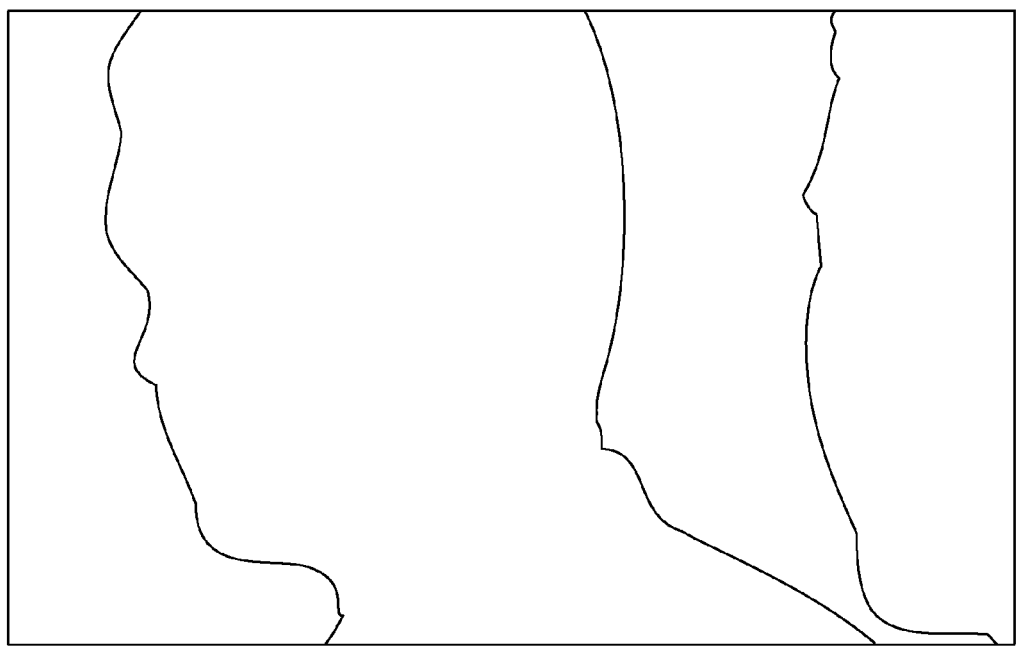
Figure 46D:
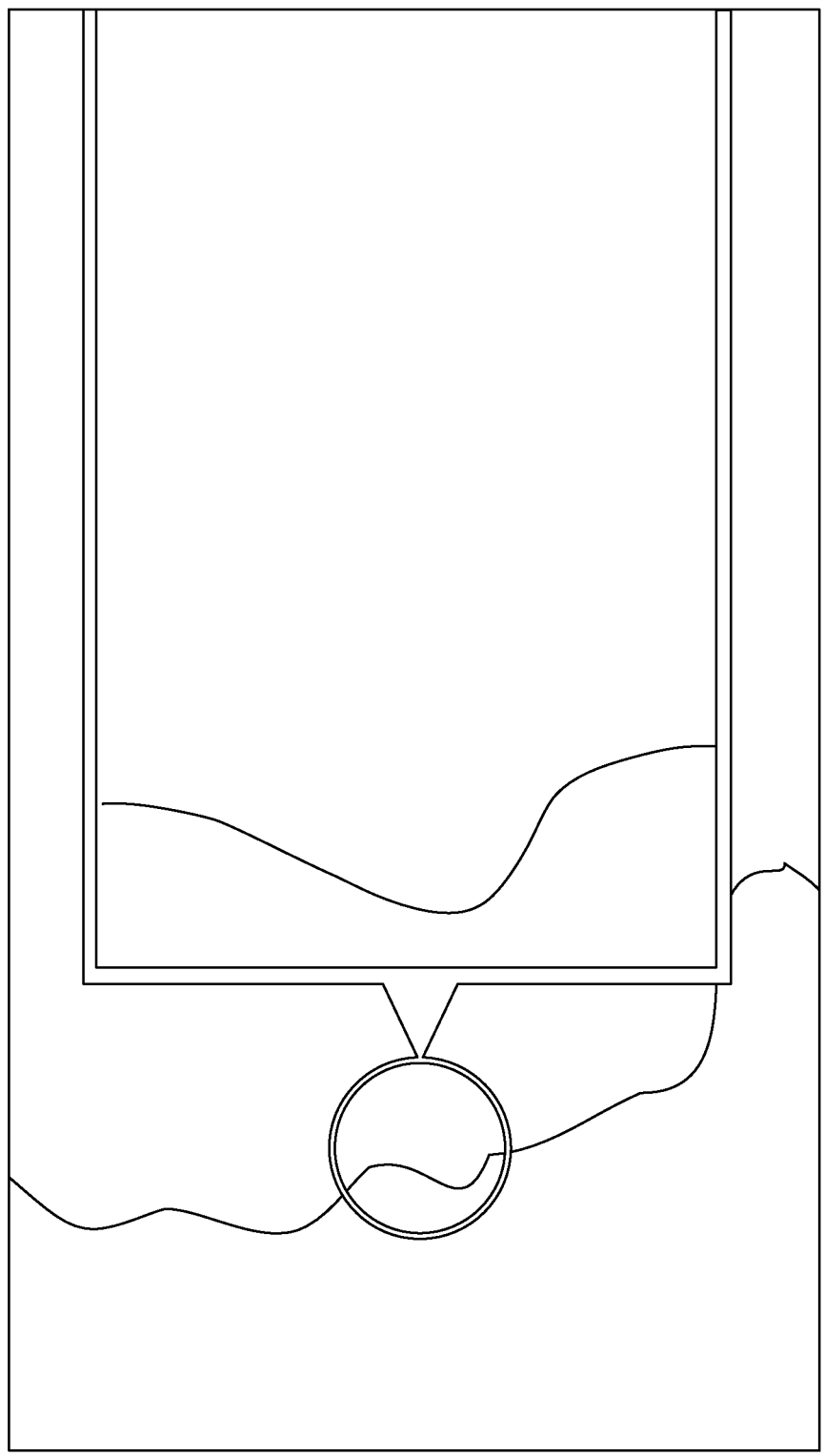
Figure 46E:
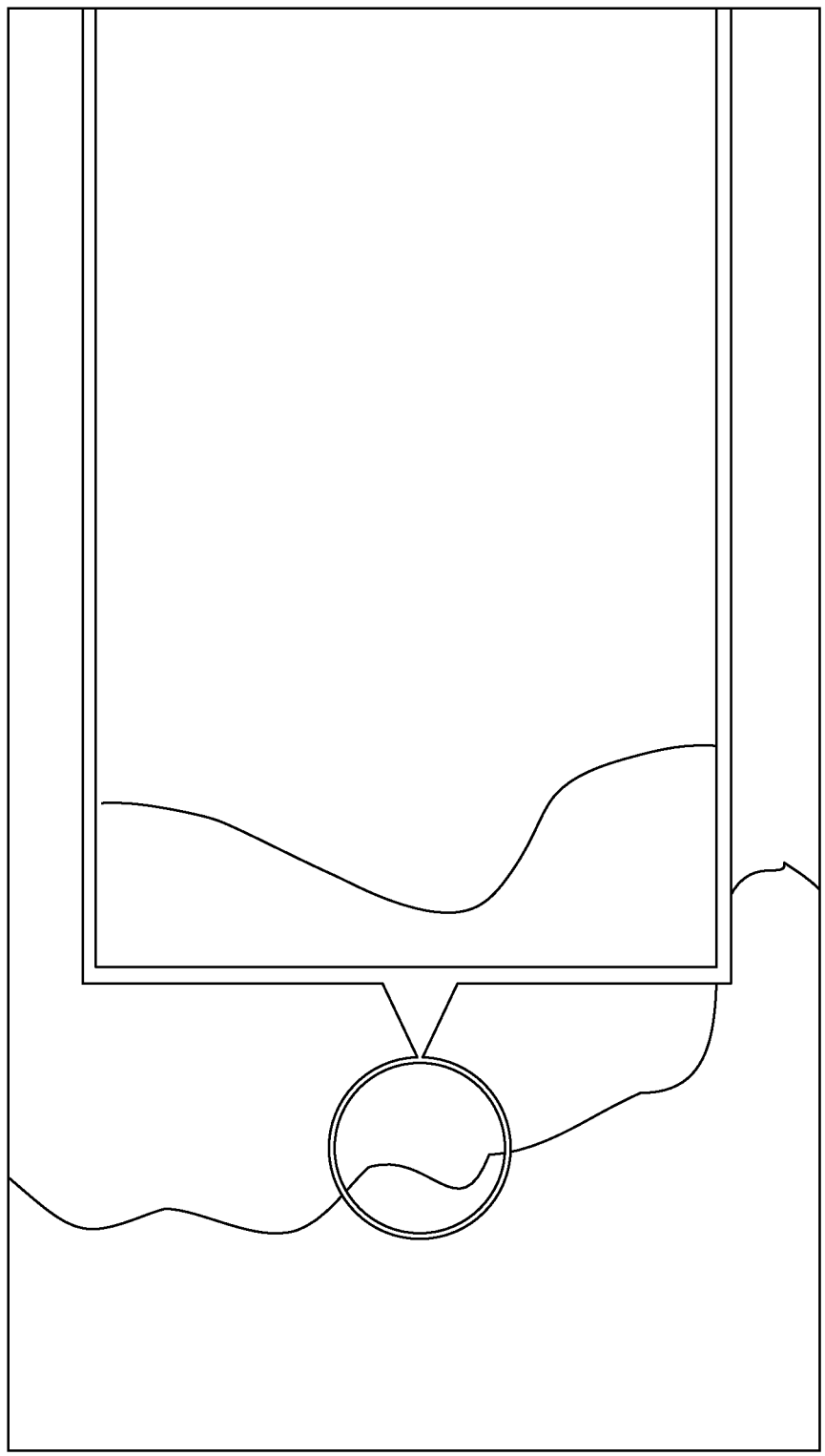
Figure 46F:
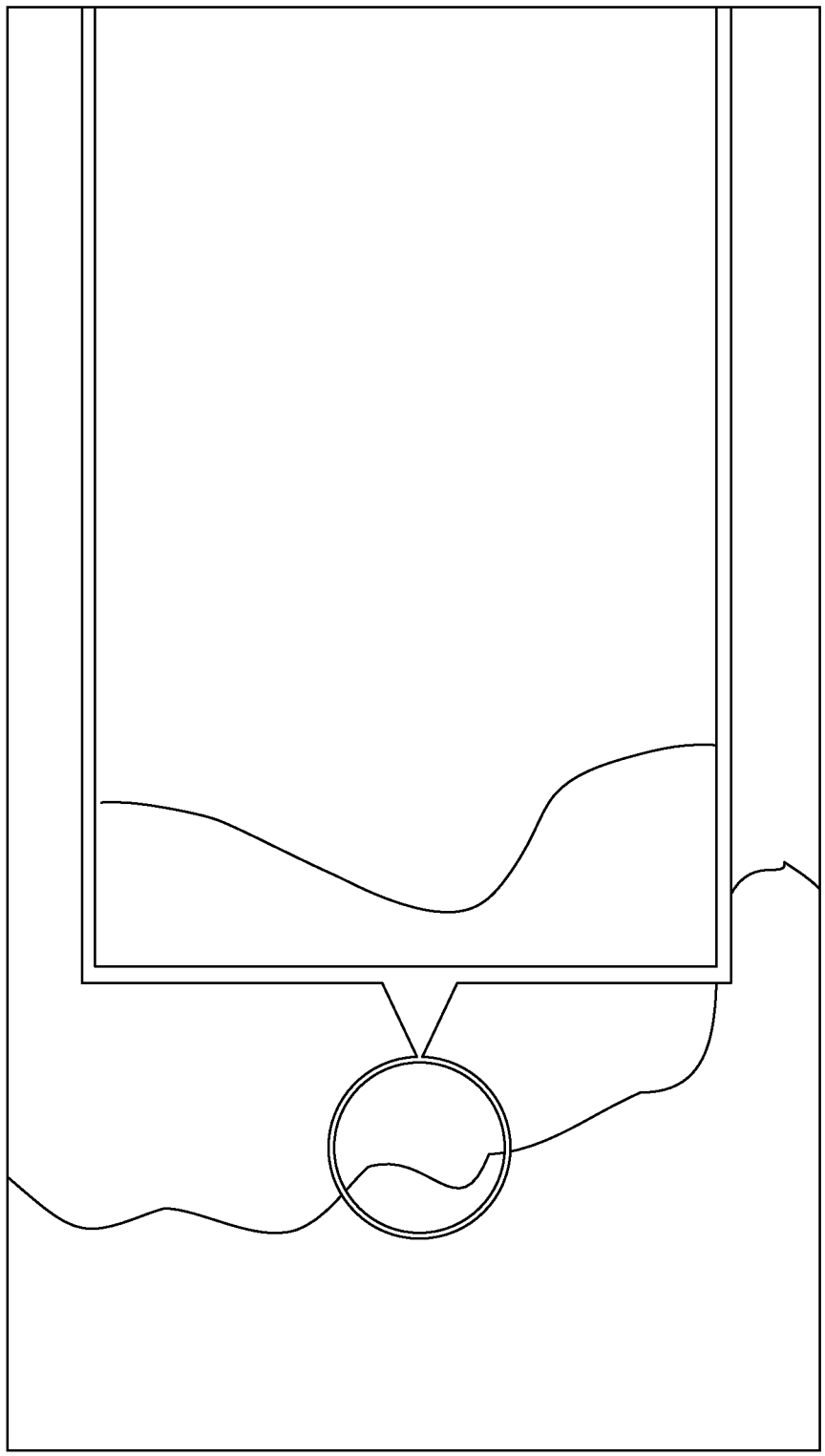

FIGS. 46A, 46B, 46C, 46D, 46E, and 46F are illustrations of one embodiment of an edge-only antialiasing calculation. FIG. 46A shows the mesh models. FIG. 46B shows the models isolated from each other. FIG. 46C shows the edges of the isolated objects. When the models are overlaid, the pixel color information should smoothly transition from one model to the next model. Due to the pixel quantizing effect inherent in sampled digital imagery, this transition may not look natural, as indicated by aliasing artifacts. FIG. 46D shows the aliasing artifacts, without antialiasing. FIG. 46E shows the entire image with antialiasing active. This result is not acceptable, as it softens the entire image. FIG. 46F shows the image with only the edges of the models antialiased, which is the desired result.

Figure 47A:
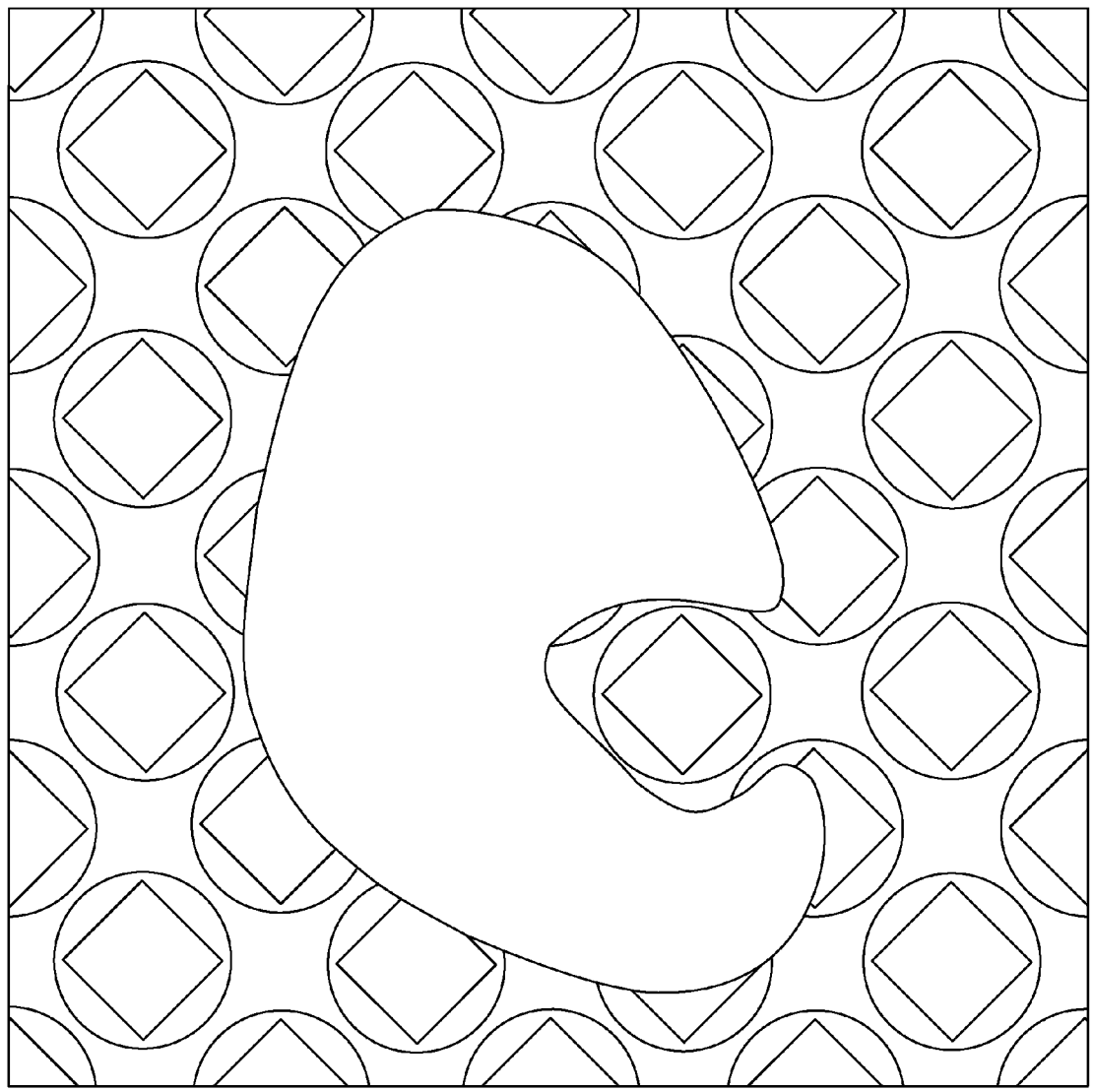
FIGS. 47A-47C illustrate exemplary edge pixel repeat operations.
Figure 47B:
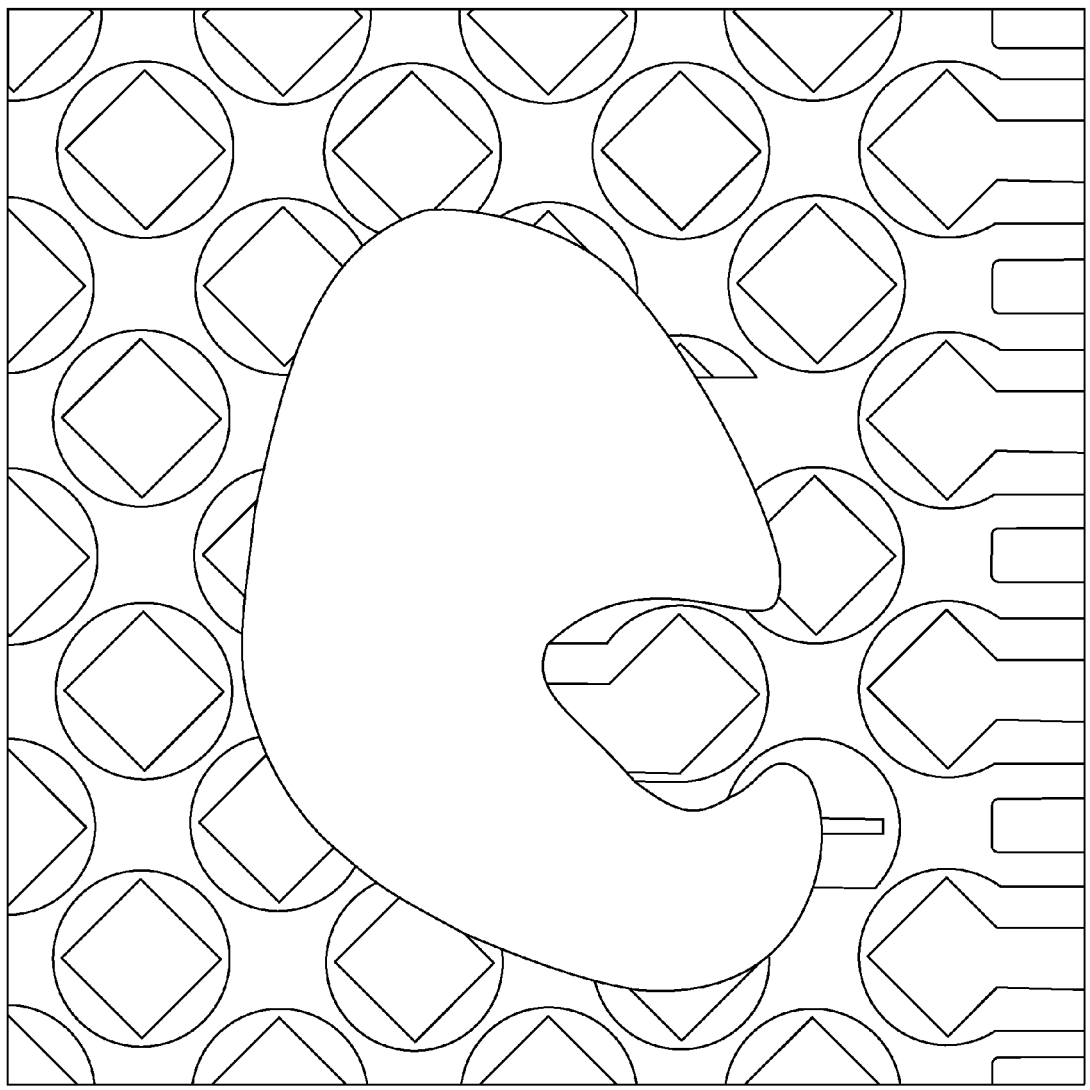
Figure 47C:
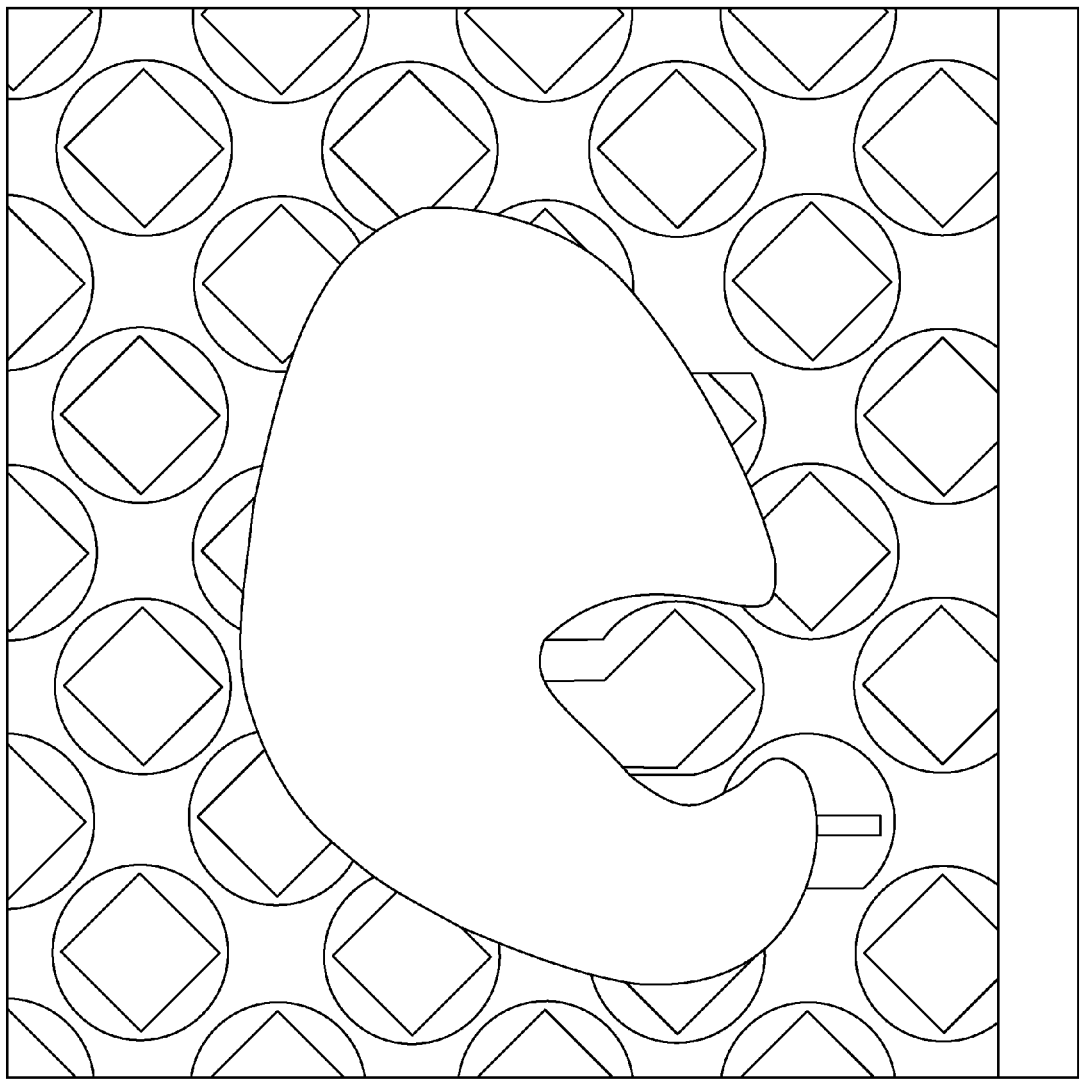

FIG. 47A is an illustration of an image. When the entire image is pixel-shifted to create a secondary perspective view, the edges of the image have no visual data to draw from. The edges can be temporarily filled with edge pixel repeat. FIG. 47B is an illustration of an image showing edge pixel repeat. This edge pixel repeat may not be desirable, so the option is given to mask the edges of the image, in one or both stereoscopic perspectives, so that stereoscopic discrepancies are reduced. FIG. 47C is an illustration of an image showing a matted edge, or 'floating window' style of edge matting.

Depth Mastering

Figure 48A:
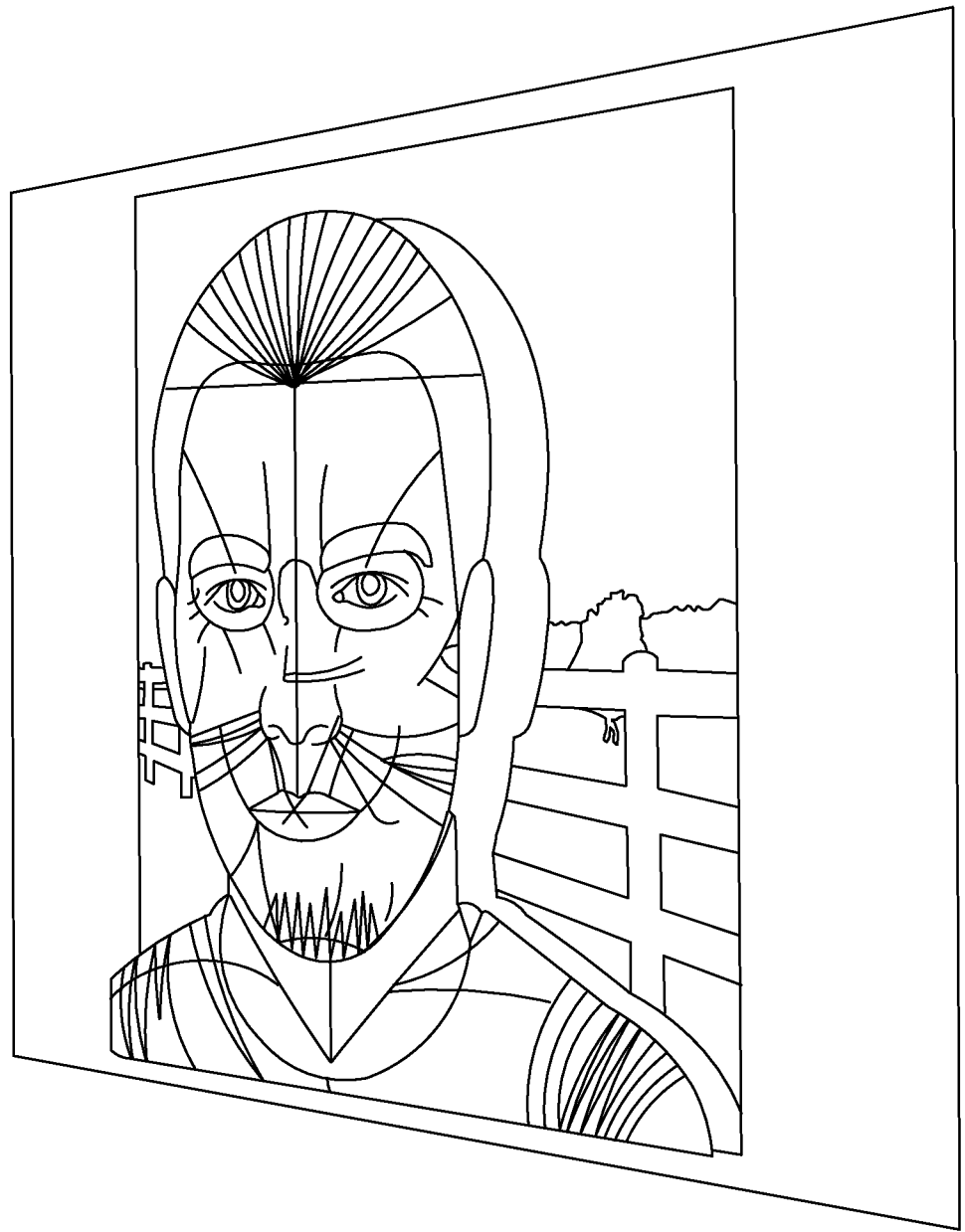
Figure 49A:
FIGS. 49A-49B illustrate exemplary anamorphic stretch operations.
Figure 49B:

After compositing, the user may preview the final image on a display that shows the final output quality. The user, depending on the presentation format of the final output, may decide to depth master the image or sequence of images before finalizing. Examples of machine-aided and easy to use methods, systems, and/or tools for depth mastering may include, but are not limited to: procedural depth scaling; screen registration; color correction; image sequence retiming; anamorphic stretch; edge mattes; and virtual windows. FIG. 48A is an illustration of an image before depth mastering. FIG. 48B is an illustration of an image after depth mastering. FIG. 49A is an illustration of an image before an anamorphic stretch. FIG. 49B is an illustration of an image after an anamorphic stretch via an anamorphic toolset.

Export

After depth mastering or compositing, the final output of the 2D to 3D conversion process can be created. Because in at least some embodiments the techniques discussed herein involve digital images, wherein all of the ingested materials are digital, and because the steps of the process preferably take place on a computer system, the output is also digital.

Figure 50:
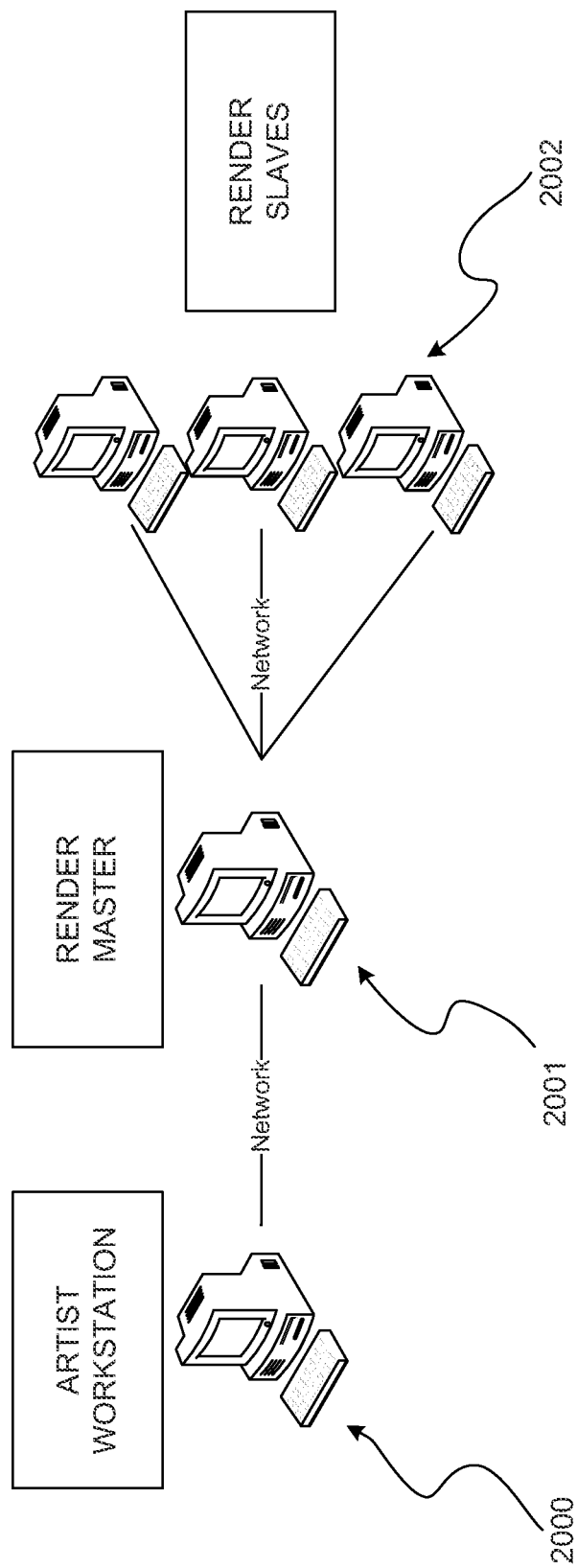
FIG. 50 is a block diagram illustrating a representative environment where the techniques discussed herein may be practiced.

Frequently, the final output must be rendered via a final computation that takes into consideration: all of the paths drawn by the user; the values entered by the user; the composited material loaded by the user; and the depth mastering set by the user. Additionally, any automated or procedural portion of the 2D to 3D conversion algorithm(s) are preferably calculated at the highest quality settings before the final output is written to disk or other media. To speed up this final calculation process, additional computer processing power is preferably utilized through a computer network. The network render works by sending information about the computation to be carried out to a render master controller, which intelligently distributes processing tasks to other computers on the network. FIG. 50 block diagram illustrating a representative environment where the techniques discussed herein may be practiced. The illustrated environment incorporates the above-discussed distributed network-rendering model. As shown in FIG. 50, the artist or user workstation computer 2000 is connected to a render master computer 2001, which is able to use the processing power of many render slave computers 2002.

Figure 51:
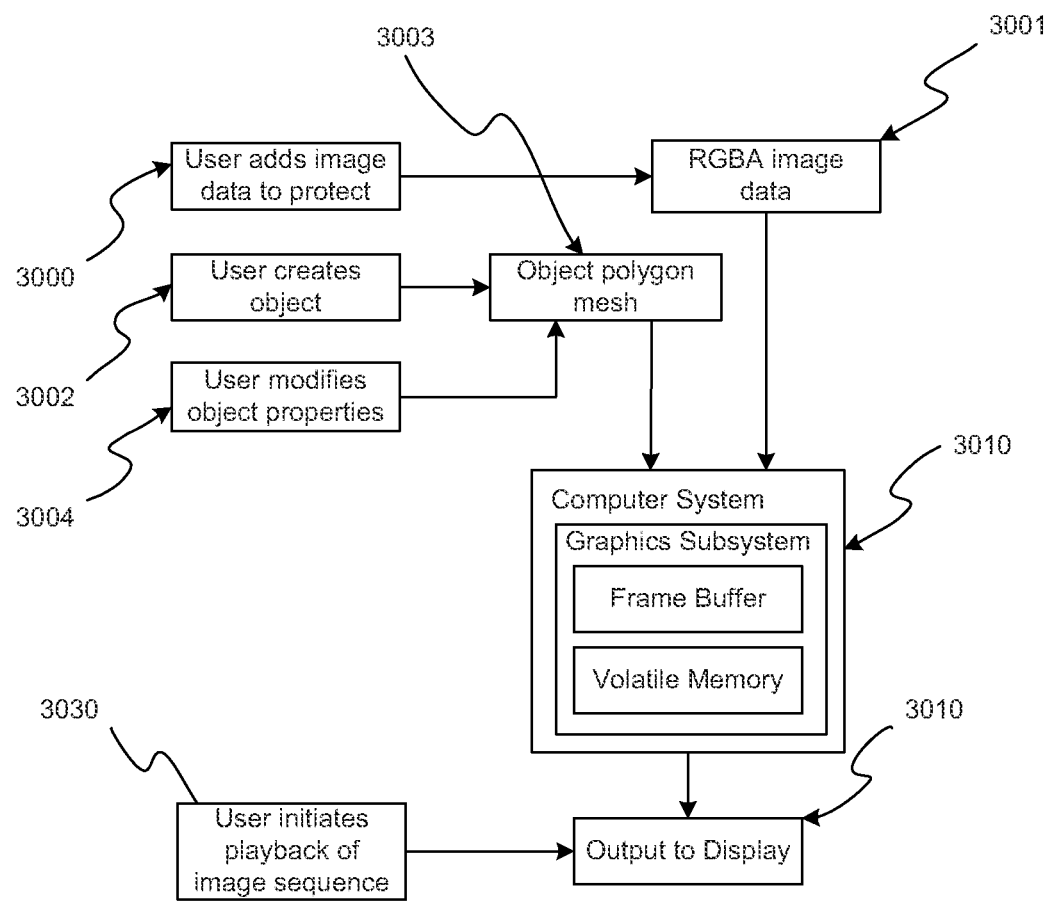
FIG. 51 is a flow diagram illustrating an example of a caching operation.
Figure 52:
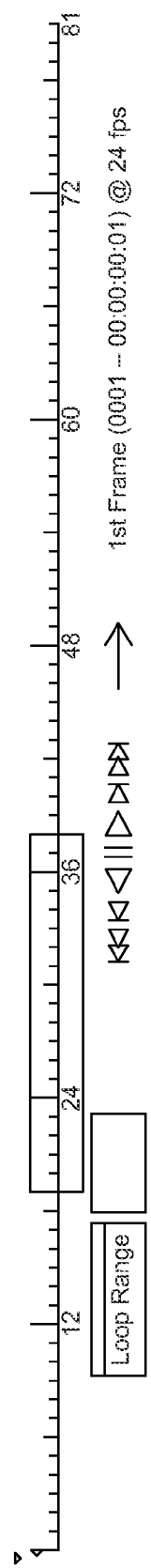
FIG. 52 illustrates an example of playback controls.

A final 3D product may be output in one or more of several manners, including, but not limited to: images representing multiple perspective views; mattes; depth maps; mesh data; or splines. In embodiments, image data can be output in a variety of container formats, including, but not limited to: JPEG; TIFF; Cineon; DPX; PNG; openEXR; bitmap; Targa; Photoshop Document; FBX; and OBJ files. FIG. 51 flow diagram illustrating an example of a caching operation. As shown in FIG. 52, in embodiments, the user adds image data to the project, as indicated in block 3000. This is added as Red Green Blue Alpha (RGBA) image data to the computer system 3010. The user creates object(s) as indicated in block 3002. The object polygon mesh data 3003 is added to the computer system 3010. Any modifications to the object properties 3004 are also processed and added. The computer system 3010 uses a graphics subsystem with a frame buffer and volatile memory to cache the images output them to the display 3020. The user then uses the playback features to playback image sequences as indicated in block 3030. FIG. 52 is an illustration showing one embodiment of the playback controls. The playback controls allow the user to control the images on the display. FIG. 53 is a high-level block diagram showing an example of the architecture for a computer system 600 that can be utilized for performing the various functions described herein. In FIG. 53, the computer system 600 includes one or more processors 605 and memory 610 connected via an interconnect 625. The interconnect 625 is an abstraction that represents any one or more separate physical buses, point to point connections, or both connected by appropriate bridges, adapters, or controllers. The interconnect 625, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 694 bus, sometimes referred to as "Firewire."

The processor(s) 605 may include central processing units (CPUs) to control the overall operation of, for example, the host computer. In certain embodiments, the processor(s) 605 accomplish this by executing software or firmware stored in memory 610. The processor(s) 605 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 610 is or includes the main memory of the computer system 1100. The memory 610 represents any form of random access memory (RAM), read-only memory (ROM), flash memory (as discussed above), or the like, or a combination of such devices. In use, the memory 610 may contain, among other things, a set of machine instructions which, when executed by processor 605, causes the processor 605 to perform operations to implement embodiments of the present invention. Also connected to the processor(s) 605 through the interconnect 625 is a network adapter 615. The network adapter 615 provides the computer system 600 with the ability to communicate with remote devices, such as the storage clients, and/or other storage servers, and may be, for example, an Ethernet adapter or Fiber Channel adapter.

Those skilled in the art will appreciate that various adaptations and modifications of the just described preferred embodiment can be configured without departing from the scope and spirit of the invention. For example, tools that can help differentiate certain values within an image such as hue and saturation of a color, or brightness value can also be employed to assist with recognizing and defining objects. Motion can also be used to help recognize and define objects. Therefore, it is to be understood that, within the scope of the appended claims, the invention may be practiced other than as specifically described herein.

The foregoing description of the preferred embodiment of the invention has been presented for the purposes of illustration and description. While multiple embodiments are disclosed, still other embodiments of the present invention will become apparent to those skilled in the art from the above detailed description, which shows and describes illustrative embodiments of the invention. As will be realized, the invention is capable of modifications in various obvious aspects, all without departing from the spirit and scope of the present invention. Accordingly, the detailed description is to be regarded as illustrative in nature and not restrictive. Also, although not explicitly recited, one or more embodiments of the invention may be practiced in combination or conjunction with one another. Furthermore, the reference or non-reference to a particular embodiment of the invention shall not be interpreted to limit the scope the invention. It is intended that the scope of the invention not be limited by this detailed description, but by the claims and the equivalents to the claims that are appended hereto.

Unless the context clearly requires otherwise, throughout the description and the claims, the words "comprise," "comprising," and the like are to be construed in an inclusive sense (i.e., to say, in the sense of "including, but not limited to"), as opposed to an exclusive or exhaustive sense. As used herein, the terms "connected," "coupled," or any variant thereof means any connection or coupling, either direct or indirect, between two or more elements. Such a coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The various illustrations and teachings provided herein can also be applied to systems other than the system described above. The elements and acts of the various examples described above can be combined to provide further implementations of the invention.

Any patents and applications and other references noted above, including any that may be listed in accompanying filing papers, are incorporated herein by reference. Aspects of the invention can be modified, if necessary, to employ the systems, functions, and concepts included in such references to provide further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

What is claimed is:

1. A method of converting a two-dimensional image into a three-dimensional image, the method comprising:
ingesting, by a processing system, image data, said image data including at least one image, each image having one or more objects;
segmenting, by the processing system, said one or more objects, said segmenting based on an isolation input entered by a user via said processing system;
establishing stereoscopic depth for one or more of said segmented objects based on depth parameters entered by the user via said processing system, wherein said one or more segmented objects is selected from one process or more of: tag selection; visibility map selection; or object list selection; and
compositing, by the processing system, said at least one image to remove any occluded regions subsequent to establishment of stereoscopic depth;
wherein the tag selection comprises drawing a line that intersects said one or more segmented objects regardless of depth;
wherein the visibility map selection comprises generating a visibility map after said segmenting and using the visibility map to select said one or more segmented objects; and wherein the object list selection comprises selecting said one or more segmented objects from an ordered list of segmented objects.

2. The method of claim 1, further comprising:
interpolating said one or more segmented objects based on interpolation parameters entered via the processing system by the user.

3. The method of claim 2, further comprising:
depth mastering said one or more composited images.

4. The method of claim 3, further comprising:
enabling, by the processing system, selection of said one or more segmented objects prior to interpolating said one or more segmented objects; and
reviewing said at least one composited image before depth mastering said at least one composited image.

5. The method of claim 4, wherein a plurality of changes made to said image data are visible to a user via the processing system.

6. The method of claim 5, wherein said plurality of changes are visible to said user in real-time through a three-dimensional display.

7. The method claim 4, further comprising creating one or more alternate perspective images.

8. The method of claim 7, further comprising:
combining said one or more alternate perspective images with said one or more images to create one or more three-dimensional images.

9. The method of claim 7, further comprising: creating two alternate perspective images;
combining said two alternate perspective images with each other to create one or more three-dimensional images.

10. The method of claim 3, said depth mastering further including one or more of: procedural depth scaling; screen registration; color correction; image sequence retiming; anamorphic stretch; edge mattes; or virtual windows.

11. The method of claim 2, wherein said one or more segmented objects are interpolated by one process or more of: key frame animation; parenting; or global parameter modification.

12. The method of claim 1, wherein said ingested image data is includes data selected from one or more of: additional two-dimensional image data; additional three-dimensional image data; computer-generated renders; alpha mattes; alpha channels; depth maps; clean plates; grain plates; spline data; or mesh data.

13. The method of claim 1, wherein said one or more objects are segmented by a process selected from one or more of: object level segmentation or pixel level segmentation.

14. The method of claim 13, wherein said object level segmentation and pixel level segmentation processes utilize one or more of: an external input of depth data; a user initiated depth extrapolation; or a combination of said external input of depth data and said user initiated depth extrapolation.

15. The method of claim 14, wherein said external input of depth data is selected from one or more of: alpha mattes; computer generated rendered depth maps; depth maps generated through optical flow analysis; light detection and ranging scans of a physical set during an initial capture of said one or more images; or depth maps generated from three-dimensional infrared cameras during an initial capture of said one or more images.

16. The method of claim 14, wherein said user initiated depth extrapolation is segmented by a system selected from one or more of: drawing tools for object isolation; holes used for pixel exclusion; spline creation tools for object isolation; pixel transparency as a result of edge feather parameter modification; pixel repositioning as a result of depth parameter modification; perspective drawing tools and parameters for pixel skewing; or shape contour drawing tools and parameters for pixel warping.

17. The method of claim 1, wherein said one or more images are composited using one or more of:
automated occluded area fills on a per object basis; layering of modified image data;
pre-compositing image data to avoid depth collisions; reintroducing transparencies; or edge antialiasing via super sampling.

18. The method of claim 1, further including exporting a 3D processed version of said image data, further wherein said 3D processed version is rendered via a final computation that accounts for one or more of: a plurality of paths drawn by a user; a plurality of values entered by said user; a composited material loaded by said user; or a depth mastering value set by said user.

19. The method of claim 18, wherein said final output includes a plurality of output data selected from the group consisting of: images representing multiple perspective views; mattes; depth maps; mesh data; or splines.

20. The method of claim 1, wherein said at least one image is a sequence of images.

21. The method of claim 20, wherein said sequence of images make up a discrete scene of a visual media work.

22. The method of claim 1, wherein the isolation input includes accepting a path line input from the user, the processing system further providing the user tools to perform one or more of: additive trimming the path line, subtractive trimming the path line, combination trimming the path line, transforming one or more points of the path line; warping one or more points of the path line; or nudging one or more points of the path line.

23. The method of claim 1, further comprising:
upon request and control by a user via a processing system, optionally providing two dimensional or three dimensional playback via the processing system, said playback offered at variable user-defined and predetermined frame rates sequentially starting from a first frame of a corresponding two dimensional or three dimensional image sequence in an alphanumeric sequence and ending at a last frame in said alphanumeric sequence.

24. The method of claim 23, further comprising:
providing loop-playback, the loop playback including playback of the two dimensional or three dimensional image sequence from the first frame in the alphanumeric sequence to the last frame in the alphanumeric sequence, then reversing from the last frame in the alphanumeric sequence to the first frame in the alphanumeric sequence.

25. A user guided computer-based image processing method for converting two-dimensional images into three-dimensional images, comprising the steps of:
ingesting one or more two-dimensional digital images by a processing system; creating, via said processing system, one or more multi-dimensional images from said one or more two-dimensional digital images using one or more stereoscopic techniques; presenting said one or more multi-dimensional images on a three-dimensional display associated with said processing system;
identifying a first discrete portion of said one or more multi-dimensional images based on a perceived dimensional relationship between one or more pixels of said first discrete portion and one or more pixels of a second discrete portion;

segmenting said first discrete portion of said one or more multi-dimensional images based on a perceived dimensional relationship between one or more pixels of said first discrete portion and one or more pixels of a second discrete portion, wherein said one or more segmented discrete portions is selected from one process or more of: tag selection; visibility map selection; or object list selection;

wherein the tag selection comprises drawing a line that intersects said one or more segmented objects regardless of depth;

wherein the visibility map selection comprises generating a visibility map after said segmenting and using the visibility map to select said one or more segmented objects; and wherein the object list selection comprises selecting said one or more segmented objects from an ordered list of segmented objects;

interpolating a plurality of occluded regions within said one or more multi-dimensional images;

compositing one or more multi-dimensional images by combining said plurality of missing pixels and said one or more multi-dimensional images;

depth mastering said one or more multi-dimensional images; and exporting said one or more multi-dimensional images.

26. A system for converting two-dimensional images into three-dimensional images, comprising:
a memory including:
digital data; and
a first computer algorithm;
a processor for executing a series of operations associated with the first computer algorithm; and
a display device adapted for playback of three-dimensional images; wherein,
said digital data is comprised of one or more images;
said first computer algorithm processes said plurality of digital data and creates one or more artifact-free alternate perspective images;
said one or more artifact-free alternate perspective images are created using one or more of segmenting; compositing, or depth mastering, wherein depth mastering allows said one or more segmented artifact-free alternate perspective images to be selected from one process or more of: tag selection; visibility map selection; or object list selection;
wherein the tag selection comprises drawing a line that intersects said one or more segmented objects regardless of depth;
wherein the visibility map selection comprises generating a visibility map after said segmenting and using the visibility map to select said one or more segmented objects; and
wherein the object list selection comprises selecting said one or more segmented objects from an ordered list of segmented objects; and
said display device renders, in real-time, one or more changes being made to said one or more three-dimensional images to enable a user to contemporaneously edit said digital data for improving quality of said alternate perspective images, wherein the memory further includes a second computer algorithm, said second computer algorithm configured to identify and isolate one or more discrete portions of said digital data, further wherein the memory includes a third computer algorithm, said third computer algorithm configured to interpolate one or more occluded regions in said digital image data.

27. The system of claim 26, wherein: said one or more images and said one or more artifact-free alternate perspective images are combined;
said combined one or more images and said one or more artifact-free alternate perspective images create one or more three-dimensional images.

28. The system of claim 27, wherein said one or more changes are visible to a user in real-time via the display device.

29. The system of claim 27, wherein said one or more visible changes are further displayed as numerical feedback.

30. The system of claim 27, wherein said second computer algorithm uses one or more of object-level segmentation or pixel-level segmentation to identify and isolate said one or more discrete portions.

31. The system of claim 27 wherein said second computer algorithm generates external data; wherein said system enables the user to introduce alterations to said external data.

32. The system of claim 31, wherein said one or more discrete portions are grouped together by a user based on a perceived three-dimensional relationship to one another and to a background.

33. The system of claim 27 wherein said interpolation includes one or more of: pixel repositioning; pixel warping; or pixel feathering.

34. The system of claim 27 wherein the memory further includes a fourth computer algorithm, said fourth computer algorithm configured to composite said digital image data, said one or more artifact-free alternate perspectives, and said interpolated occluded regions to generate a one or more three-dimensional images.

35. The system of claim 34, wherein the memory includes a fifth computer algorithm, said fifth computer algorithm configured to create a depth in said one or more three-dimensional images.

36. The system of claim 35, wherein said three-dimensional image is created using one or more of: generating a plurality of three-dimensional mesh form, repositioning a plurality of pixels through depth parameter adjustment, skewing said plurality of pixels through vector representation, or utilizing a plurality of known depth calculations with said plurality of three dimensional mesh forms.

37. The system of claim 35, wherein said one or more three-dimensional images are exported to said display device.

38. The system of claim 26, wherein:
said one or more artifact-free alternate perspective images are combined with each other;
said combined one or more artifact-free alternate perspective images create one or more three-dimensional images.

* * * * *